(12) United States Patent
Matsumoto et al.

(10) Patent No.: US 6,979,385 B2
(45) Date of Patent: Dec. 27, 2005

(54) METHOD AND FACILITY FOR SEPARATING AND RECOVERING STEEL PIPE AND COVERING RESIN IN RESIN-COVERED STEEL PIPE

(75) Inventors: Tatsuo Matsumoto, Shizuoka (JP); Haruo Fujita, Shizuoka (JP)

(73) Assignee: Yazaki Industrial Chemical Co., Ltd., Shizuoka (JP)

( * ) Notice: Subject to any disclaimer, the term of this patent is extended or adjusted under 35 U.S.C. 154(b) by 0 days.

(21) Appl. No.: 10/495,922

(22) PCT Filed: Nov. 5, 2002

(86) PCT No.: PCT/JP02/11509

§ 371 (c)(1),
(2), (4) Date: May 17, 2004

(87) PCT Pub. No.: WO03/043754

PCT Pub. Date: May 30, 2003

(65) Prior Publication Data

US 2005/0000647 A1    Jan. 6, 2005

(30) Foreign Application Priority Data

Nov. 19, 2001   (JP) .............................. 2001-353437

(51) Int. Cl.[7] .............................................. B32B 35/00
(52) U.S. Cl. ..................................... 156/344; 156/584
(58) Field of Search ............................... 156/344, 584

(56) References Cited

U.S. PATENT DOCUMENTS

| | | | | |
|---|---|---|---|---|
| 2,291,862 A | * | 8/1942 | Bailey | 156/344 |
| 2,636,408 A | * | 4/1953 | Mitchell | 29/867 |
| 4,158,758 A | * | 6/1979 | Kunioka et al. | 219/643 |
| 4,453,319 A | * | 6/1984 | Morris | 34/247 |
| 4,880,335 A | * | 11/1989 | Lee | 405/158 |
| 4,963,205 A | * | 10/1990 | Hubert | 156/80 |
| 5,250,131 A | * | 10/1993 | Gitelman | 156/95 |
| 5,290,380 A | * | 3/1994 | Gitelman et al. | 156/344 |
| 6,578,265 B2 | * | 6/2003 | Boschet et al. | 29/889.1 |

FOREIGN PATENT DOCUMENTS

JP          2-202406        * 10/1990

* cited by examiner

*Primary Examiner*—Mark A. Osele
(74) *Attorney, Agent, or Firm*—Dellett & Walters

(57) ABSTRACT

There are provided a method and a facility for separating and recovering a steel pipe and a covering resin in a resin-covered steel pipe, which do not produce cuttings of the steel pipe and which make it possible to continuously operate the facility. The method comprises the steps of using a cut line forming means installed forwardly of the position that a high frequency induction coil passes, so as to form a cut line extending from the surface of the resin-covered steel pipe toward the steel pipe, deep enough to reach the surface of the steel pipe from the surface of the covering resin, throughout the length of the resin-covered steel pipe, circumferentially dividing the covering resin into at least two parts, heating the steel pipe by high frequency induction heating, in the position of a separating device disposed at a suitable position immediately after the passage of the position of the high frequency induction coil, to the extent the boundary between the covering resin and the steel pipe assumes the state for the release of the covering resin from the steel pipe, and cutting each covering resin into at least two parts along the cut line and toward the outside of the steel pipe by the separating device while releasing and separating it from the steel pipe.

14 Claims, 44 Drawing Sheets

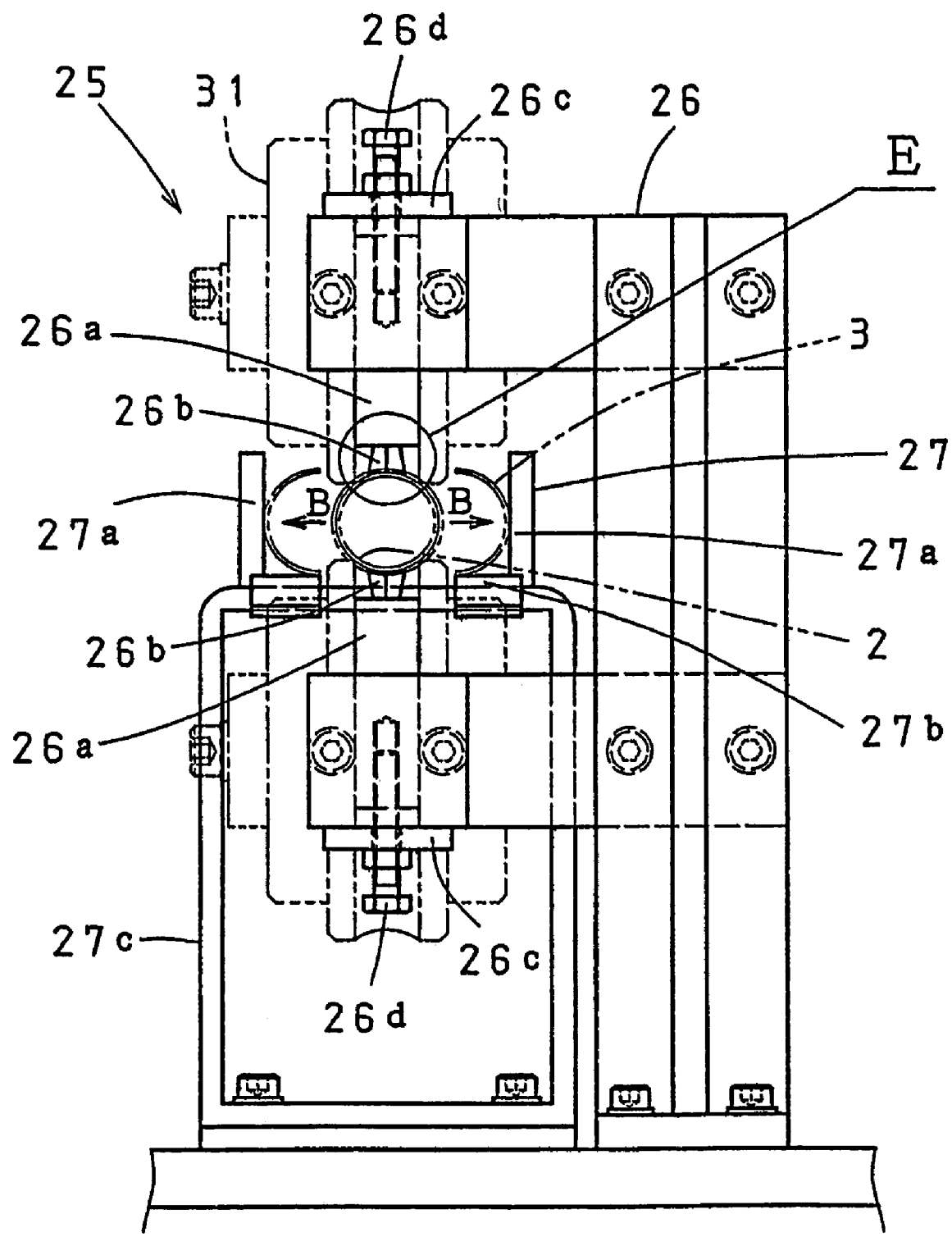
F I G. 1 2

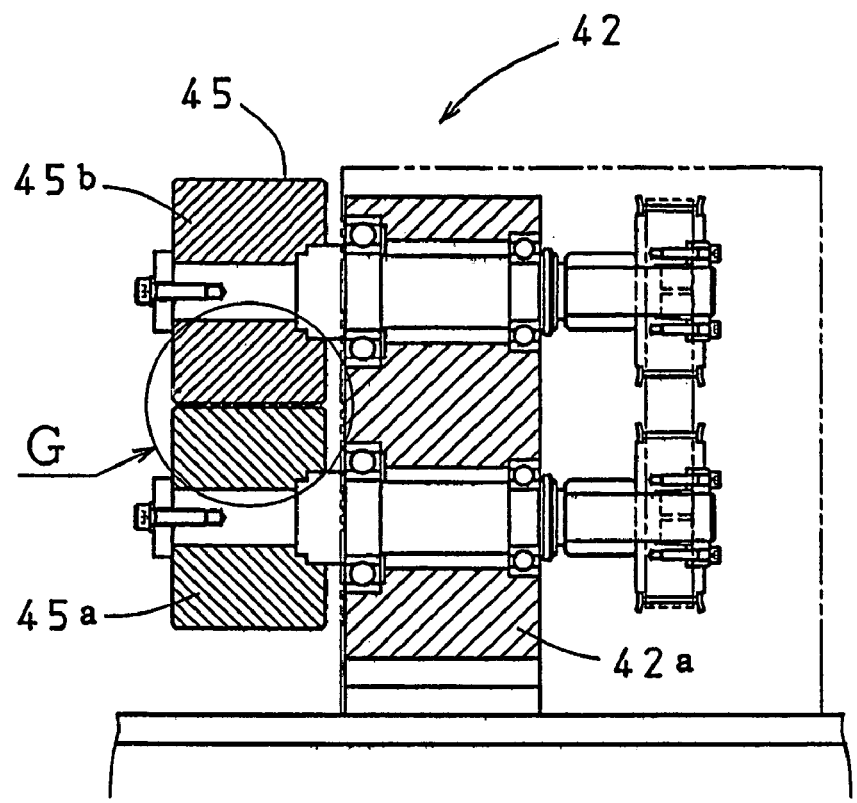
F I G. 1 6
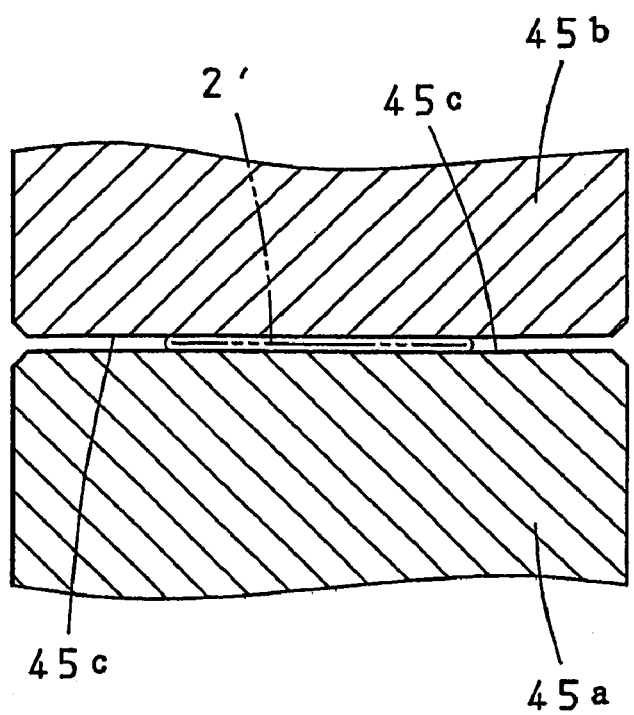
F I G. 1 7

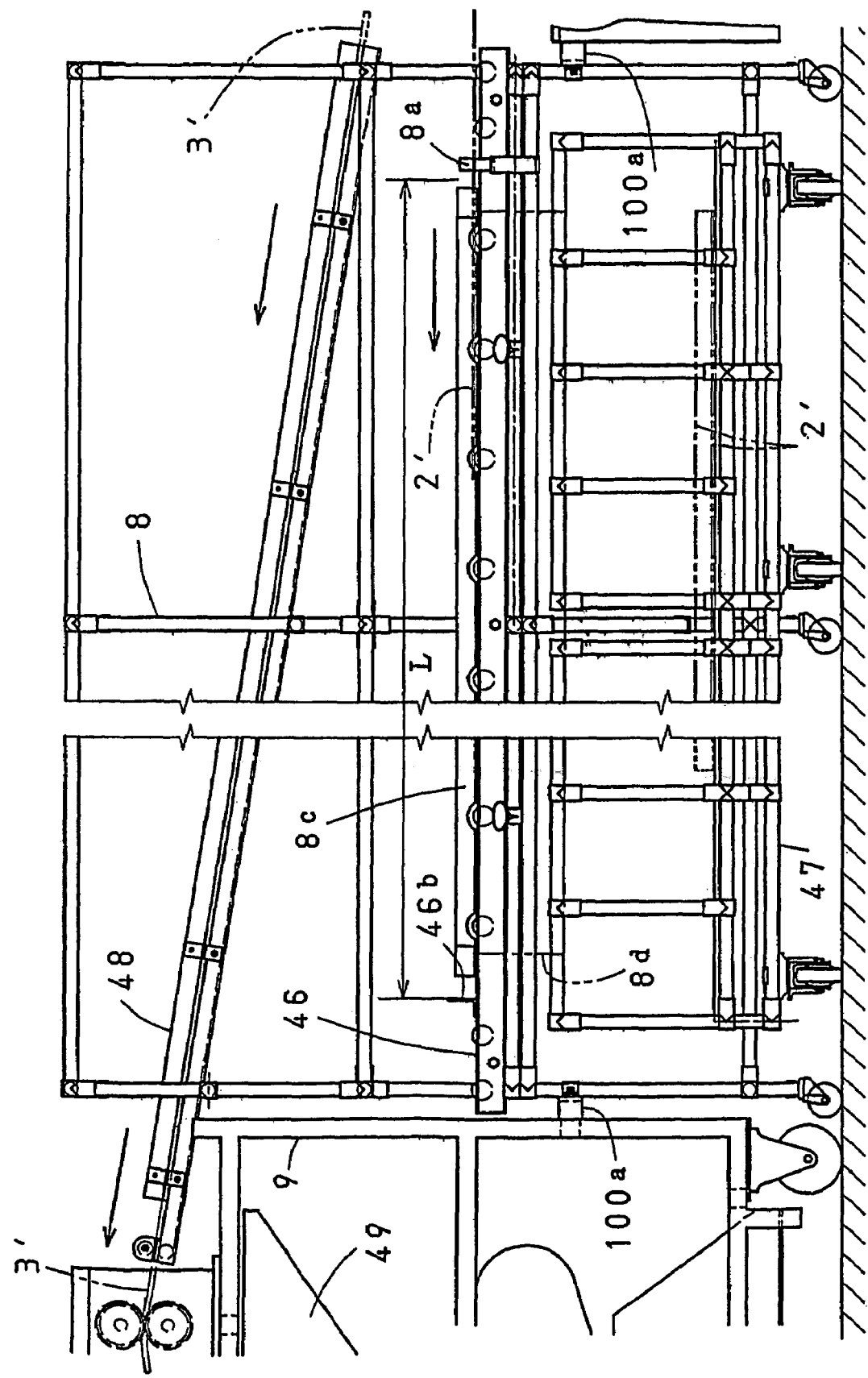

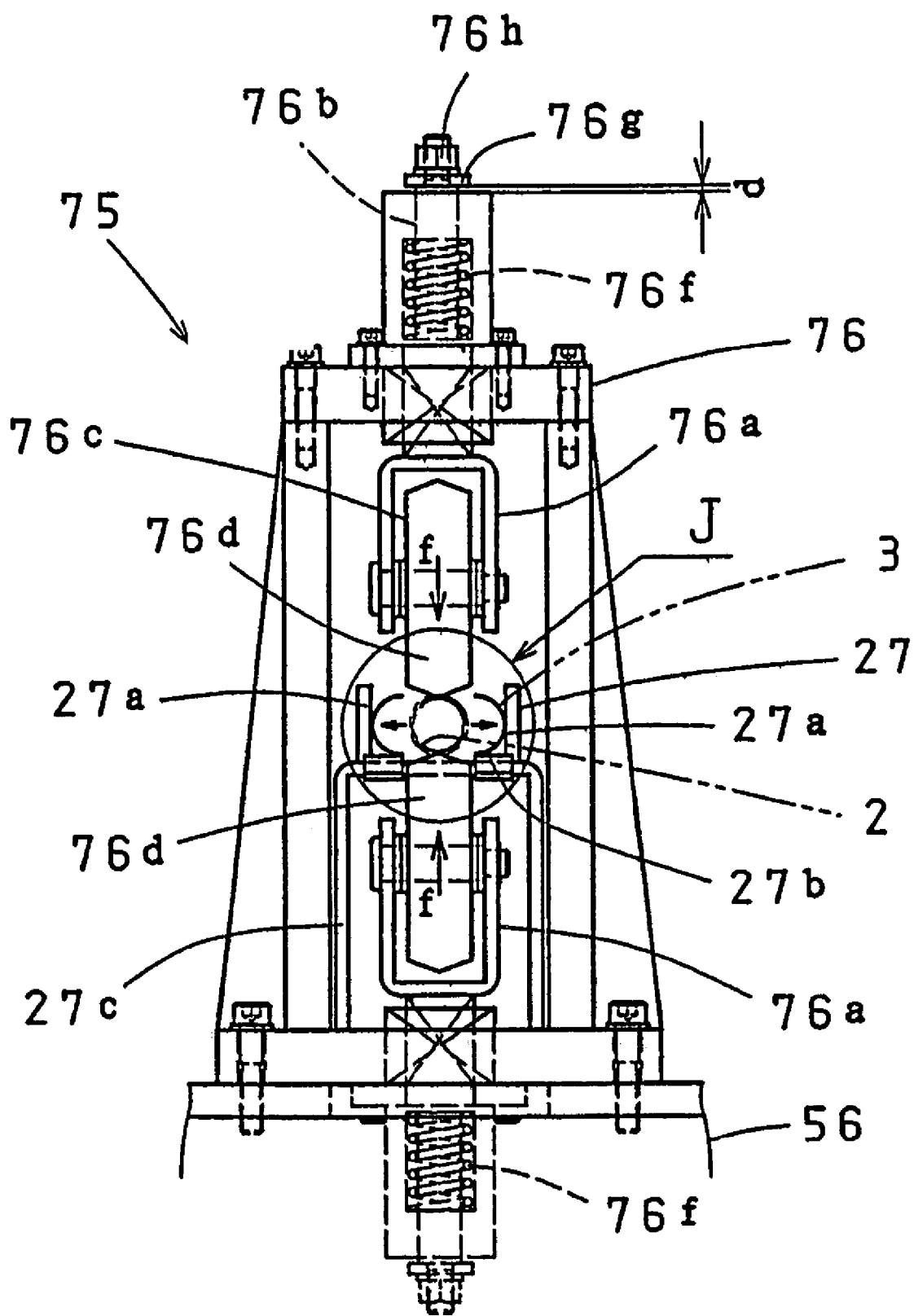
F I G. 3 1

METHOD AND FACILITY FOR SEPARATING AND RECOVERING STEEL PIPE AND COVERING RESIN IN RESIN-COVERED STEEL PIPE

FIELD OF SEARCH

This invention belongs to the field of technology pertaining to method and apparatuses for reusing resin-coated steel pipes collected as waste or recycling resources, or more particularly, relates to a method and an apparatus for recovering materials through the separation and recovering of steel pipe and coating resin in segregated condition from resin-coated steel pipe that is produced by adhering a thermo-plastic resin on the pipe surface.

BACKGROUND OF THE INVENTION

As a previous method to separate and recover steel pipe and coating resin, the technique for which the present applicant was granted patent status in Japan is disclosed in Japanese Patent No.2533465.

The technique according to the above-named Japanese patent has been preferably used for resin-coated steel pipe that consist of pipe having a thickness about 0.8 mm and outer diameter of 25.5–40 mm, and a coating of a thermo-plastic synthetic resin, such as acrylonitrile acryl styrene (AAS) or acrylonitrile butadiene styrene (ABS), of a uniform thickness of about 1 mm fixed on the steel pipe surface with a thin film of adhesive.

The means to separate and recover a steel pipe and coating resin, as described in the above Japanese patent, consists of passing a resin-coated steel pipe through or near a high-frequency induction coil by feed rolls and take-up rolls, and heating the pipe to a temperature no lower than the melting point of the resin.

Further, as stated in Claims 1 and 2 and shown in FIGS. 2 through 5 of the above Japanese patent, the coating resin is scraped off into chips of a certain size by scraping rolls, which are used as a separating mechanism located at a position where the inner layer of coating is melted and the outer layer is in a softened condition after passing the high-frequency induction coil, and which rotate in the feeding direction of the pipe. The scraping rolls are provided with blades that fit the shape of the pipe section (circular in FIGS. 2 and 3; square in FIGS. 4 and 5 of the above Japanese patent) and are arranged at a pitch corresponding to the size of the scraped resin chips.

Further, as stated in Claim 3 and shown in FIG. 6 of the above Japanese patent, the scraping rolls, used as a separating mechanism located at a position where the inner layer of coating is melted and the outer layer is in a softened condition after passing the high-frequency induction coil, are rotated in the direction opposite to the feeding direction of the pipe to scrape off the resin into a set of long strips. Here again, the scraping rolls are provided with blades fitting the shape of the pipe section.

Still further, as stated in Claim 4 and shown in FIG. 7 of the above Japanese patent, coating resin is scraped into long strips by scraping blades used for separating and fixed at a position where the inner layer of coating is melted and the outer layer is in a softened condition after passing the high-frequency induction coil.

In Claims 1, 3 and 4 of the above Japanese patent, steel pipe and resin from a resin-coated steel pipe are separated by scraping and are recovered in a segregated condition. For this purpose, at least one pair of scraping blades, opposing each other, are formed into a shape congruent with the outer periphery of the steel pipe when seen from the direction perpendicular to the axis of the pipe.

In order for each of the blades to scrape coating resin from the resin-coated steel pipe into chips of a certain size (from about 10 mm×10 mm to 10 mm×15 mm) or into a set of long strips, it is important that the patent is practiced in such a manner that the blade tips are fitted tightly on the outer periphery of the pipe during the feeding motion for the pipe. But the fact that the tips of each of the blades are formed into a shape congruent with the outer periphery of the steel pipe and must be fitted tightly on the outer periphery of the pipe during the feeding motion, poses the following problems.

Firstly, small pieces or dust (about 1 mm×1 mm through 1 mm×5 mm in size) of steel cut off from steel pipe are mingled with the scraped off resin. This means that in order to reuse the resin separated and recovered from the steel pipe, an additional process and additional equipment to remove the steel pieces or dust from the recovered resin are required.

Secondly, the tips of the scraping blades come in contact with the melted inner layer of coating resin and, in case the apparatus is run continuously, the tips of the blades generate friction heat and raise temperature to a point higher than desirable as they tightly engage with the outer surface of the steel pipe that is moving in the feeding direction, and thus, part of the resin heated over the melting point and separated from steel pipe will gradually stick to the tips of the blades and accumulate. When the resin thus accumulated gradually reaches a certain amount, it must be removed from around the tips of the blades, which means an interruption of continuous run of the apparatus.

The primary object of the present invention, therefore, is to provide a method and an apparatus to separate and recover steel pipe and coating resin from resin-coated steel pipe that make it possible to separate coating resin from the steel pipe without scraping, and hence, without generating cut off dust of steel pipe, and thereby make it possible to run the apparatus continuously.

DISCLOSURE OF THE INVENTION

To achieve the objects described above, the invention as recited in Claim 1 relates to a method to separate and recover steel pipe and coating resin from resin-coated steel pipe, intended to process a resin-coated steel pipe (1) which consists of steel pipe (2) and coating resin (3) adhered to an outer surface of said pipe, employing a separating and recovering apparatus having a feeding device (10), a high-frequency induction heating device (20), a separating mechanism (25), a take-up device (30) and a recovering device (40), said feeding device (10) feeding said resin-coated steel pipe (1) of certain length in a running direction thereof thereby passing and heating said resin-coated steel pipe (1) inside or near a high-frequency induction coil (21) of said high-frequency induction heating device (20), said separating mechanism, which is located at a certain position reached immediately after a heating process separating said coating resin (3) from said steel pipe (2), said take-up device (30) taking up said steel pipe (2) in said running direction thereof and said recovering device (40) recovering separated steel pipe (2) and coating resin (3), is characterized in that a cutting means located at a position before said high-frequency induction coil (21) makes incision lines (18) in said coating resin (3) that reach in depth from a surface of said coating resin (3) to a surface of said steel pipe (2) and extend throughout a length of said resin-coated pipe (1) at positions that divide a periphery of said coating resin into at least two parts, that by means of high-frequency induction heating, said steel pipe (2) is heated in such a manner that, when it reaches said separating mechanism (25) located at an appropriate position arrived at immediately after a heating process, a bottom layer of said coating resin (3) adjacent to a boundary of said steel pipe reaches a condition separable from said steel pipe (2), and that said separating mechanism (25) separates said coating resin (3) from said steel pipe (2) and severs said coating resin (3) along incision lines (18) and away from said resin-coated steel pipe (1) into at least two pieces.

The invention as recited in Claim 2 relates to a method to separate and recover steel pipe and coating resin from resin-coated steel pipe, intended to process a resin-coated steel pipe (1) which consists of steel pipe (2) and coating resin (3) adhered to an outer surface of said pipe, employing a separating and recovering apparatus having a feeding device (10), a high-frequency induction heating device (20), a separating mechanism (25), a take-up device (30) and a recovering device (40), said feeding device (10) feeding said resin-coated steel pipe (1) of certain length in a running direction thereof thereby passing and heating said resin-coated steel pipe (1) inside or near a high-frequency induction coil (21) of said high-frequency induction heating device (20), said separating mechanism (25), which is located at a certain position reached immediately after a heating process separating said coating resin (3) from said steel pipe (2), said take-up device (30) taking up said steel pipe (2) in said running direction thereof and said recovering device (40) recovering said separated steel pipe (2) and coating resin (3), is characterized in that a cutting means located at a position before said high-frequency induction coil (21) makes incision lines (18) in said coating resin (3) that reach in depth from a surface of said coating resin (3) to said surface of said steel pipe (2) and extend throughout a length of said resin-coated pipe (1) at positions that divide a periphery of said coating resin (3) into at least two parts, that by means of high-frequency induction heating, said steel pipe (2) is heated in such a manner that, when it reaches said separating mechanism (25) located at an appropriate position arrived at immediately after a heating process, a bottom layer of said coating resin (3) adjacent to a boundary of said steel pipe (2) reaches a condition separable from said steel pipe (2), that said separating mechanism (25) separates said coating resin (3) from said steel pipe (2) and severs said coating resin (3) along said incision lines (18) and away from said steel pipe (2) into at least two pieces and then guides severed pieces of said coating resin (3) in said running direction thereof, and that said recovering device (40) recovers said resin pieces (3') by smashing said resin pieces that are crushed flat in prescribed processes, including a taking-up process by said take-up device (30).

The invention as recited in Claim 3 relates to a method to separate and recover steel pipe and coating resin from resin-coated steel pipe, intended to process a resin-coated steel pipe (1) which consists of steel pipe (2) and coating resin (3) adhered to an outer surface of said pipe, employing a separating and recovering apparatus having a feeding device (10), a high-frequency induction heating device (20), a separating mechanism (25), a take-up device (30) and a recovering device (40), said feeding device (10) feeding said resin-coated steel pipe (1) of certain length in a running direction thereof thereby passing and heating said resin-coated steel pipe (1) inside or near a high-frequency induction coil (21) of said high-frequency induction heating device (20), said separating mechanism (25), which is located at a certain position reached immediately after a heating process, separating said coating resin (3) from said steel pipe (2), said take-up device (30) taking up said steel pipe (2) in said running direction thereof and said recovering device (40) recovering separated steel pipe (2) and coating resin (3), is characterized in that a cutting means located at a position before said high-frequency induction coil (21) makes incision lines (18) in said coating resin (3) that reach in depth from a surface of said coating resin (3) to said surface of said steel pipe (2) and extend throughout a length of said resin-coated pipe (1) at positions that divide a periphery of said coating resin (3) into at least two parts, that by means of high-frequency induction heating, said steel pipe (2) is heated in such a manner that, when it reaches said separating mechanism (25) located at an appropriate position arrived at immediately after a heating process, a bottom layer of said coating resin (3) adjacent to a boundary of said steel pipe (2) reaches a condition separable from said steel pipe (2), that said separating mechanism (25) separates said coating resin (3) from said steel pipe (2) and severs said coating resin (3) along said incision lines (18) and away from said steel pipe (2) into at least two pieces and then guides severed pieces of said coating resin (3) in said running direction thereof, and that said recovering device (40) recovers said steel pipe (2) after crushing it into a flat condition but maintaining an original length thereof.

In the method to separate and recover steel pipe and coating resin from resin-coated steel pipe according to any of Claim 1–3, the invention recited in Claim 4 is characterized in that by means of high-frequency induction heating, said steel pipe (2) is heated in such a manner that, when it reaches said separating mechanism (25) located at an appropriate position arrived at immediately after a heating process, said layer of said coating resin (3) adjacent to said boundary of said steel pipe (2) reaches a condition separable from said steel pipe (2), but at least said exterior side of said outer layer of said coating resin (3) is kept under a temperature at which softening occurs.

In the method to separate and recover steel pipe and coating resin from resin-coated steel pipe according to any of Claim 1–4, the invention recited in Claim 5 is characterized in that said feeding device (10) is constructed as a feeding roll device (10) consisting of two or more sets of feeding rolls (11,12,13), each of said sets of feeding rolls having a plurality of division rolls (11a•11b,12a•12b,13a•13b), that said feeding roll device (10) has a construction such that a prescribed division roll is given pressing force against said outer periphery of said resin-coated steel pipe (1) toward an axis of said resin-coated steel pipe (1), and a groove formed on a periphery of each of said division rolls engages with said outer periphery of said resin-coated steel pipe (1) and rotates to thereby feed said resin-coated steel pipe (1) in said running direction thereof, that in said set of feeding rolls of said feeding device (10), which have said division roll that is given pressing force against said outer periphery of said resin-coated steel pipe (1) toward said axis thereof and which are arranged to clamp said resin-coated steel pipe (1), at a bottom of grooves of at least two of said division rolls, are provided throughout periphery incision blades (17) of which tips (17a) are protruding, that said tip (17a) of said incision blade (17) protrudes from said bottom of said groove by a height no less than a thickness of said coating resin (3), and that as said feeding device (10) feeds said resin-coated steel pipe (1) in said running direction thereof, said incision blades (17) that are forced against said resin-coated steel pipe (1) make incision lines (18).

In the method to separate and recover steel pipe and coating resin from resin-coated steel pipe according to any of Claim 5, the invention recited in Claim 6 is characterized in that said incision blades (17) are provided in said set of feeding rolls, which includes said division roll (13b) that is given a force toward said axis of said resin-coated steel pipe (1) and is located on a side of said high-frequency induction coil (21).

In the method to separate and recover steel pipe and coating resin from resin-coated steel pipe according to Claim 5 or Claim 6, the invention recited in Claim 7 is characterized in that an edge angle of said incision blades (17) is about 30 degrees or less.

In the method to separate and recover steel pipe and coating resin from resin-coated steel pipe according to any of Claim 1–4, the invention recited in Claim 8 is characterized in that said resin-coated steel pipe (1) is given two incision lines (18), that said take-up device is constructed as a take-up roll device (30') that consists of two or more sets of take-up rolls of which one has as take-up rolls two division rolls which are arranged opposing each other precisely on said incision lines (18,18) to clamp said steel pipe, that said take-up roll device (30') has a construction such that said prescribed division roll is given pressing force against said outer periphery of said steel pipe (2) toward said axis of said resin-coated steel pipe, and said periphery of each of said division rolls thereby engages with said outer periphery of said steel pipe (2) and rotates to take up said steel pipe (2) in said running direction thereof, that a separating mechanism (115) comprises, in said take-up roll device (30'), a set of take-up rolls which, including a division roll (116a,116b) given pressing force toward said axis of said steel pipe (2), are positioned on a side of said high-frequency induction coil (21) and which are either formed or not on a periphery with grooves (116c) of depth about ⅓ to ¼ of a radius of said steel pipe (2) or less, and a run guide (117) provided at a distance from said steel pipe (2) to enclose said steel pipe (2) and that in said take-up roll device (30'), when, on two division rolls (116a,116b) in said set of take-up rolls that is positioned on said side of said high-frequency induction coil (21), portions of said periphery grooves (116c•116c) or said periphery surfaces facing said high-frequency induction coil (21) come in touch with said incision lines (18•18) in said coating resin (3) of said moving resin-coated steel pipe (1), through forces given to said two incision lines (18•18), said coating resin (3) is, starting at a fore end thereof, separated from said steel pipe (2) and severed along said incision lines (18) and away from said steel pipe (2) into two pieces and then guided by said run guide (117) in said running direction thereof.

In the method to separate and recover steel pipe and coating resin from resin-coated steel pipe according to any of Claim 1–4, the invention recited in Claim 9 is characterized in that said separating mechanism (25) is provided between said high-frequency induction coil (21) and said take-up device (30), that said separating mechanism (25) comprises said dividing blades (26b•26b) fixed at positions corresponding to said incision lines (18•18) which divide said coating resin (3) circumferentially into at least two parts in such a manner that pointed tips of said dividing blades oppose said incision lines (18•18) in said coating resin (3) of said resin-coated steel pipe (1), which comes moving in a running direction thereof and said run guide (27) located at a distance from said steel pipe (2) to enclose said steel pipe (2), that as said pointed ends of said dividing blades (26b•26b) strike against said incision lines (18•18) made in said coating resin (3) of said resin-coated steel pipe (1) moving in said running direction, said coating resin (3) is, from said fore end thereof, separated from said steel pipe (2) along said incision lines (18•18) and away from said steel pipe (2), and severed into at least two pieces which are guided by said run guide (27) in said running direction thereof.

In the method to separate and recover steel pipe and coating resin from resin-coated steel pipe according to any of Claim 1–4, the invention recited in Claim 10 is characterized in that said separating mechanism (75) is provided between said high-frequency induction coil (21) and said take-up device, that said separating mechanism (75) comprises a set of severing rolls (76c) consisting of two division rolls (76d•76d) that are arranged to oppose each other at positions corresponding to said incision lines (18•18) to clamp said resin-coated steel pipe (1) and a run guide (27) that is provided at a distance from said steel pipe (2) to enclose said steel pipe (2), and that in said set of severing rolls (76c), at least one division roll is given a force against said outer surface of said steel pipe (2) toward said axis thereof and said two division rolls (76d•76d) rotate with a periphery thereof engaging with said outer surface of said steel pipe (2), that said periphery of each of said two division rolls (76d•76d) is formed into a shape selected as a preferred one for said separating mechanism (75), and that in said set of severing rolls (76c), when portions of said periphery surfaces facing said high-frequency induction coil (21) come in touch with said incision lines (18•18) in said coating resin (3) of said moving resin-coated steel pipe (1), through force given to said two incision lines (18•18), said coating resin (3) is, starting at said fore end thereof, separated from said steel pipe (2) and severed along said incision lines (18) and away from said steel pipe (2) into two pieces, which are then guided by said run guide (27) in said running direction thereof.

In the method to separate and recover steel pipe and coating resin from resin-coated steel pipe according to any of Claim 1–4, the invention recited in Claim 11 is characterized in that said separating mechanism (105) is provided between said high-frequency induction coil (21) and said take-up device, that said separating mechanism (105) comprises a sucking device (106) that has a plurality of sucking surfaces (106b) which, surrounding said resin-coated steel pipe (1), attract an outer surface of said coating resin (3) and a run guide (107) provided at a distance from said steel pipe (2) enclosing said pipe (2), that said plurality of sucking surfaces (106b) diverge in distance therebetween in a direction from said high-frequency induction coil (21) to said take-up device to pull away said coating resin (3) from said steel pipe (2), that as said resin-coated steel pipe (1) which has said coating resin (3) divided into at least two parts moves through said plurality of sucking surfaces (106b) of said sucking device (106), said sucking device (106) attracts each piece of said coating resin (3) and, thereby separating said coating resin (3), starting at said fore end thereof, from said steel pipe (2), sever said coating resin (3) along said incision lines (18) and away from said steel pipe (2) into at least two pieces, which are guided in said running direction thereof by said run guide (107).

In the method to separate and recover steel pipe and coating resin from resin-coated steel pipe according to any of Claim 1–4, the invention recited in Claim 12 is characterized in that said resin-coated steel pipe (1) is given two incision lines (18) at an upper and lower positions, that said separating mechanism (25) is provided with a run guide consisting of right and left guide pieces (27a•27a) located on either side of said steel pipe (2) and a lower piece (27b) located below said pipe (2) at a distance from said pipe (2) to avoid interference with said separating mechanism (25), and that said separating mechanism (25) separates said coating resin (3), starting at said fore end thereof, from said steel pipe (2) and sever said coating resin (3) along said incision lines (18) and away from said pipe (2) into left and right pieces which are guided by said run guide in said running direction thereof.

The invention as recited in Claim 13 relates to an apparatus to separate and recover steel pipe and coating resin from resin-coated steel pipe, intended to process a resin-coated steel pipe (1) which consists of steel pipe (2) and coating resin (3) adhered to an outer surface of said pipe (2), comprising a feeding device (10) which feeds said resin-coated steel pipe (1) of any length in a running direction thereof, a high-frequency induction heating device (20) which heats said resin-coated steel pipe (1) passing inside or near a high-frequency induction coil (21), a separating mechanism (25) which, provided at an appropriate position reached by said moving resin-coated steel pipe (1) immediately after passing an induction coil (21), separates said coating resin (3) from said steel pipe (2), a take-up device and a recovering device (40) which recovers steel pipe (2) and coating resin (3) in segregated condition, is characterized in that a means is provided at a position before said high-frequency induction coil (21) to make incision lines (18) in a surface of said resin-coated steel pipe (1) at locations for division into at least two pieces in such a manner that said incision lines (18) reach in depth from said surface of said coating resin (3) to said surface of said steel pipe (2), that said high-frequency induction heating device (20) is capable of heating said steel pipe (2) by means of high-frequency induction into a condition such that, at a position of said separating mechanism (25), a bottom layer of said coating resin (3) adjacent to a boundary of said steel pipe (2) is separable from said steel pipe (2), and that said separating mechanism (25) is constructed in such a manner as to be able to separate said coating resin (3), starting at a fore end thereof, from said steel pipe (2) and sever said coating resin along said incision lines (18) and away from said steel pipe (2) into at least two pieces.

BRIEF DESCRIPTION OF THE DRAWINGS

FIG. 12 is a right side view of the separating mechanism of FIG. 10;

FIG. 16 is a sectional view taken at C—C line of FIG. 3;

FIG. 17 is an enlarged view of G part of FIG. 16;

FIG. 18 is an enlarged front view of the part of FIG. 1 ranging from the steel pipe recovering part through the front part of the smashing device;

FIG. 31 is a right side view of the separating mechanism of FIG. 29;

THE MOST PREFERRED EMBODIMENT OF THE INVENTION

Figure 1:
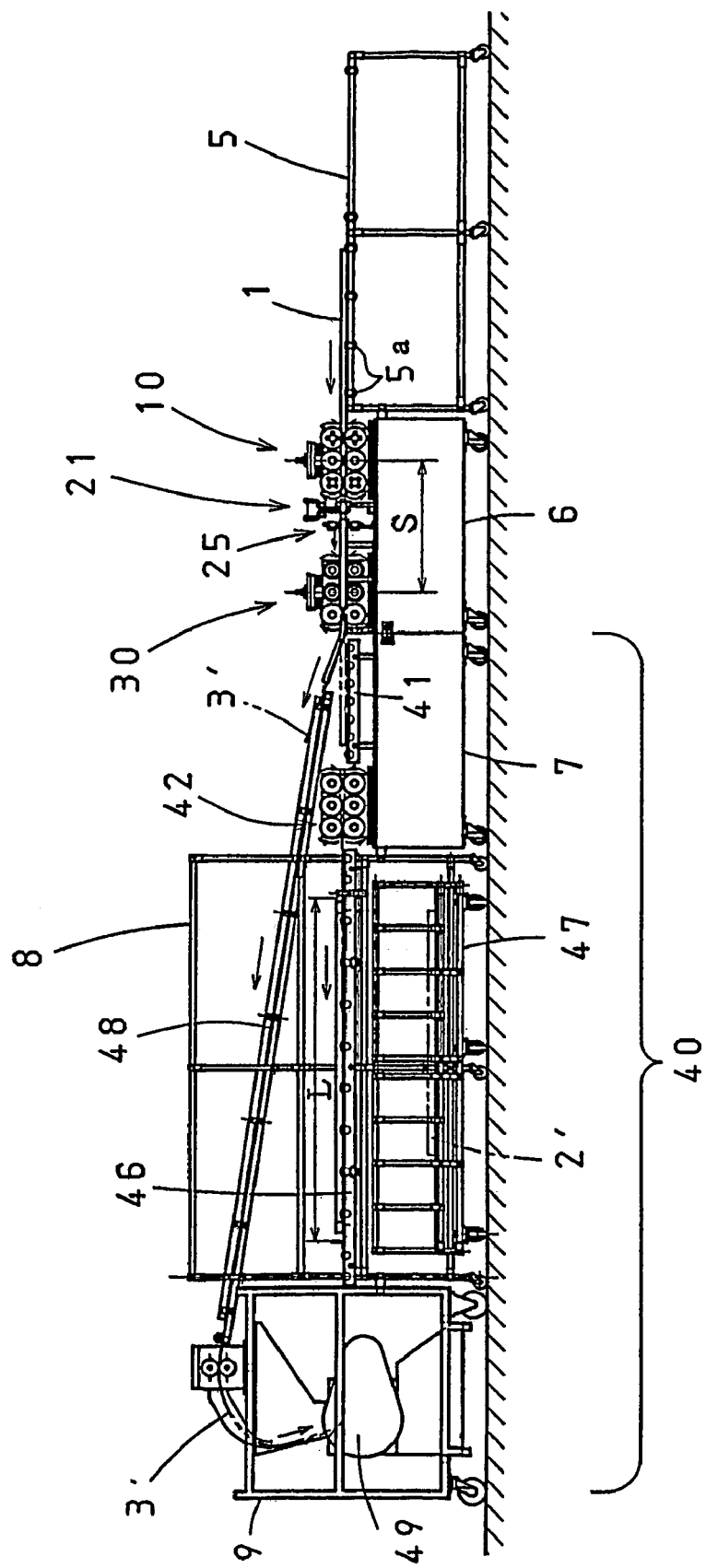
FIG. 1 is a front view of the first embodiment of the apparatus to separate and recover steel pipe and coating resin from resin-coated steel pipe according to the present invention.
Figure 2:
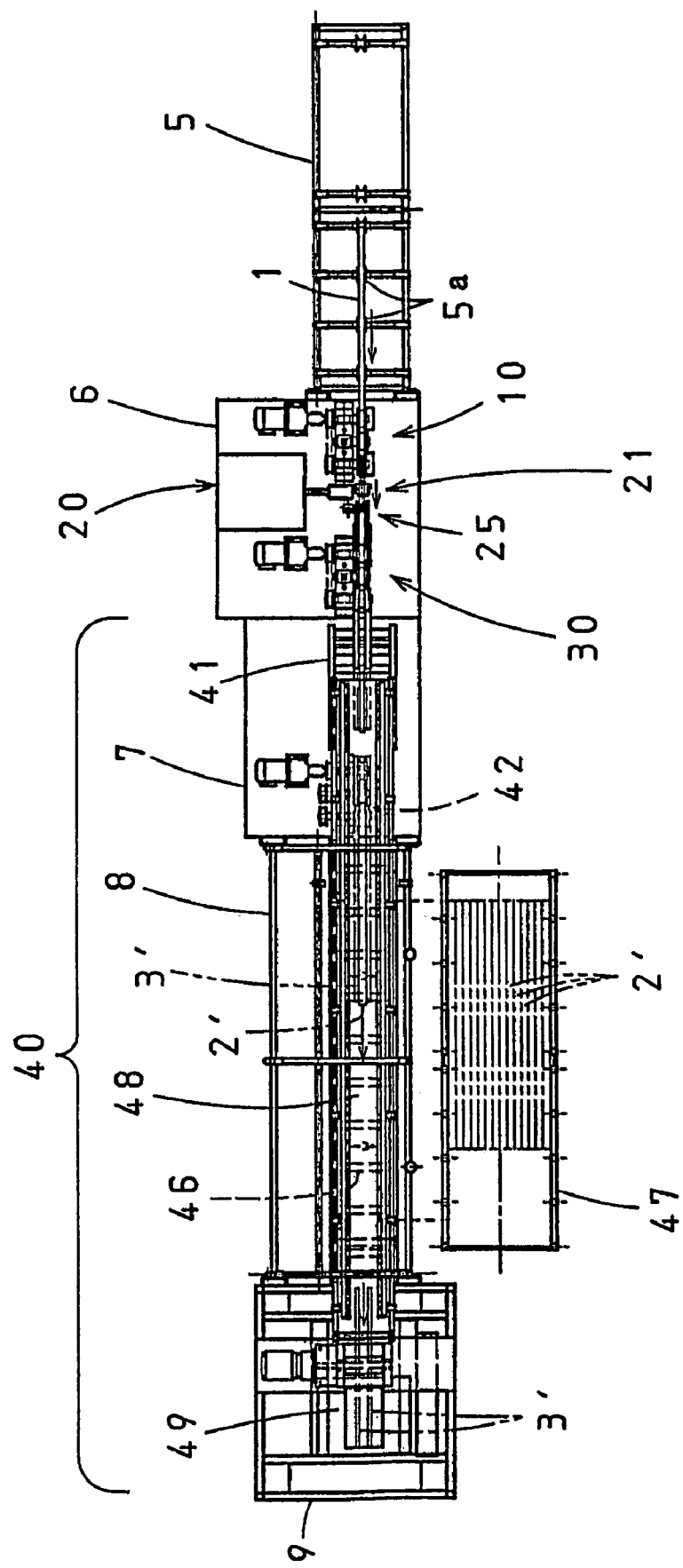
FIG. 2 is a plan view of the separating and recovering apparatus of FIG. 1.
Figure 48:
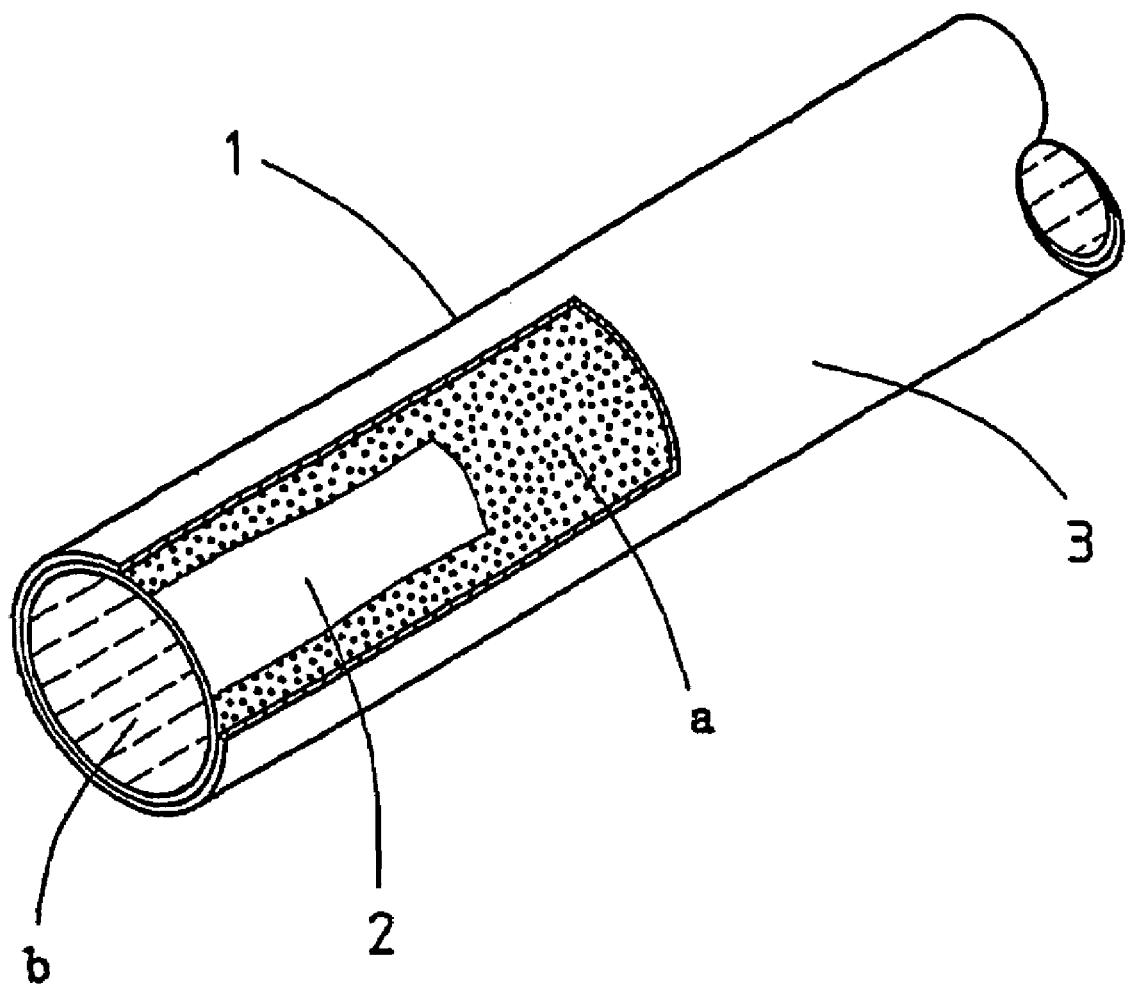
FIG. 48 is a diagonal view showing a resin-coated steel pipe with a portion broken away.

FIGS. 1 and 2 are a front and a plan view showing the whole of the first embodiment of the separating and recovering apparatus to practice the method to separate and recover steel pipe and coating resin from resin-coated steel pipe stated in Claim 1, and FIG. 48 shows a resin-coated steel pipe 1 processed pursuant to the first embodiment of the separating and recovering apparatus.

The resin-coated steel pipe 1 shown in FIG. 1 consists of an adhesion layer a made by spreading an adhesive on the outer surface of steel pipe 2 and coating resin 3 of uniform thickness made of AAS resin or ABS resin coating over the adhesion layer. On the inner surface of the steel pipe is painted an antirust paint as a thin film to form an antirust layer b.

In FIGS. 1 and 2, from back to fore in the running direction of the resin-coated steel pipe 1 or the steel pipe 2, numeral 5 designates a feeder support, 6 designates a main part support, 7 a coupling part support, 8 a steel pipe recovering part support, and 9 designates a smasher support.

Casters (not designated by symbols) can be provided on the feet of each of the supports 5,6,7,8,9, to facilitate operations such as moving, shipping, carrying, and installing. Further, the supports 5,6,7,8,9 are aligned to form a straight run course for the resin-coated steel pipe 1 or the steel pipe 2 and each adjacent pair thereof is connected with appropriate connections 100a,100b (FIG. 1–4).

As shown in FIGS. 1 and 2, on the feeder support 5 of the supports 5,6,7,8,9, a plurality of feeding rolls 5a are provided in series in the running direction of the resin-coated steel pipe 1 to supply the resin-coated steel pipe of an arbitrary length to the run course thereof and for the purpose guide the resin-coated steel pipe 1 straight in the direction of the axis thereof.

Figure 10:
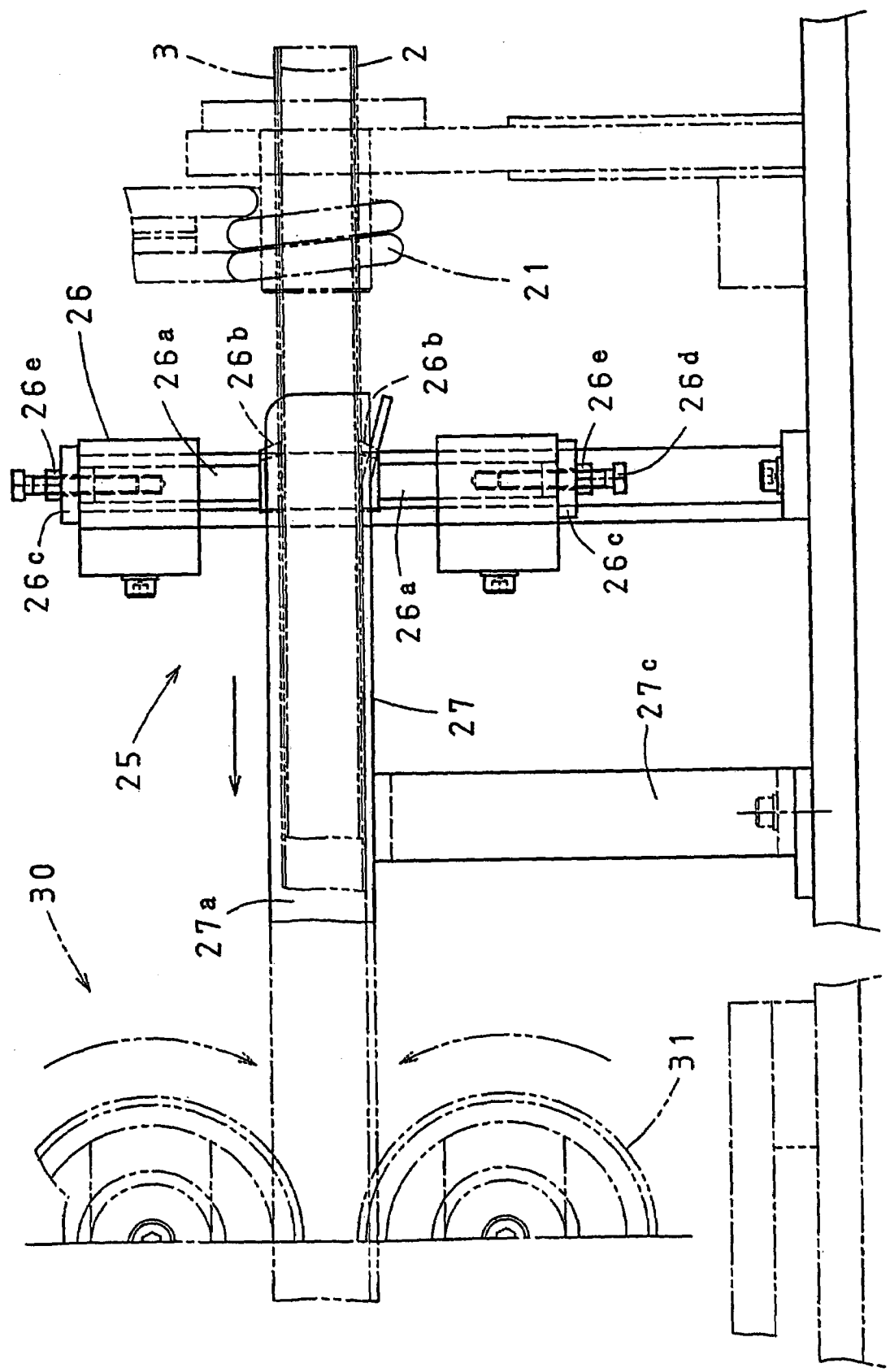
FIG. 10 is an enlarged front view of the separating mechanism of FIG. 3.
Figure 11:
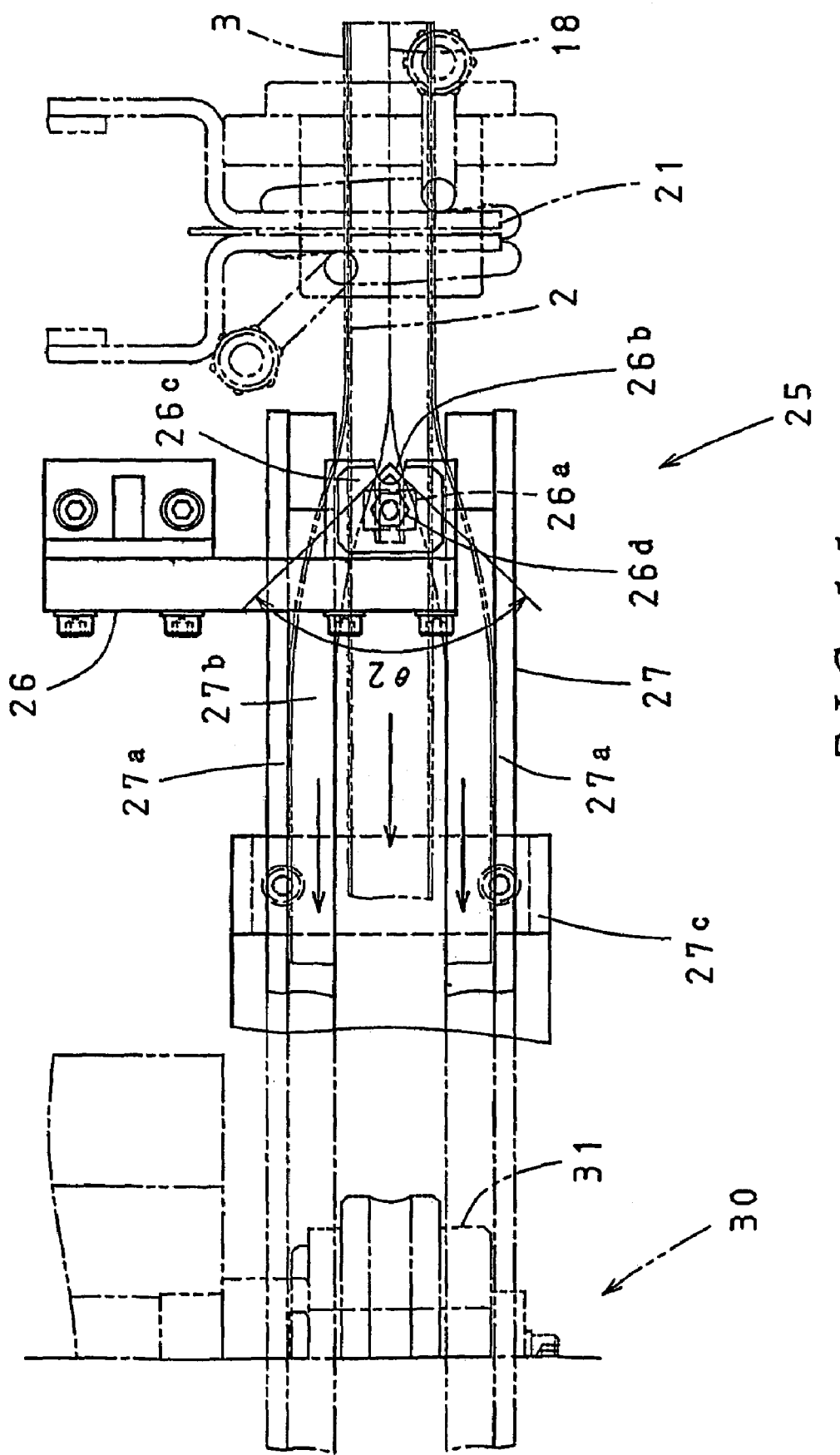
FIG. 11 is a plan view of the separating mechanism of FIG. 10.
Figure 13:
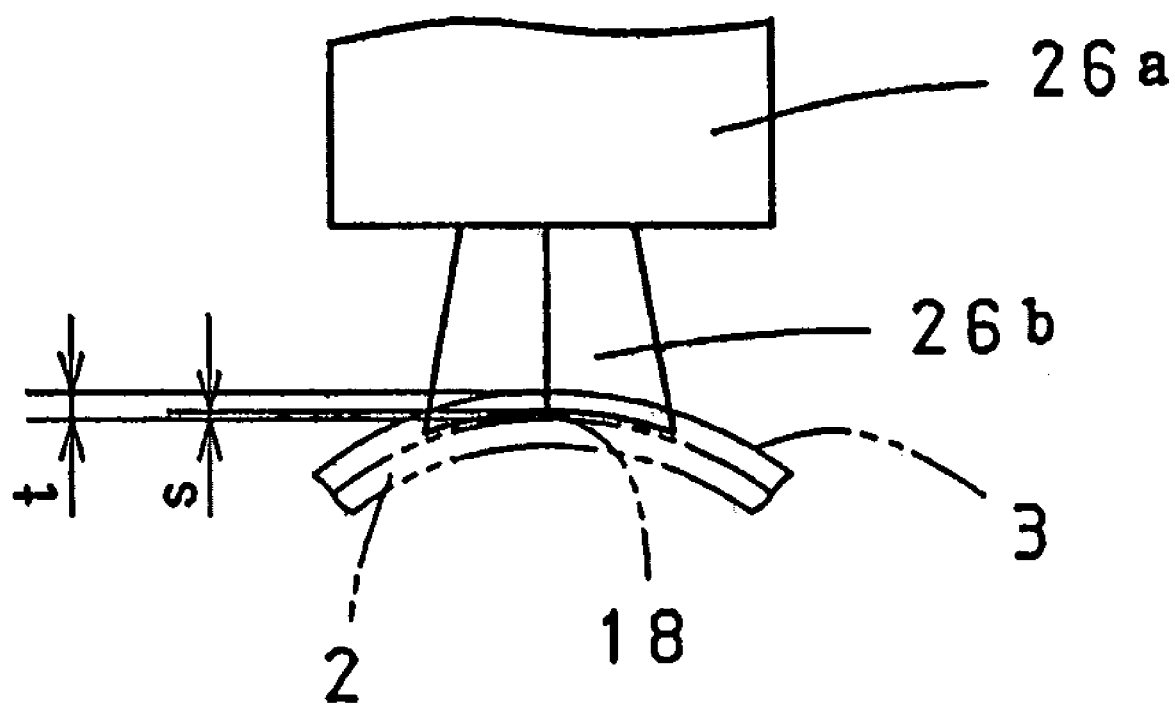
FIG. 13 is an enlarged view of E part of FIG. 12.
Figure 14:
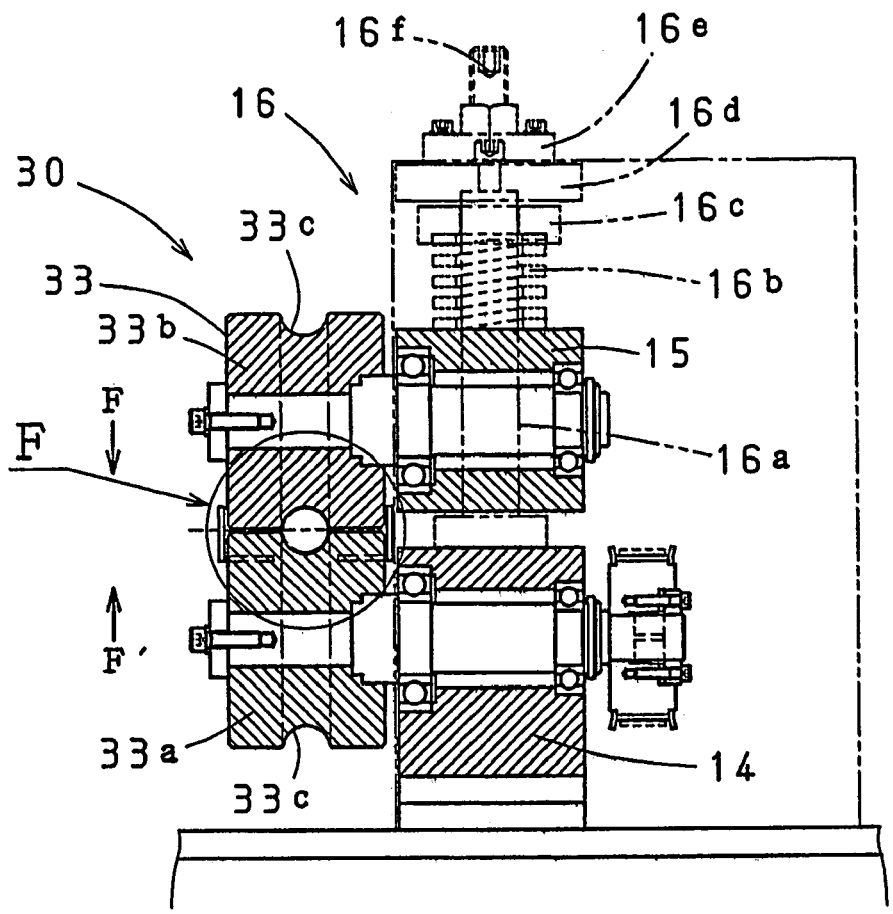
FIG. 14 is a sectional view taken at B—B line of FIG. 3.
Figure 15:
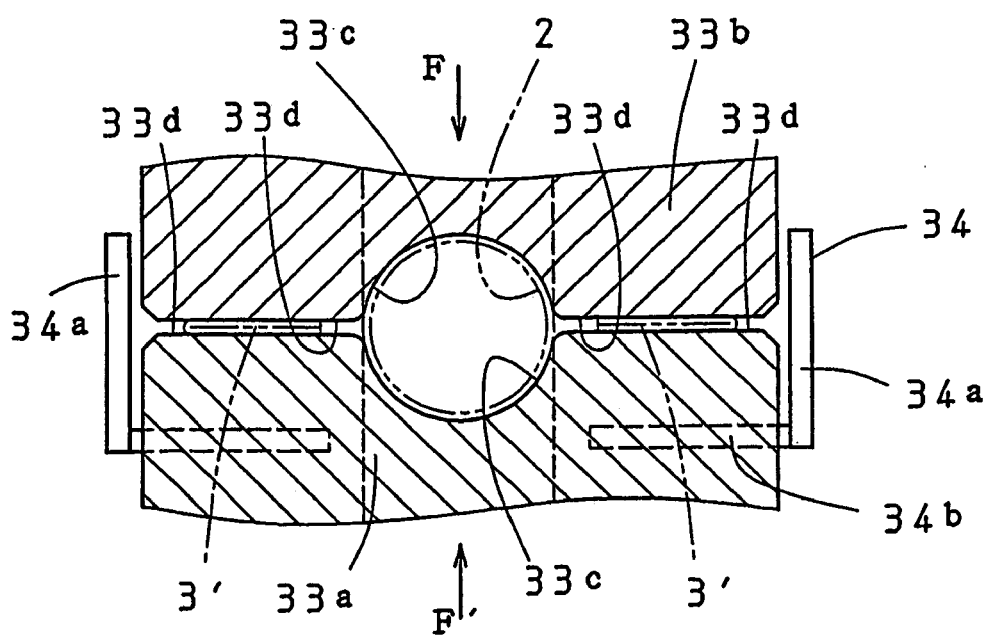
FIG. 15 is an enlarged view of F part of FIG. 14.

On the main part support 6 are provided, from back to fore in the running direction of the resin-coated steel pipe 1 or the steel pipe 2, a feeding roll device 10 (having a means to make incision lines) to feed the resin-coated steel pipe 1 of an arbitrary length in the running direction thereof, a high-frequency induction heating device that heats the resin-coated steel pipe 1 as the pipe passes inside or near a high-frequency induction coil 21, a separating mechanism 25 (including a first run guide 27 as the rear part of the run guide; see FIGS. 10–12), which, provided at an appropriate position reached immediately after passing the high-frequency induction coil 21, separates the coating resin 3 from the steel pipe 2 and severs the coating resin 3, a take-up roll device 30 (including take-up rolls 33 that crush flat the coating resin 3; see FIGS. 13–15), which takes up the steel pipe 2, and a second run guide 34, which, as the fore part of the run guide, guides the flattened coating resin 3' (see FIGS. 3,4,14 and 15).

A first roller conveyer 41, and ahead of the conveyer 41, a crushing device to crush the steel pipe 2 having three sets of crushing rolls 43,44 and 45 (see FIGS. 16 and 17) are provided on the coupling part support 7.

A second roller conveyer 46 at an intermediate height, a trolley 47 for recovering steel pipe at a lower position and a belt conveyer 48 at a higher position are provided on the steel pipe recovering part support 8.

A smasher 49 is mounted at a lower position of the smasher support 9.

The recovering device 40 comprises the coupling part support 7, the steel pipe recovering support 8, the smasher support 9 and the devices and members provided on the supports 7,8,9, and serves the purpose to recover the separated steel pipe 2 and the coating resin 3 in a segregated condition.

This separating and recovering apparatus is provided with a cutting means (consisting of, for example, division rolls 13a,13a and incision blades 17,17 in the feeding roll device 10; see FIGS. 6–9) located at a position reached before the high-frequency induction coil 21 is passed to make incision lines 18 (see FIGS. 7,9 and 11) in the coating resin 3 that reach in depth from the surface of the coating resin 3 to the surface of the pipe 2 and extends throughout the length of the pipe 1 at upper and lower locations on the periphery of the coating resin 3 thereby to divide the coating resin 3 into two pieces.

The number and locations of the incision lines 18 are not limited to two or to upper and lower positions.

The high-frequency induction heating device 20 can heat through high-frequency induction heating the steel pipe 2 to a condition that, at the separating mechanism 25, the boundary part of the coating resin 3 is ready to be separated from the steel pipe 2.

The separating mechanism 25 has a construction that enables it to separate the coating resin 3, starting at the fore end thereof, from the steel pipe 3, and sever the coating resin 3 along the incision lines 18 and away from the steel pipe 2 into two right and left pieces (the invention stated in Claim 13).

Each of the severed pieces of the coating resin 3 is guided in the running direction of the pipe by the run guide (the first run guide 27 which, as the rear part of the run guide, severs to guide the coating resin 3 separated from the steel pipe 2 and severed).

The steel pipe 2' and the coating resin 3' are flattened after separation and are recovered in a segregated condition by the recovering device 40.

The separating and recovering apparatus first makes incision lines 18 in the coating resin 3 that reach in depth from the surface of the coating resin 3 to the surface of the pipe 2 and extends throughout the length of the pipe 1 at upper and lower locations on the periphery of the coating resin 3 by means of a cutting means located at a position reached before the high-frequency induction coil 21 is passed, and thereby divides the coating resin 3 into two right and left pieces.

Then, the separating and recovering apparatus heats through high-frequency induction heating the steel pipe 2 to a condition that, at the separating mechanism 25 provided at a position reached immediately after passing the high-frequency induction coil 21, the boundary part of the coating resin 3 is ready for separation from the steel pipe 2.

Next, by means of the separating mechanism 25, the separating and recovering apparatus separates the coating resin 3 from the steel pipe 2 and severs the coating resin 3 along the incision lines 18 and away from the steel pipe 2 and severs the coating resin 3 along the incision lines 18 and away from the steel pipe 2 into at least two pieces (the invention stated in Claim 1).

The run guide 27 guides the severed pieces of the coating resin 3 in the running direction of the pipe.

Then, the recovering device 40 recovers in segregated condition the steel pipe 2' and the coating resin pieces 3', both of which are flattened after separation.

FIGS. 3 through 20 show the first embodiment of the separating and recovering apparatus.

As for example, the resin-coated steel pipe 1 has an outer diameter of 27.7 mm; the steel pipe 2 is of SPCC (JIS G 3141 cold rolled steel plate and sheet; for general use); the steel pipe 2 is 25.5 mm in outer diameter and 0.7 mm in thickness; the material of the coating resin 3 is AAS or ABS having a melting temperature of 160° C.–200° C. and the thickness is 1.1 mm; the thickness of the acrylic rubber adhesive as the adhesion layer a is 0.02 mm–0.03 mm; the softening temperature of AAS or ABS resin is 120° C.–140° C. and the melting temperature of the adhesive is 150° C.–160° C.

With the conditions stated above, the running speed of the resin-coated steel pipe 1 moved by the feeding roll device 10 and the take-up roll device 30 is set to about 10 m/minute.

The running speed of 10 m/minute means that, using the separating and recovering apparatus described in detail in the following, the resin-coated steel pipe 1 will be, when arriving at the separating mechanism 25, in such conditions that due to the high-frequency induction heating the adhesive is kept in a melted state while the outer layer of the coating resin 3 separated from the steel pipe 2 and severed is not softened, with a surface temperature of 50° C.–60° C., which is nearer to normal temperature than softening temperature, maintaining the rigidity sufficient to remain solid.

In other words, with this running speed, the coating resin 3 can attain the preferred condition in which the layer of the coating resin 3 adjacent to the boundary of the steel pipe 2 has, at the separating mechanism 25, a temperature high enough to allow it to be separable from the steel pipe, while at least the outer layer part of the coating resin 3 is kept at a temperature lower than necessary for softening (the invention stated in Claim 4).

Owing to the fact described above, the pieces of the coating resin 3 are left with sufficient rigidity and easily guided in the determined direction by the guide in the processes beginning with the separating mechanism 25, and can be easily recovered. With reference mainly to FIGS. 6–9, the first feeding device provided in the running course of the resin-coated steel pipe 1 is described below.

The feeding device is shown as the feeding roll device 10 having three sets of feeding rolls 11,12,13, which, arranged in series in the running direction of the resin-coated steel pipe 1, consist of pairs of division rolls 11a•11b, 12a•12b and 13a•13b, respectively provided at upper and lower points opposing each other to clamp the resin-coated steel pipe 1.

The feeding roll device 10 has a force-adjusting mechanism 16 to impose force on a prescribed division roll against the outer surface of the resin-coated steel pipe 1 toward the axis thereof and the groove formed on the periphery of each of the division rolls 11a•11b,12a•12b,13a•13b engages with the outer surface of the resin-coated steel pipe 1 for rotation and thereby feed the resin-coated steel pipe 1.

As a means to make incision lines, in the feeding roll device 10, the set of feeding rolls, including the roll that is given pressing force toward the axis of the resin-coated steel pipe 1, is provided with incision blades 17 at the bottom of the grooves of the rolls located at the upper and lower positions opposing each other, in such a manner as to protrude from the bottom by a height no less than the thickness of the coating resin 3.

Figure 6:
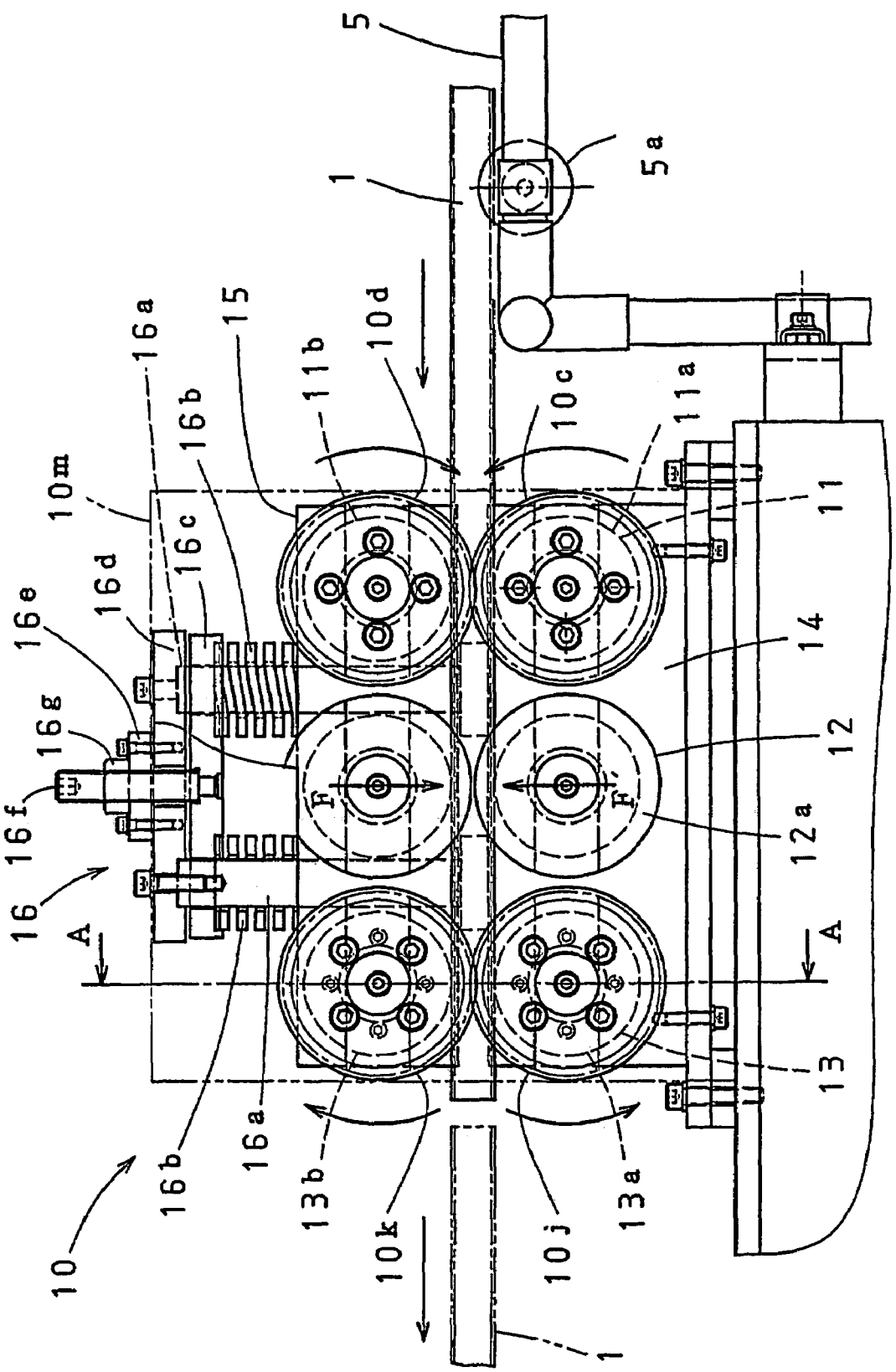
FIG. 6 is an enlarged front view of the feeding roll device of FIG. 3.
Figure 8:
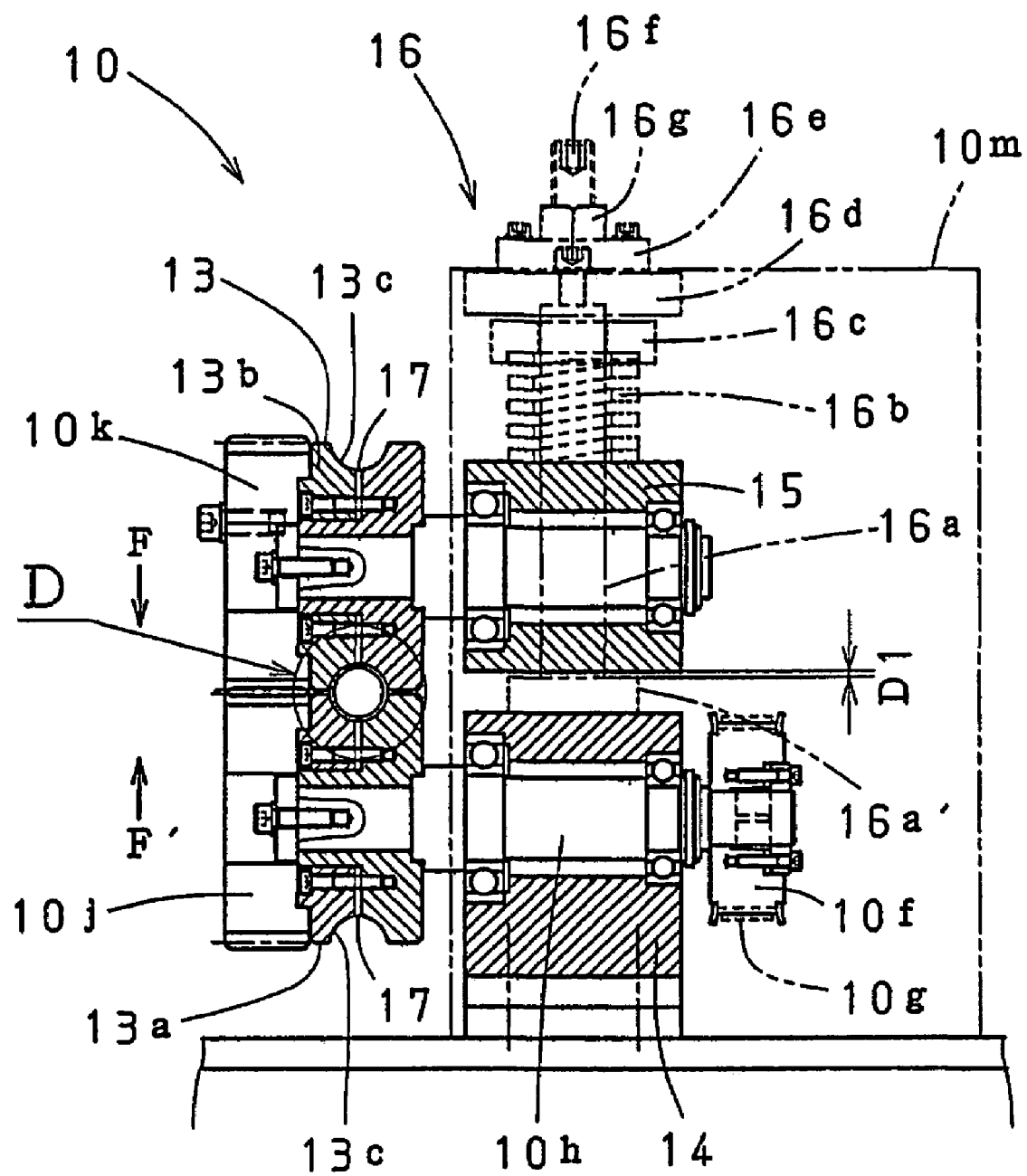
FIG. 8 is a sectional view taken at A—A line of FIG. 6.
Figure 9:
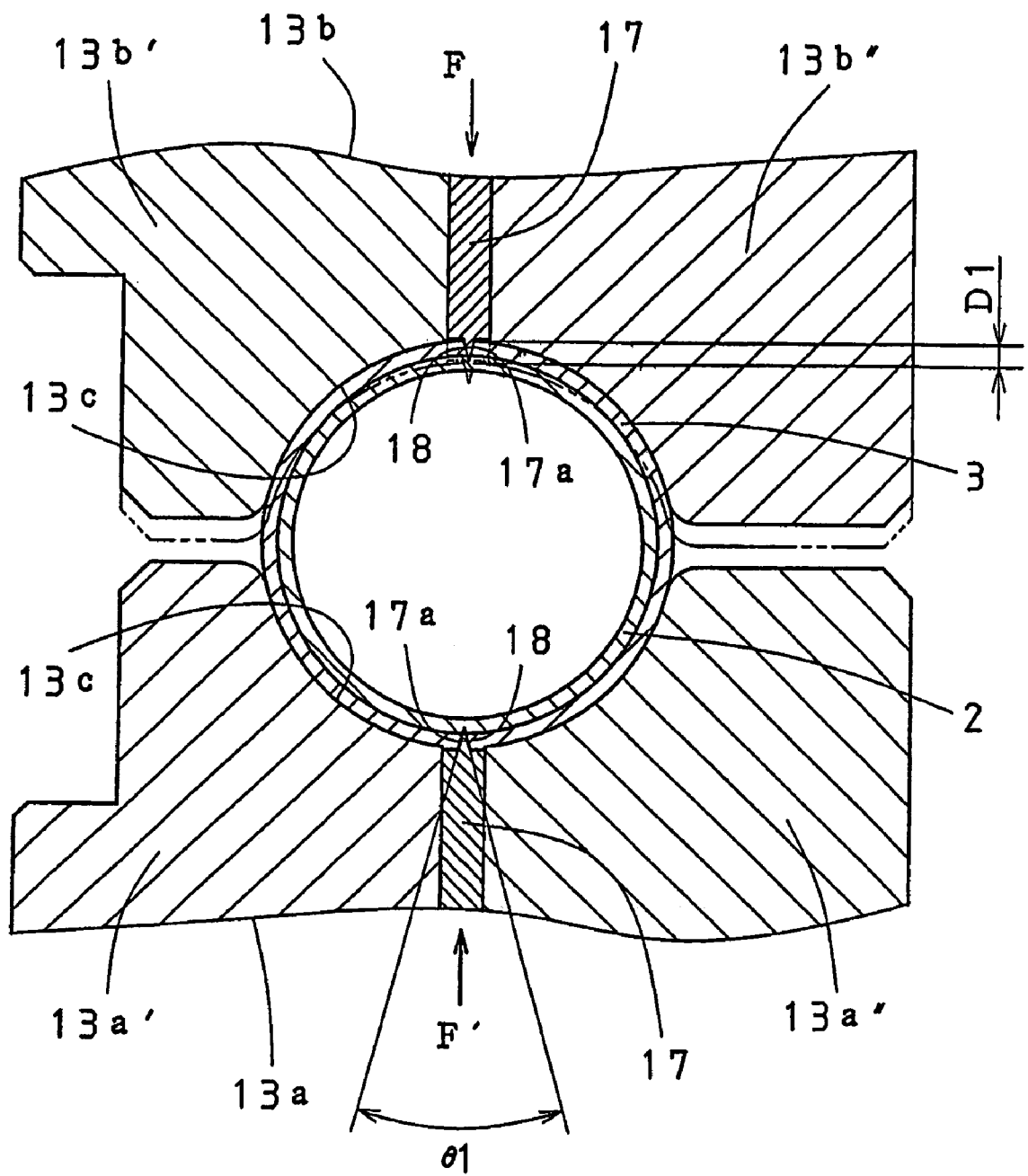
FIG. 9 is an enlarged view of D part of FIG. 8.

As the feeding roll device 10 feeds the resin-coated steel pipe 1 in the running direction thereof, the incision blades 17 make incision lines 18 using the pressing force provided, (see FIGS. 6,8 and 9).

The number of sets of the feeding rolls is, however, not limited to three but can be two or four, or more. Moreover, the arrangement and number of the division rolls are not limited to only the upper and lower location and two rolls. And accordingly the arrangement and number of the incision lines are not limited to the upper and lower locations and two lines. Further, the number of the sets of feeding rolls including the roll given the pressing force toward the axis of the resin-coated steel pipe 1 is not limited to three.

In any event, the incision blades 17 as the means to make incision lines 18 are incorporated in one set of the feeding rolls, (in accordance with the invention stated in Claim 5).

The incision blades 17 are preferably provided in the set of rolls 13 that includes the division roll 13b, which is given the pressing force toward the axis of the resin-coated steel pipe 1 and is positioned on the side of the high-frequency induction coil 21, (see FIGS. 6,8 and 9; the invention stated in Claim 6).

The incision blades 17 preferably have an edge angle of about 30 degrees or less, (see FIG. 9; the invention stated in Claim 7).

The embodiment of the feeding roll device 10 is described below in detail with reference to FIG. 6.

The feeding roll device 10 comprises a fixed block 14, which is fixed on the main part support 6, a movable block 15, which is provided above the fixed block 14 and is vertically movable, and three sets of feeding rolls 11,12,13. The three sets of the feeding rolls 11,12,13 have two division rolls 11a•11b,12a•12b,13a•13b, respectively, as a set of the feeding rolls located at the upper and lower positions opposing each other to clamp the resin-coated steel pipe 1, and the lower rolls 11a,12a,13a are incorporated in the fixed block 14 while the upper rolls 11b,12b,13b are incorporated in the movable block 15. On the periphery of each of the division rolls 11a•11b, 12a•12b, 13a•13b is formed a groove 11c or 12c or 13c having the same curvature as the outer periphery of the resin-coated steel pipe 1.

A force-adjusting mechanism 16 is incorporated in the combination of the fixed block 14 and the movable block 15.

This force-adjusting mechanism 16 serves the purpose of feeding the resin-coated steel pipe 1 in the running direction thereof and making the incision lines 18 by giving a constant and strong force on each of the division rolls 11b,12b,13b incorporated in the movable block 15, in order to have them pressed firmly against the surface of the resin-coated steel pipe 1, even when the resin-coated steel pipe 1 has local uneven portions on the surface, partial losses of the coating resin 3 or foreign substances stuck thereon.

Figure 7:
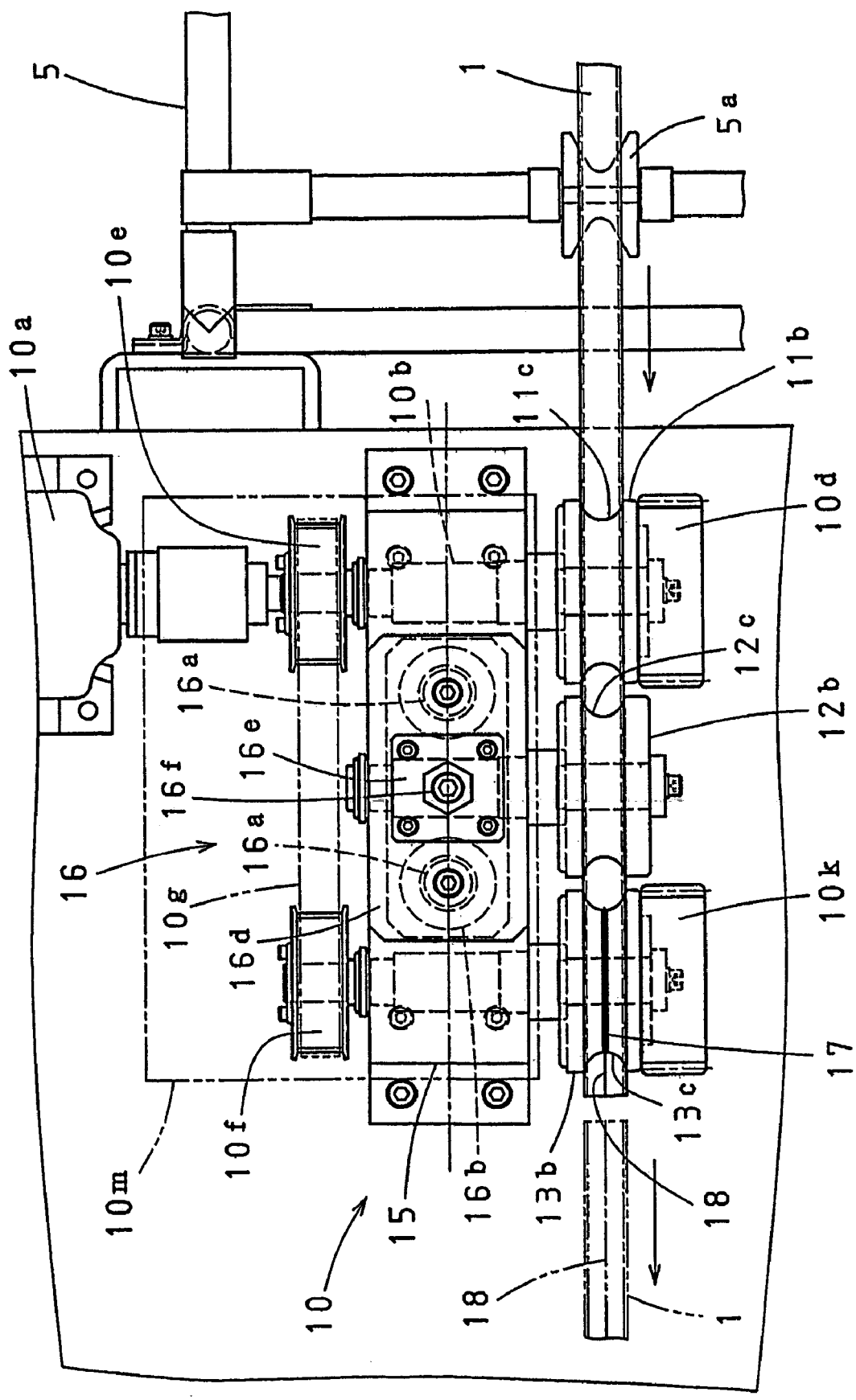
FIG. 7 is a plan view of the feeding roll device of FIG. 6.

For this purpose, four gears 10c,10d,10j and 10k are incorporated in the feeding roll device 10 to transmit the torque from a motor 10m to the two division rolls 11b,13b, (see FIGS. 6–8; in the take-up roll device 30 to take up the steel pipe 2, gears are not necessarily needed; also the compression coil spring 16b is not required to be as strong as in the feeding roll device 10).

On the fixed block 14, vertical axles 16a•16a, which have a greater diameter at the bases 16a'•16a' thereof, are provided and the axles 16a•16a protrude above the upper surface of the movable block 15. Compression coil springs 16b•16b are placed on the upper half portions of the axles 16a•16a and on the upper surface of the movable block 15, and on each of the springs 16b•16b is placed a push plate 16c. A fixed plate 16d is provided on the upper end surfaces of the vertical axles 16a•16a and secured to the upper end surfaces of the vertical axles 16a•16a by means of bolts.

At the center of the push plate 16c, a force-adjusting bolt 16f, capable of rotating relative to the push plate 16c, stands and extends through the fixed plate 16d in such a way that the upper half of the force-adjusting bolt 16f protrudes above the fixed plate 16d. On the upper surface of the fixed plate 16d, a female screw plate 16e is screwed on the upper half of the force-adjusting bolt 16f and is bolted down to the fixed plate 16b. On the female screw plate 16e is screwed a lock nut 16g.

The way in which the lower surface of the movable block 15 is pressed against the upper surfaces of the bases 16a'•16a' of the vertical axles 16a•16a, determines the limit of advance (the lower limit) of the division rolls 11b,12b,13b incorporated in the movable block 15.

At the limit position of advance of each of the division rolls 11b,12b,13b, the bottom of each of the periphery grooves 11c,12c,13c of the division rolls 11b,12b,13b is set to protrude in the direction toward the axis of the resin-coated steel pipe 1 by a quantity greater than the thickness of the coating resin 3, 1.5–2.0 mm, for example, from the surface of the moving resin-coated steel pipe 1 to cope with the case of a partial loss of the coating resin 3, (see the symbol D1 in FIGS. 8 and 9).

With the above force-adjusting mechanism 16, the force-adjusting bolts 16f•16f are raised or lowered to adjust compression of the compression coil springs 16b•16b and, through adjustment of the force given to each of the division rolls 11b,12b,13b incorporated in the movable block 15, the desired force (the symbol F in FIGS. 8 and 9) exerted by the division rolls 11b,12b,13b against the surface of the resin-coated steel pipe 1 toward the axis is obtained. Then, by firmly tightening the lock nut 16g on the force-adjusting bolt 16, the degree of the pressing force F can be fixed.

The division rolls 11a,12a,13a incorporated in the fixed block 14 exert force F' of the same magnitude as F, that is, the reaction force of F, against the resin-coated steel pipe 1 toward the axis thereof.

The mechanism to give force to the prescribed division rolls is not limited to that shown in the drawings, and other compositions, such as using, for example, tension coil springs instead of the compression coil springs 16b•16b is also possible.

The incision blades 17•17 as a means to make incision lines are described below.

In on set of the three feeding rolls 11,12,13, preferably in the third set, that is, the feeding rolls 13 located on the side of the high-frequency induction coil, incision blades 17•17 as a means to make incision lines are provided at the center of the bottom of the periphery grooves 13c•13c of the two division rolls 13a, 13b located at the upper and lower positions opposing each other, each forming a ring sandwiched by the right and left portions 13a'•13a", 13b'•13b" of the rolls 13a•13b in such a manner that the blade edge 17a of each of the incision blades 17•17 protrudes from the bottom of the periphery groove 13c by a height no less than the thickness of the coating resin 3. The incision blades 17•17 are formed so as to have an edge 17a with an edge angle not greater than about 30 degrees, (see in FIGS. 6,8 and 9 and the symbol θ1 in FIG. 9).

According to the construction of the feeding roll device 10 described above, at the position before passing the high-frequency induction coil 21, the incision blades 17•17, which are already given forces F and F''' from at least two division rolls 13a•13b, can make the incision lines 18 that reach in depth from the surface of the coating resin 3 to the surface of the steel pipe 2 and thereby divide the coating resin 3 precisely into two, right and left (circumferential) pieces.

Hence, the divided coating resin 3 can be kept securely in the state of being divided into right and left pieces after passing the high-frequency induction coil 21, (in accordance with the invention stated in Claim 5).

The incision blades 17, as a means to make incision lines, are provided in a set of feeding rolls of the feeding roll device 10. Owing to this, the apparatus can avoid becoming bulky and the manufacturing cost can thereby be saved, (in accordance with the invention stated in Claim 5).

Further, the feeding roll device 10 consists of three sets of feeding rolls 11,12 and 13, and the incision blades 17•17 are provided on the set of feeding rolls 13 located on the side of the high-frequency induction coil 21 having the division rolls 13a•13b given the forces F,F' toward the axis of the resin-coated steel pipe 1, (see FIGS. 6,8, and 9).

Owing to this arrangement, the incision blades 17•17 can make the incision lines 18 while the resin-coated steel pipe 1 is moving stably supported by the rear two sets of the feeding rolls 11 and 12, which means that the operation of making the incision lines 18 itself is accomplished in a stable fashion, (in accordance with the invention stated in Claim 6).

The edge angle of the edges 17a•17a of the incision blades 17•17 is not greater than 30 degrees. The edges 17a•17a of the incision blades 17•17, therefore, neatly cut the coating resin 3 into two pieces without squashing the lines of incision, (see FIG. 9; the invention stated in Claim 7).

Figure 5:
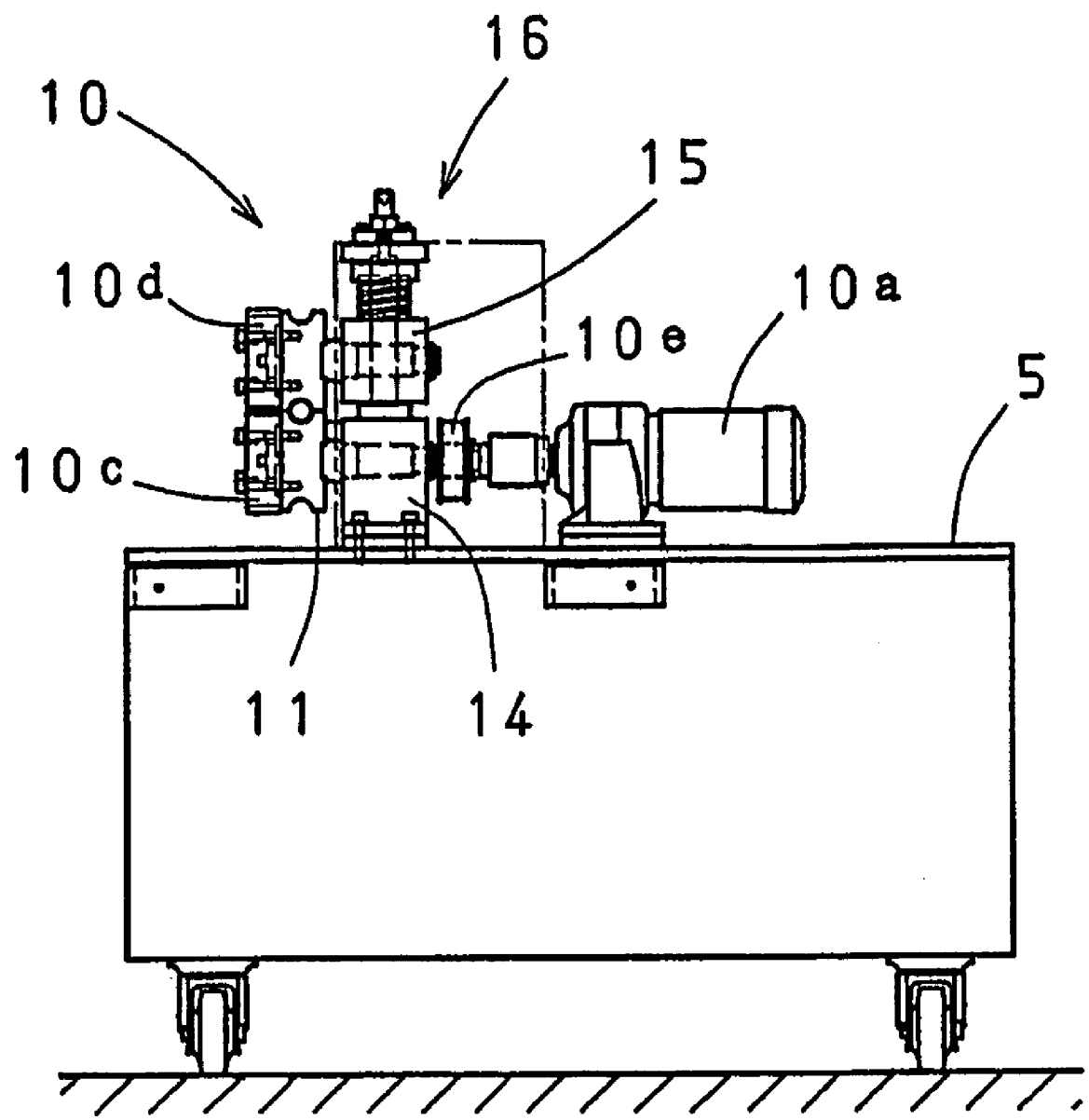
FIG. 5 is a right side view of the main part of FIG. 3.

In FIGS. 5,6 and 7, symbols 10a and 10b designate a motor and a shaft respectively, 10c•10d designate gears, 10e•10f are timing pulleys, 10g is a timing belt, 10j•10k also designate gears and 10m is a safety cover.

The high-frequency induction heating device 20 and the high-frequency induction coil 21 are almost the same as described in the explanation of the previous art and the description thereof is omitted herein.

However, it should be noted that in the resin-coated steel pipe 1, the steel pipe 2 is heated by means of high-frequency induction heating to such a condition that when the steel pipe 2 reaches the separating mechanism 25 located at an appropriate position arrived at immediately after heating process, the boundary layer of the coating resin 3 reaches a separable condition from the steel pipe 2, while the outer layer of the coating resin 3, at least the outer half thereof, is kept under the softening temperature, (according to the invention of Claim 4).

The separating mechanism 25 is described below with reference to FIGS. 10–13.

The separating mechanism 25 is provided independently between the high-frequency induction coil 21 and the take-up roll device 30.

The separating mechanism 25 comprises the dividing blades 26b•26b fixed at the upper and lower positions at which the coating resin 3 is divided in such a manner that the pointed tips of the dividing blades 26b,26b oppose the incision lines 18•18 in the coating resin 3 of the resin-coated steel pipe 1 moving in the running direction thereof and the first run guide 27 (the rear part of the run guide) provided at a distance from and enclosing the resin-coated steel pipe 1.

By applying the pointed edges of the dividing blades 26b•26b against the incision lines 18•18 in the coating resin 3 of the resin-coated steel pipe 1 moving in the running direction thereof, the separating mechanism 25 separates the coating resin 3, starting from the fore end thereof, from the steel pipe 2 and severs the resin 3 along the incision lines 18•18 and away from the resin-coated steel pipe 1 into two, right and left pieces which are guided by the run guide 27 in the running direction of thereof.

The arrangement and number of the incision lines 18•18 and the dividing blades 26b•26b are, however, not limited to the upper and lower positions or to only two (the invention stated in Claim 9).

An embodiment of the separating mechanism 25 is described below in detail with reference to FIGS. 6–9.

The separating mechanism 25 described above comprises the dividing blades 26b•26b and the first run guide 27. In the event the dividing blades 26b•26b are provided, on the main body 26 fixed on the main part support 6 are mounted adjustable angle axles 26a•26a to be vertically adjustable, and respectively support the dividing blades 26b•26b arranged at the upper and lower positions opposing each other to clamp the resin-coated steel pipe 1. The upper and lower adjustable angle axles 26a•26a have the fore ends thereof protruding from the outer surface of the main body 26 to support the dividing blades 26b•26b on the fore end surfaces thereof and have the rear ends recessed by a suitable dimension from the outer surface of the main body 26. On the rear end surfaces of the adjustable angle axles 26a•26a are provided fit plates 26c•26c, and adjust bolts 26d•26d extend through the fit plates 26c•26c at the centers thereof to be screwed to the rear ends of the adjustable angle axles 26a•26a. Further, at the back of the fit plates 26c•26c, lock nuts 26e•26e are provided.

In the composition having the dividing blades 26b•26b described above, suitable positions of the dividing blades 26b•26b are first determined by vertically advancing or retracting the adjust bolts 26d•26d and through the adjustable angle axles 26a•26a by adjusting the positions of the dividing blades 26b•26b in the direction toward the axis of the resin-coated steel pipe 1. Then, the determined positions are fixed by fastening the lock nuts 26e•26e.

In this fixed condition, the pointed ends (θ2=90 degrees in FIG. 11) of the dividing blades 26b•26b are aligned to the incision lines 18•18 of the resin-coated steel pipe 1 moving in the running direction thereof.

The position of the pointed ends of the dividing blades 26b•26b in the axial direction of the resin-coated steel pipe 1 is set in such a manner that when the thickness of the coating resin 3 is 1.1 mm (the symbol t in FIG. 13), the inner surface of each of the dividing blades 26b•26b and the outer surface of the steel pipe has a clearance of 0.2 mm–0.3 mm (the symbol s in FIG. 13) in between.

The first run guide 27, enclosing the resin-coated steel pipe 1, extends the length between the position a little before the dividing blades 26b•26b and the position ahead of the take-up roll device 30, arranged in such a manner as not to interfere with the dividing blades 26b•26b and the take-up rolls 31,32,33 of the take-up roll device 30 described hereinafter (see FIGS. 3,4 and 12), and constituting the rear part of the run guide consisting of the side pieces 27a•27a on right and left, and a lower piece 27b located at a distance from the resin-coated steel pipe 1 serves the purpose of guiding the pieces of the coating resin 3, which, given the incision lines 18•18 at the upper and lower position, is separated from the steel pipe 2 and severed by the dividing blades 26b•26b with the right and left pieces 27a•27a and the lower piece 27b in the running direction of the pieces of the coating resin 3.

Figure 4:
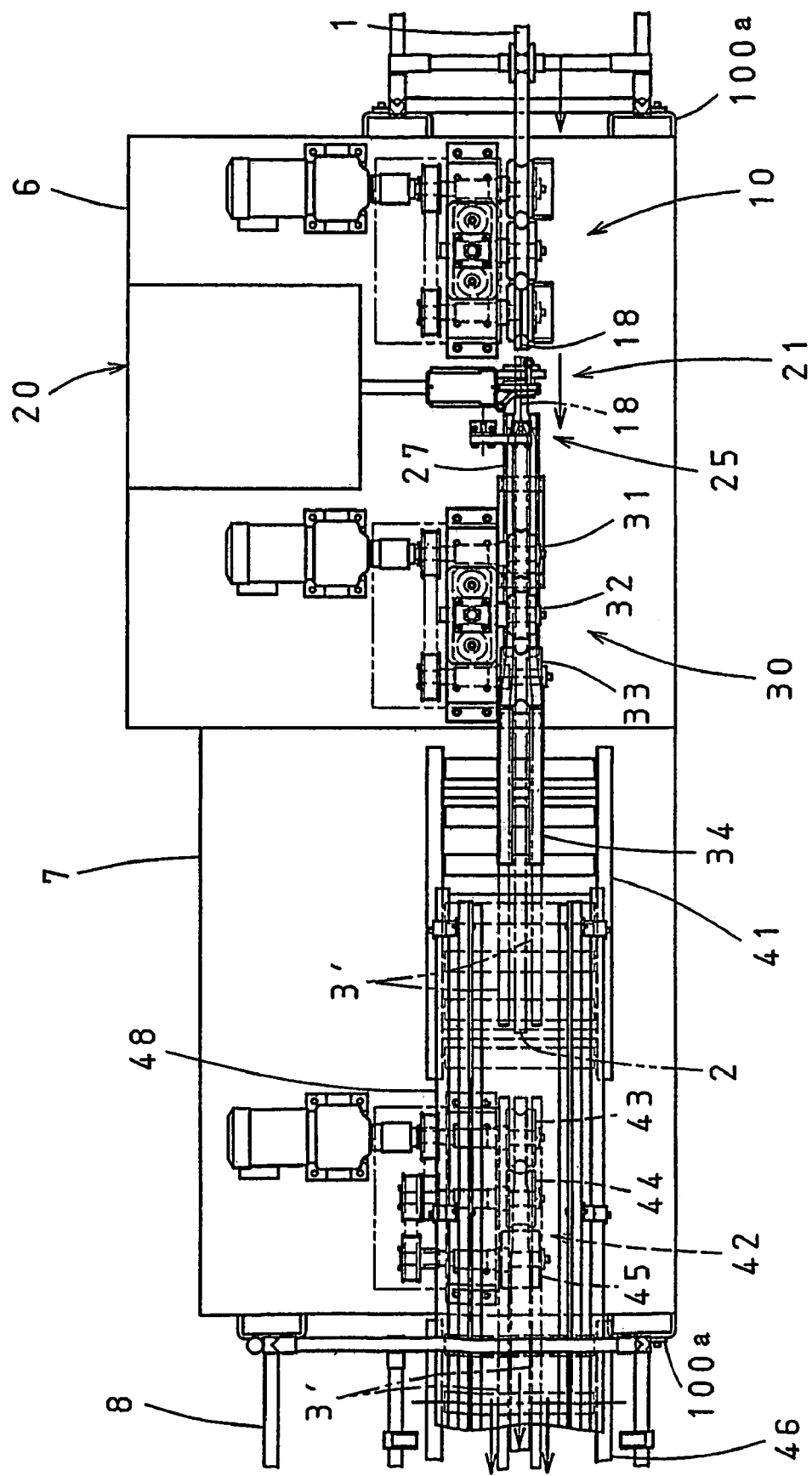
FIG. 4 is a plan view of the main part and the coupling part of FIG. 3.

The lower piece 27b may have right and left portions integral with the central portion at the part where there is no fear of interference, (not shown; in FIGS. 4 and 11, the central portion is removed throughout the length; according to the invention stated in Claim 12).

The symbol 27c designates a base for mounting in the run guide 27.

According to the composition of the separating mechanism 25, there is no fear of cut off pieces of the steel pipe 2 getting into the separated coating resin 3 because separation is effected without a scraping operation of the dividing blades 26b•26b contacting the steel pipe 2. The pointed ends of the dividing blades 26b•26b hit against the incision lines 18•18 in the coating resin 3 of the resin-coated steel pipe 1 moving in the running direction thereof.

Owing to this, by the severing effect of the dividing blades 26b•26b for the coating resin 3 cut by the incision lines 18•18 into two, right and left pieces (cut into two parts along the circumference), as the pointed ends of the dividing blades 26b•26b hit against the incision lines 18•18, the fore end of the pieces of the coating resin 3 split and diverge to right and left, and are thereby separated from the steel pipe 2 and severed along the incision lines 18•18 and away from the steel pipe 2 into two pieces. Then, each of the severed pieces of the coating resin 3 is guided by the run guide 27 in the running direction thereof. Since the severed state and guiding is maintained, the coating resin 3 is severed completely throughout the length thereof along the incision lines 18•18 and away from the steel pipe 2 into two pieces.

The separating mechanism 25 is provided between the high-frequency induction coil 21 and the take-up roll device 30 as a take up means independently and exclusively for the separating operation, which means that the performance thereof as separating means can be further enhanced.

The embodiment of the take-up device 30 as a take up means is described below using FIGS. 3,4,14 and 15.

Figure 3:
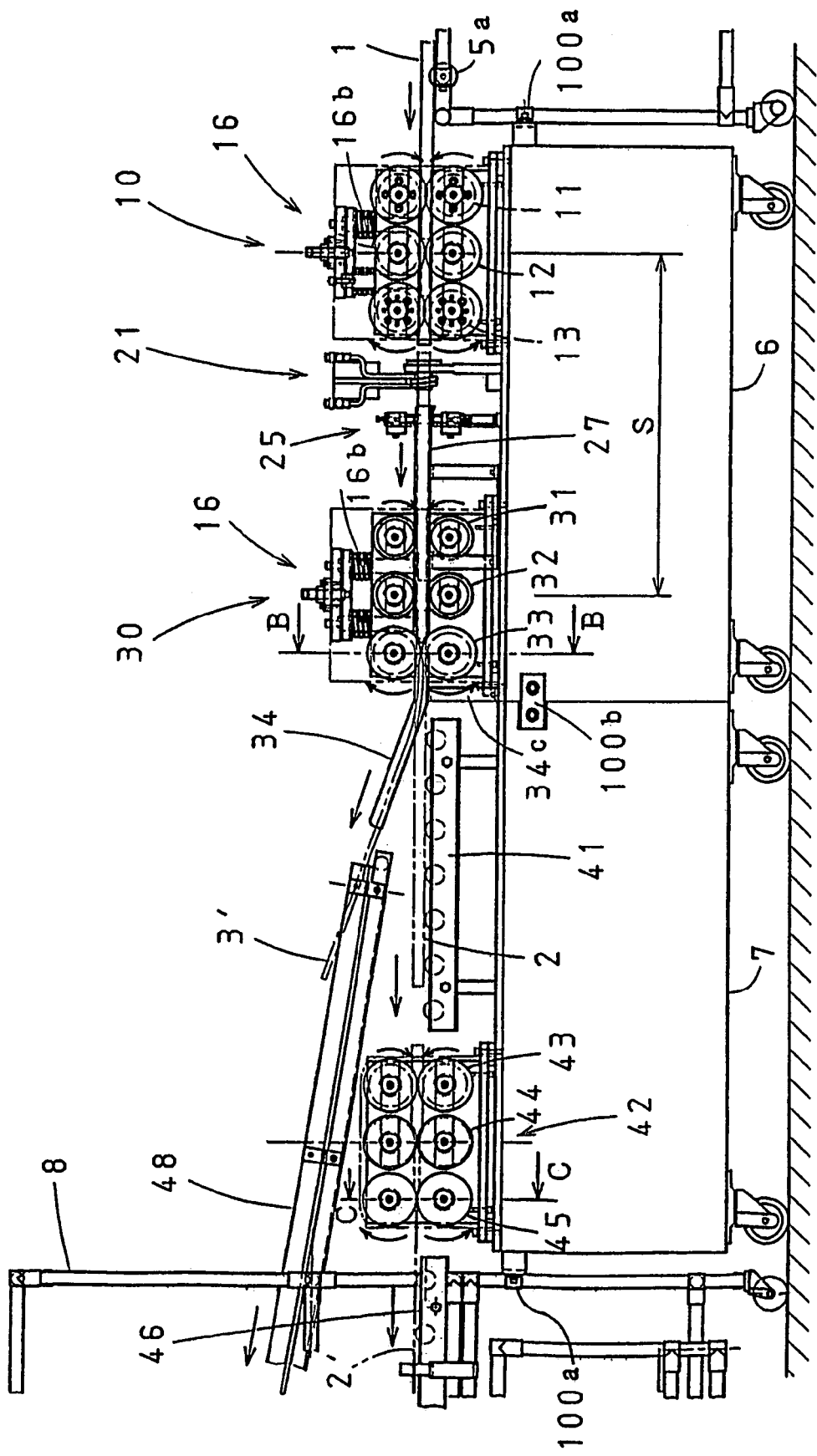
FIG. 3 is an enlarged front view of the main part and the coupling part between the main part and the steel pipe recovering part of the separating and recovering apparatus of FIG. 1.

As shown in FIGS. 3 and 4, the take-up roll device 30 comprises a fixed block, a movable block and three sets of take-up rolls, and, since the composition by which each of the three sets of the take-up rolls consists of two division rolls located at the upper and lower positions opposing each other, by which the lower one is incorporated in the fixed block and the upper one is incorporated in the movable block, and by which the mechanism to give pressing force is incorporated in the combination of the fixed and the movable blocks are all the same as the feeding roll device 10, and have the same effects, the devices and members having the same functions are given the same symbols and the description thereof is omitted.

In the take-up roll device 30 are incorporated three sets of take-up rolls 31,32 and 33, each consisting of two division rolls located at the upper and lower positions opposing each other, and at the center of each of the division rolls is formed a peripheral groove having the same curvature as the outer surface of the steel pipe 2.

Of the three sets of the take-up rolls 31,32 and 33, one, preferably the third set of the take-up rolls, that is, the take-up rolls 33 on the side of the recovering device 40, has division rolls 33a•33b having greater width than the rolls in the sets 31 and 32 as shown in FIG. 4, the flat portions 33d•33d of the periphery surface on the both sides of the groove 33c being accordingly wider. And, as shown in FIGS. 14 and 15, the outer diameters of the division rolls 33a•33b located at the upper and lower positions are set so as to have a clearance in between as to be able to crush the right and left pieces of the coating resin 3•3 into inwardly folded and flat condition.

The second run guide 34 (the fore part of the run guide), enclosing the resin-coated steel pipe 1, extends the length between the midpoint of the division rolls 33a•33b and the position ahead of the take-up roll device 30, comprises right and left pieces 34a•34a provided at a distance from resin-coated steel pipe 1 and a lower piece 34b arranged in such a manner as to avoid interference with the take-up roll device 30, and is bent upward at the point slightly before the first roller conveyer 41. The guide 34 is divided into the right and left parts by the pieces 34a•34a on both sides and the lower piece 34b, and guides the pieces of the coating resin 3 being crushed in the running direction thereof.

The symbol 34c designates a base for mounting provided in the second guide 34.

In the take-up roll device 30, therefore, as each of the division rolls rotates, the periphery grooves take up and feed forward the steel pipe 2, while the flat periphery portions 33d•33d on the both side of the groove 33c take up and crush the right and left coating resin pieces 3•3 that come running into folded and flat condition, and feed forward the processed resin pieces 3•3. The second run guide 34 guides the coating resin pieces 3•3 in a rising pass.

With the take-up roll device 30 described above, the coating resin 3 separated from the steel pipe 2 can be crushed flat.

The embodiment of the recovering device 40 is described below with reference to FIGS. 3,4, and 16–20.

Ahead of the main part support 6 the coupling part support 7 is provided as the first support in the recovering device 40.

As shown in FIGS. 3,4,16 and 17, on the coupling part support 7, in the running direction of the steel pipe 2, the first roller conveyer 41 is provided, which first receives the steel pipe 2 from the take-up roll device 30 and feeds forward the steel pipe 2, and following the conveyer 41, the steel pipe crushing device 42 is provided, which crushes and feeds forward the steel pipe 2.

In the steel pipe crushing device 42 are incorporated three sets of crushing rolls 43,44 and 45, each consisting of two division rolls located at the upper and lower positions opposing each other, and on the periphery of each roll of the rear two sets of crushing rolls 43,44 formed a peripheral groove of appropriate shape. As shown in FIGS. 16 and 17, the two division rolls 45a•45b of the fore set of crushing rolls 45 have flat peripheral surfaces without a groove and have diameters set in such a manner that the peripheral surfaces maintain a clearance in between which the steel pipe 2 moving in the running direction thereof can be crushed flat.

Therefore, as each of the division rolls rotates, the peripheral surface of the division rolls 45a•45b take up and crush flat the moving steel pipe 2 and feed the pipe 2 forward.

Ahead of the coupling part support 7 is provided the steel pipe recovering part support 8.

Figure 19:
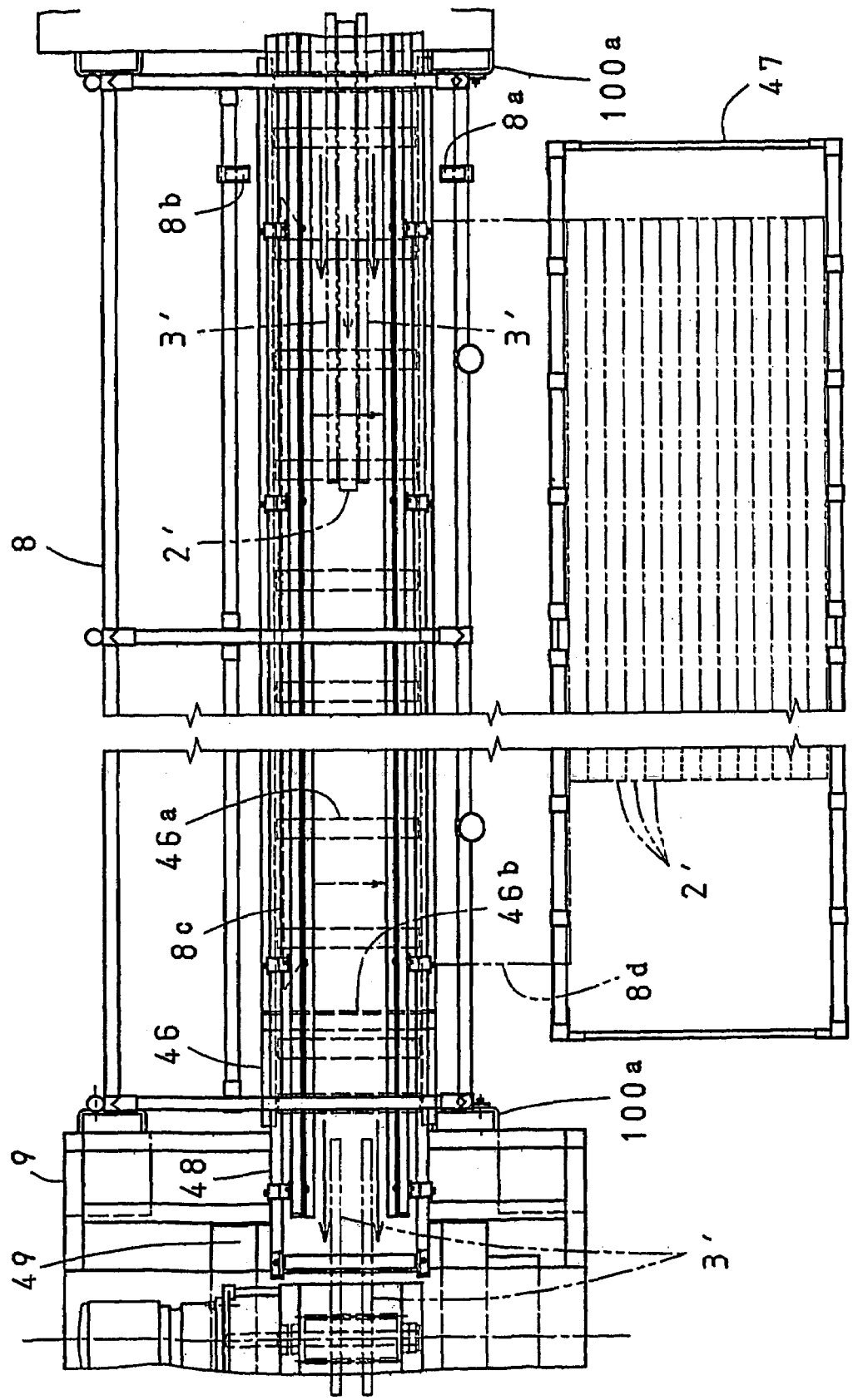
FIG. 19 is a plan view of the part shown in FIG. 18.
Figure 20:
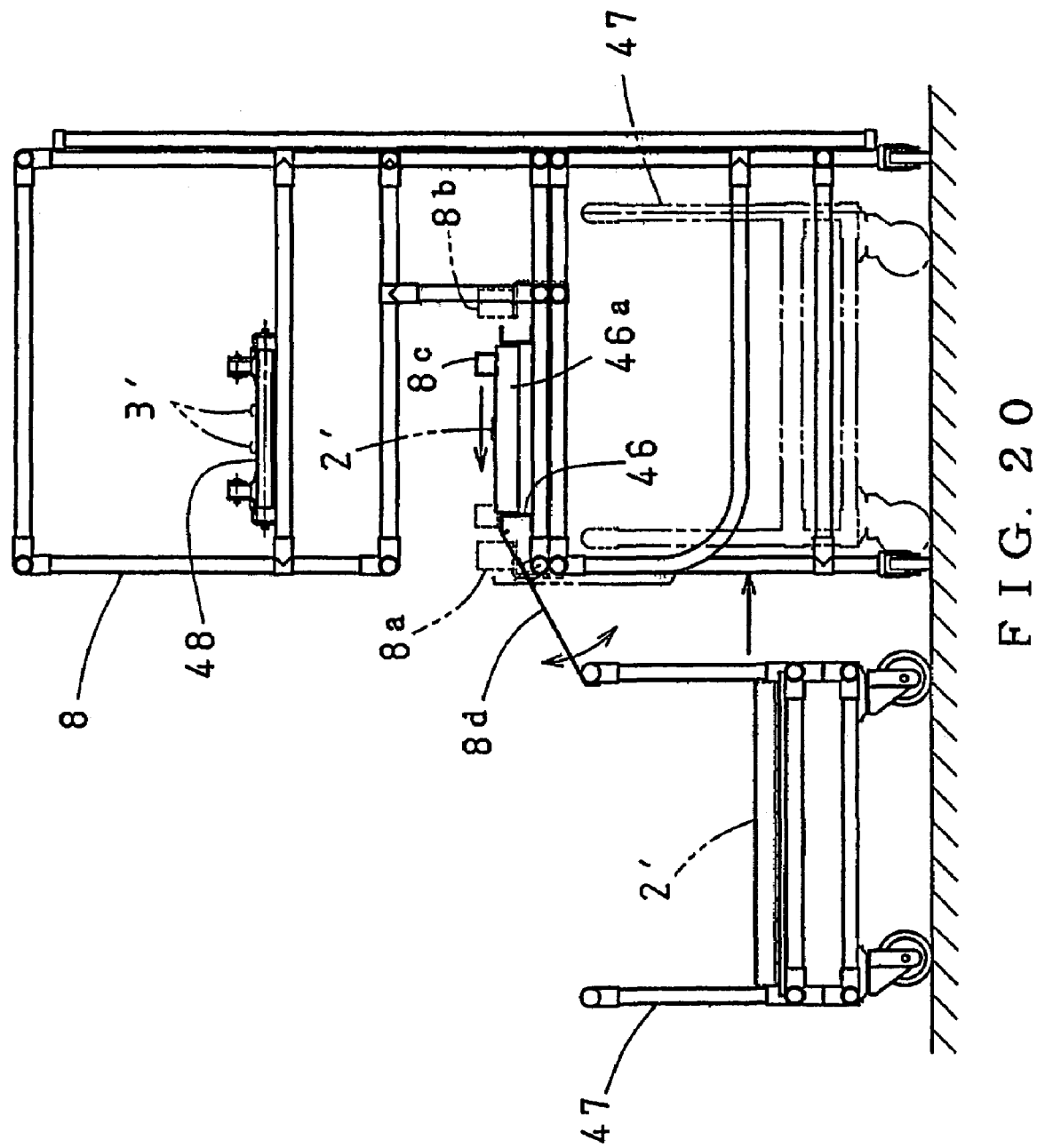
FIG. 20 is a right side view of the front central part of the steel pipe recovering part shown in FIG. 18.

As shown in FIGS. 18–20, the steel pipe recovering part support 8 has a second roller conveyer 46 mounted at mid height, the steel pipe recovering trolley 47 provided at a lower position under the second roller conveyer 46, and the belt conveyer 48 provided at a higher position above the second roller conveyer 46.

The steel pipe recovering trolley 47 is made to be freely movable in a direction perpendicular to the running direction of the crushed steel pipe 2' from under the second roller conveyer 46 to a position clear of the second roller conveyer 46, (see FIG. 20).

At the fore end of the second roller conveyer 46 in the running direction of the crushed steel pipe 2', a stopper 46b of slender shape to prevent further running of the crushed steel pipe 2' is provided to be perpendicular to the second roller conveyer 46 in such a manner as not to interfere with the roller 46a.

In combination with the slender stopper 46b, at the rear end of the steel pipe recovering part support 8, a pair of photoelectric tubes 8a (emitter), 8b (receiver) are provided to detect that the rear end of the crushed pipe 2' has passed. Further, a push bar 8c is provided to push the crushed, but still long, steel pipe 2' in the direction perpendicular to the running direction thereof from back to fore and out of the second roller conveyer 46 in such a manner so as not to interfere with the rollers 46a, the stopper 46b, and the photoelectric tubes 8a (emitter), 8b (receiver). At the fore side in the direction perpendicular to the running direction of the crushed steel pipe 2', a slide guide plate 8d is provided rotatably on the frame of the steel pipe recovering part support 8 to properly guide the crushed steel pipe 2' to fall into the steel pipe recovering trolley 47.

When the separating and recovering apparatus is not being operated, the slide guide plate 8d is turned upward, and in that condition, the steel pipe recovering trolley 47 is moved from outside the second roller conveyer 46 to the position under the second roller conveyer 46 to eliminate dead space on the work floor.

The belt conveyer 48 is provided on the steel pipe recovering part support 8 at a position above the second roller conveyer 46 in such a manner that both ends thereof protrude from the steel pipe recovering part support 8, and is upwardly declined toward the smasher 49. Thus the belt conveyer 48 can receive the crushed coating resin 3' at the rear thereof and deliver the resin 3' to the smasher 49 (see FIG. 1).

Ahead of the steel pipe recovering part support 8, the smasher support 9 is provided As shown in FIGS. 1,2,18 and 19, under the smasher support 9 the smasher 49 is provided, which receives the crushed coating resin 3' from the belt conveyer 48 and smashes the resin 3'.

According to the composition of the recovering device 40 described above, the separated steel pipe and coating resin 3 can be recovered in a segregated condition in such a manner that each piece of the flat crushed resin 3' is smashed by the smasher 49 and the steel pipe 2 is lead to the recovering trolley 47, with the steel pipe 2' crushed flat, but unchanged in length, (according to the invention stated in Claims 2 and 3).

As to the minimum suitable length of the resin-coated steel pipe 1 to be processed by the separating and recovering apparatus described above, it is preferable that the resin-coated steel pipe 1 is a little longer than the length with which, when the resin-coated steel pipe 1 is between the feeding roll device 10 and the take-up roll device 30, which consist of three sets of feeding rolls and take-up rolls, respectively, the rear and the fore ends of the resin-coated steel pipe 1 can be located simultaneously in the device 10 and the device 30, (the symbol S in FIGS. 1 and 3).

With the length described above, the resin-coated steel pipe 1 or the steel pipe 2 can be stably supported and fed, and thereby makes it possible to execute, also in a stable fashion, such operations as making the incision lines 18 in the resin-coated steel pipe 1, separating and severing by the separating mechanism 25 and crushing the coating resin 3 by the take-up roll device 30.

On the other hand as to the maximum suitable length, it is preferable that the resin-coated steel pipe 1 is of such a length that when the fore end of the crushed steel pipe 3' is at the stopper 8b, the rear end thereof is a little ahead of the pair of photoelectric tubes 8a (emitter) and 8b (receiver), (the symbol L in FIGS. 1 and 8).

Smashed and recovered coating resin 3 can be recycled to be effectively used for new resin-coated steel pipe as inner coating resin on which new AAS resin or ABS resin is coated as the outer layer, without deteriorating the quality of the finished resin-coated steel pipe.

Figure 21:
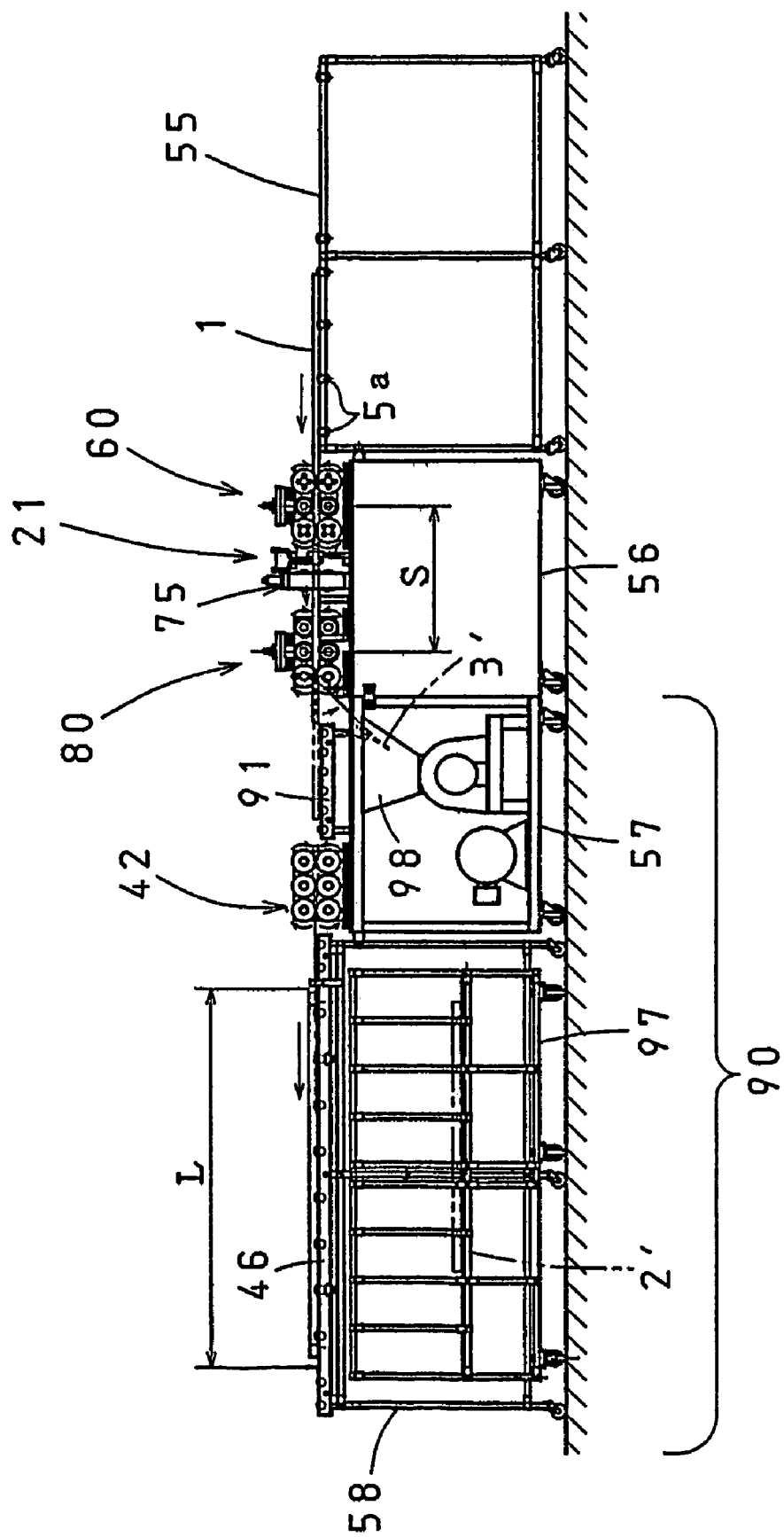
FIG. 21 is a front view of the second embodiment of the apparatus to separate and recover steel pipe and coating resin from resin-coated steel pipe according to the present invention.
Figure 22:
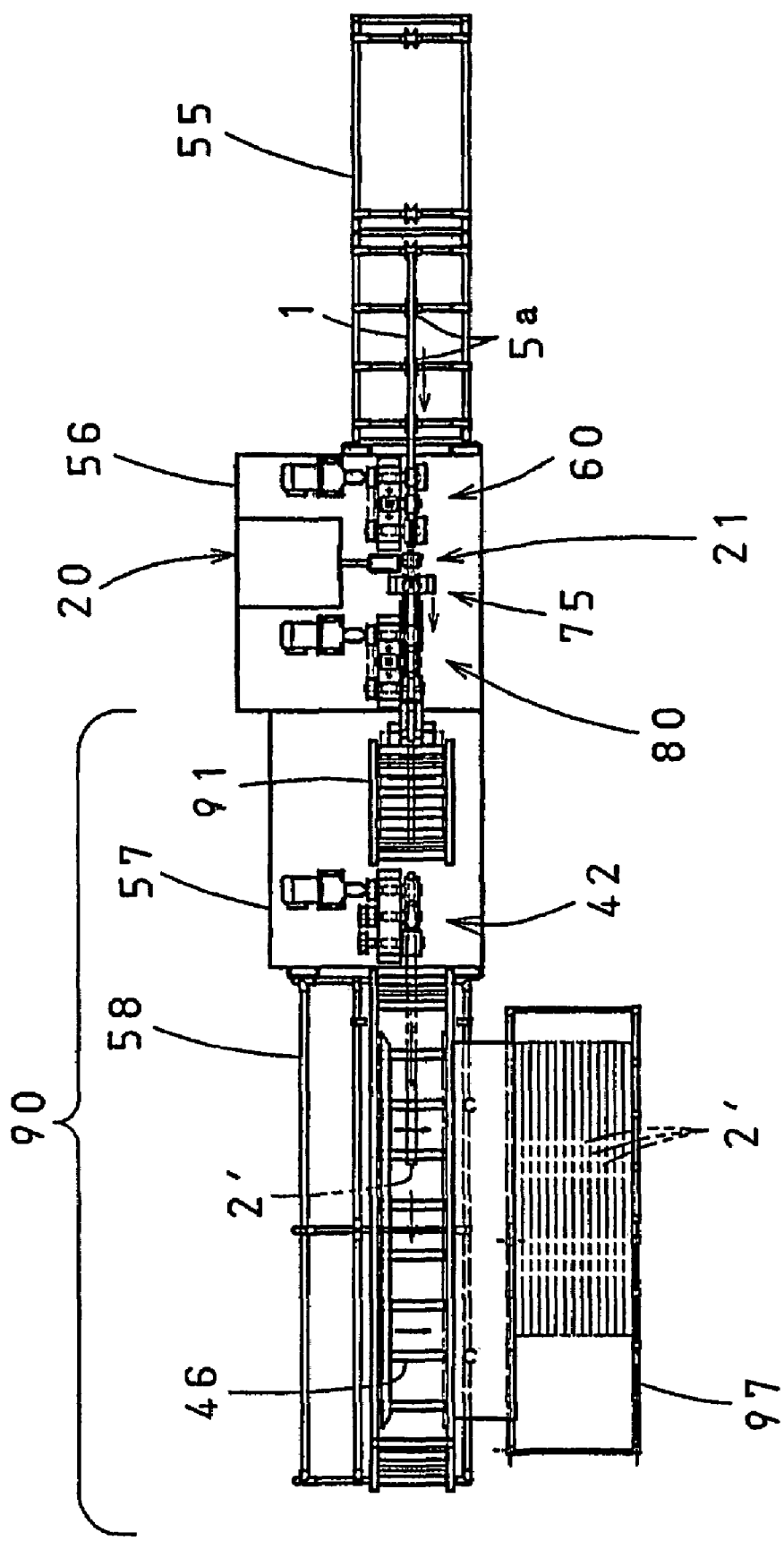
FIG. 22 is a plan view of the separating and recovering apparatus of FIG. 21.

FIGS. 21 and 22 are general front and plan views, respectively, of the second embodiment to practice the method to separate and recover steel pipe and coating resin from resin-coated steel pipe stated in Claim 1.

The resin-coated steel pipe 1 shown in FIG. 48 has as the inner resin or adhesion layer a on the surface of the steel pipe 2 a thin layer of denatured polyolefin having an adhesive character and a layer of uniform thickness of polyolefin (polyethylene or polypropylene) coated thereon as the outer resin, constituting a double-layer coating resin 3. On the inner surface of the steel pipe 2 is painted an antirust paint as a thin film to form an antirust layer b.

In FIGS. 21 and 22, from back to fore in the running direction of the resin-coated steel pipe 1 or the steel pipe 2, numeral 55 designates a feeder support, 56 designates a main part support, 57 coupling part support, and 58 steel pipe recovering part support.

On the main part support 56 are provided a feeding device 60, (having a means to make incision lines), to feed the resin-coated steel pipe 1 of arbitrary length in the running direction thereof, a high-frequency induction heating device that heats the resin-coated steel pipe 1 as the pipe passes inside or near a high-frequency induction coil 21, a separating mechanism 75, (including a first run guide 27 as the rear part of the run guide; see FIGS. 29–32), which, provided at an appropriate position reached immediately after passing the high-frequency induction coil 21, separate the coating resin 3 from the steel pipe 2 and sever the coating resin 3, a take-up roll device 80, (including take-up rolls 81 that crush flat the coating resin 3; see FIGS. 23,34–36), which takes up the steel pipe 2, and a second run guide 82, (see FIGS. 23,24,29–32), which, as the fore part of the run guide, guides the crushed coating resin 3.

On the coupling part support 57 are provided a first roller conveyer 91, a crushing device 42 consisting of three sets of crushing rolls 43,44 and 45, and a smasher 92. On the steel pipe recovering part support 58 are provided a second roller conveyer 46 on the top surface thereof and a steel pipe recovering trolley 97 below the second roller conveyer 46. The recovering device 90 comprises the coupling part support 57, the steel pipe recovering part support 58 and the devices and members provided on the coupling part support 57 and on the steel pipe recovering part support 58, and recovers the separated steel pipe 2 and coating resin 3 in segregated condition.

The FIGS. 23–29 show the second embodiment of the separating and recovering apparatus.

For example, the resin-coated steel pipe 1 has an outer diameter of 27.7 mm; the steel pipe 2 is of SPCC, (JIS G 3141 cold rolled steel plate & sheet; for general use); the steel pipe 2 is 25.5 mm in outer diameter and 0.7 mm in thickness; the thickness of the 2-layer coating resin is 1.1 mm: the thickness of the inner resin or the adhesion layer a of denatured polyolefin (adhesive polyolefin) is 0.1 mm, and the melting temperature thereof is 140° C. while the softening temperature is 120° C.; the thickness of the outer resin of polyolefin (polyethylene or polypropylene) is 1 mm, and the melting temperature thereof is about 140° C. (in case of polyethylene) while the softening temperature is 120° C. (in case of polyethylene).

With the conditions stated above, the running speed of the resin-coated steel pipe 1 moved by the feeding roll device 60 and the take-up roll device 80 is set to about 15 m/minite.

The running speed of 15 m/minite means that, using the separating and recovering apparatus described in detail in the following, with this speed the resin-coated steel pipe 1 will be, arriving at the separating mechanism 75, in such conditions that due to high-frequency induction heating the adhesion layer is kept in a melted state while the outer layer of the coating resin 3, separated from the steel pipe 2 and severed, is not softened and has a surface temperature of 50° C.–60° C., which is nearer to normal temperature than softening temperature, maintaining the rigidity sufficient for being solid.

In other words, with this running speed, the coating resin 3 attains the preferred condition in which the layer of the coating resin 3 adjacent to the boundary of the steel pipe 2 has, at the separating mechanism 75, a temperature high enough to be separable from the steel pipe 2, while at least the outer layer part of the coating resin 3 is kept at a temperature lower than necessary for softening, (according to the invention stated in Claim 4).

Figure 26:
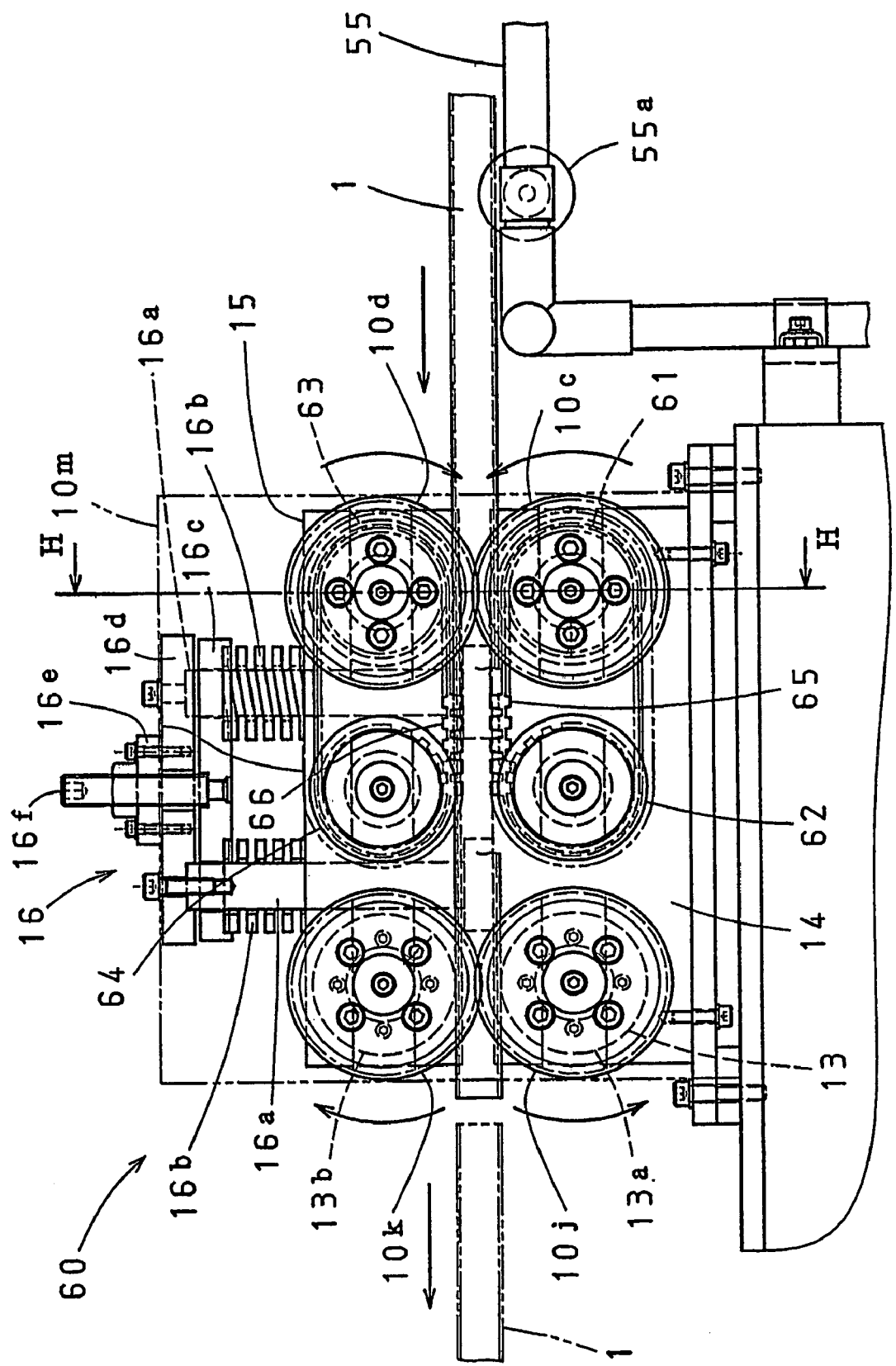
FIG. 26 is an enlarged front view of the feeding device of FIG. 23.
Figure 27:
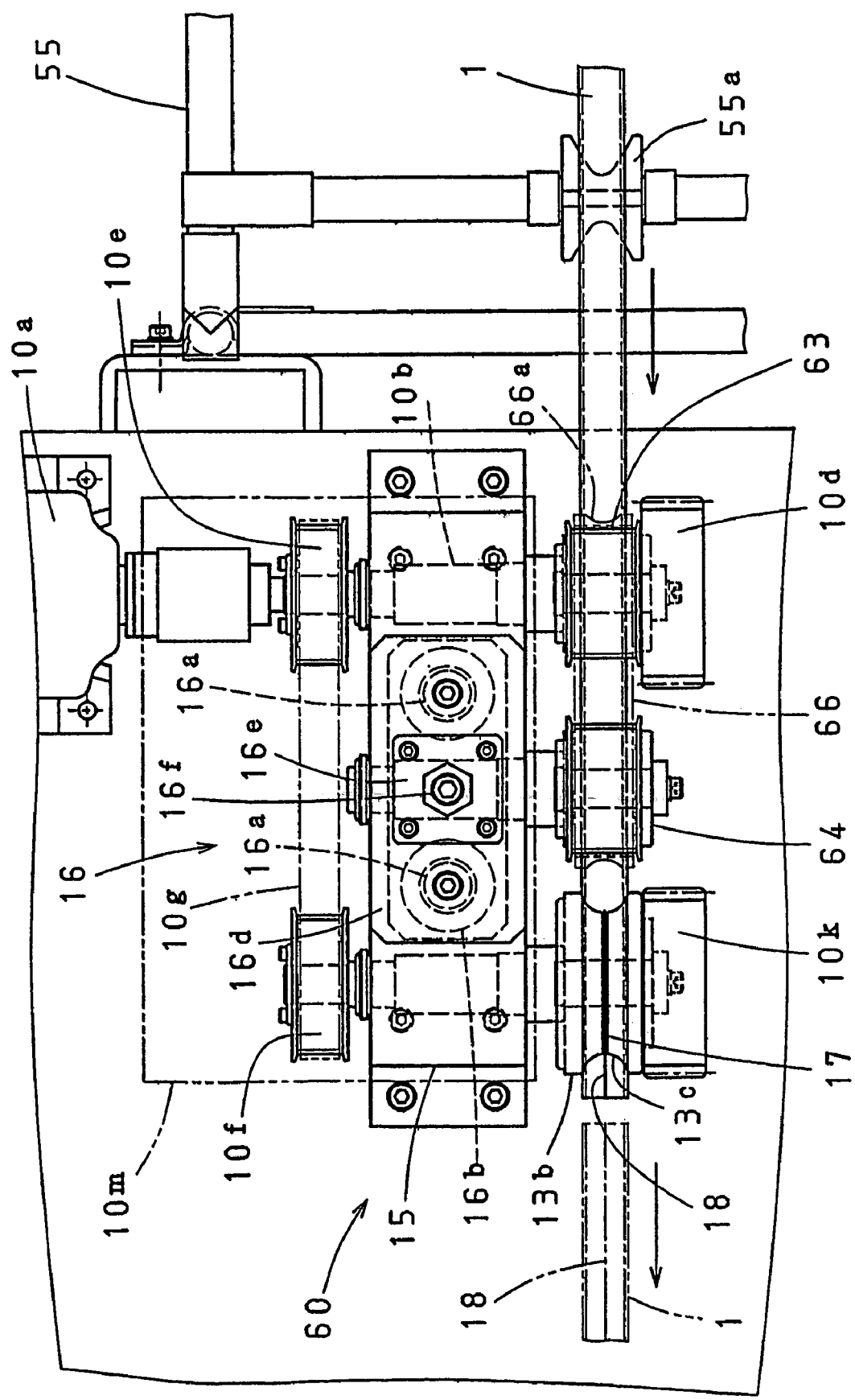
FIG. 27 is a plan view of the feeding device of FIG. 26.
Figure 28:
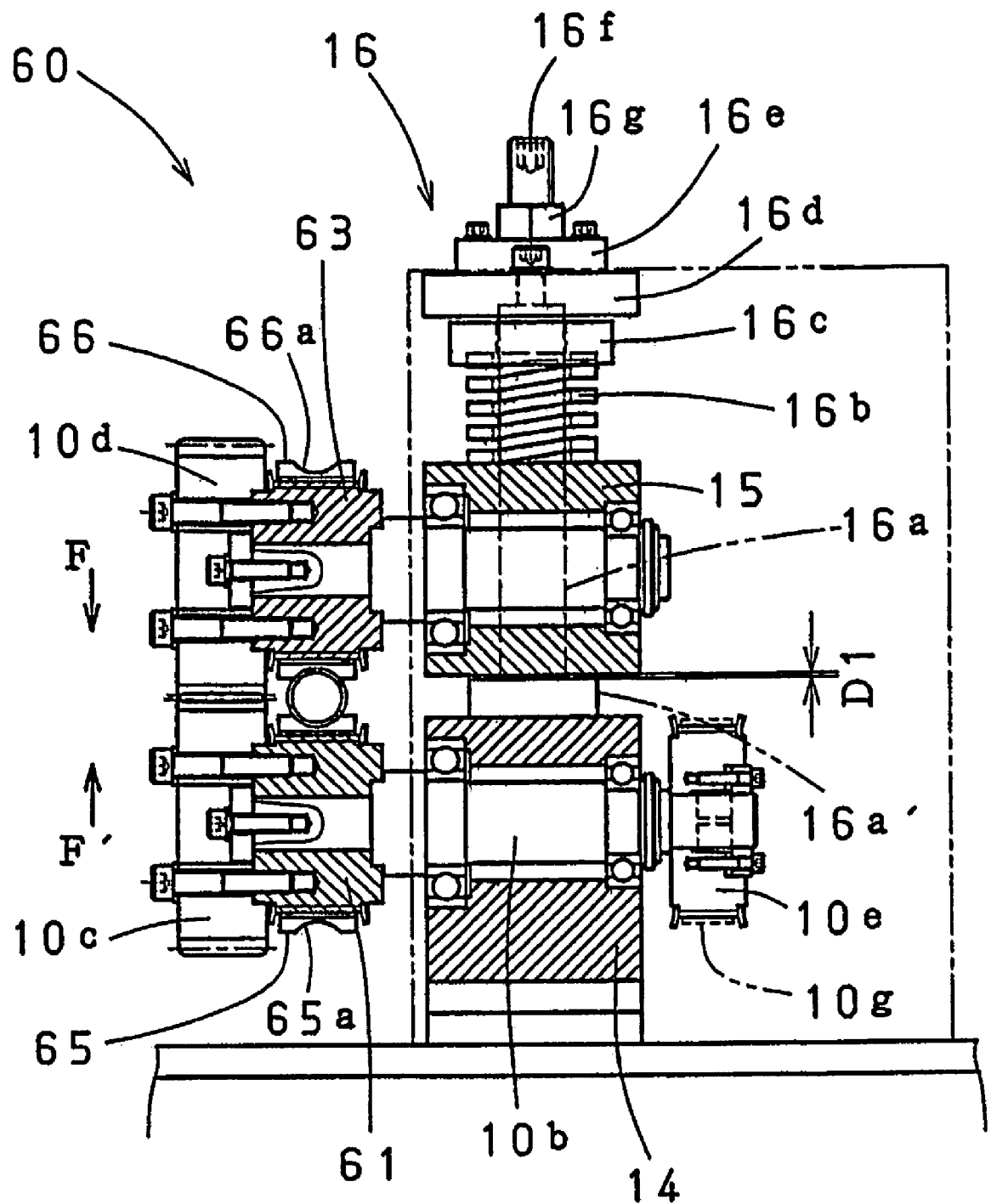
FIG. 28 is a sectional view taken at H—H line of FIG. 26.
Figure 29:
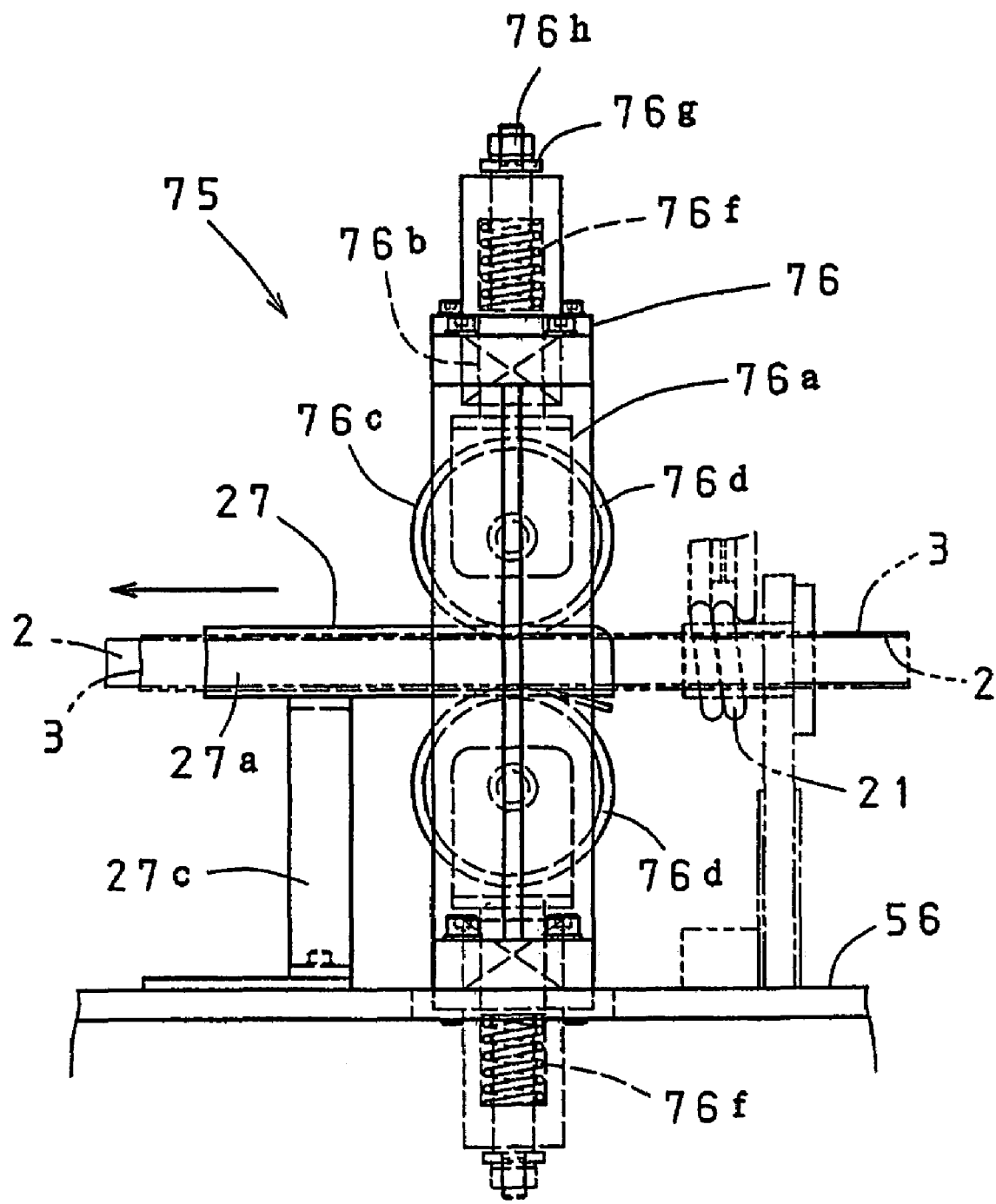
FIG. 29 is an enlarged front view of the separating mechanism of FIG. 23.
Figure 30:
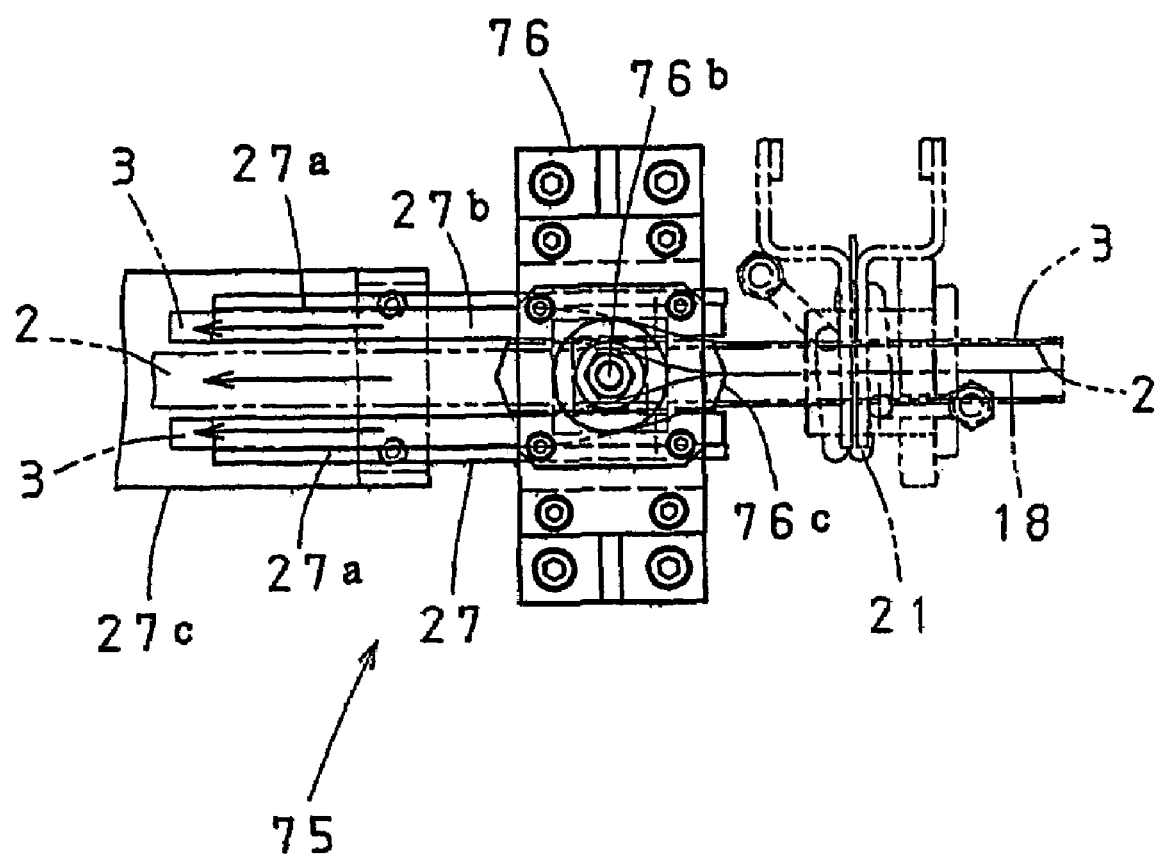
FIG. 30 is a plan view of the separating mechanism of FIG. 29.
Figure 32:
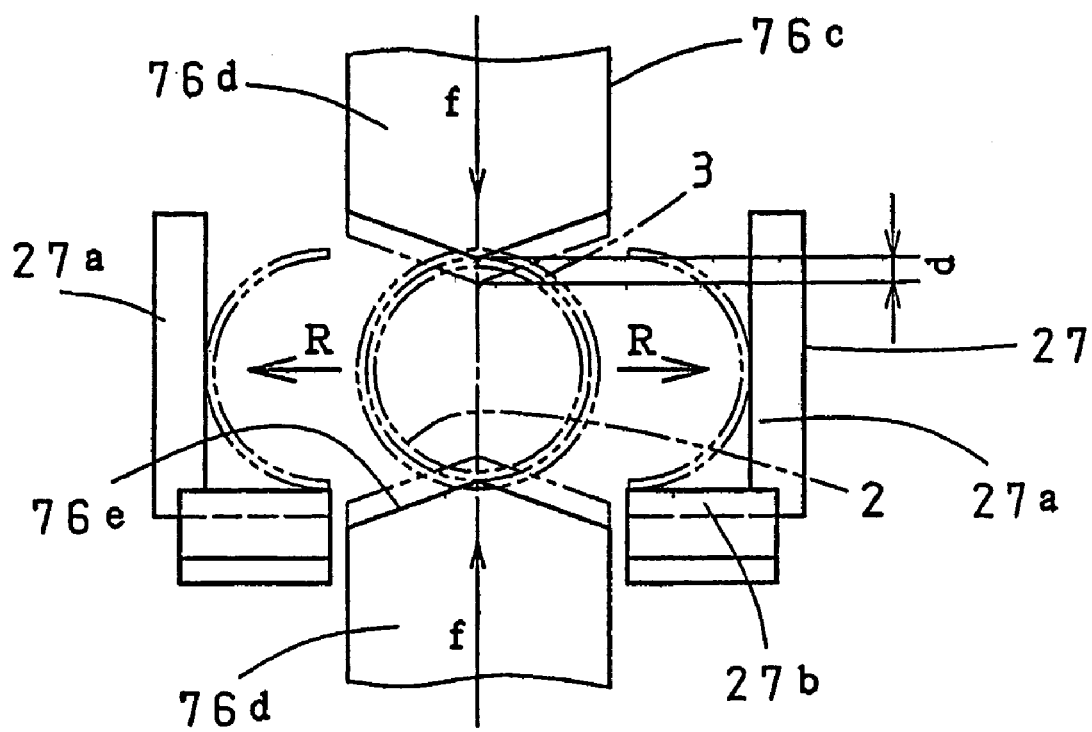
FIG. 32 is an enlarged view of J part of FIG. 31.
Figure 33:
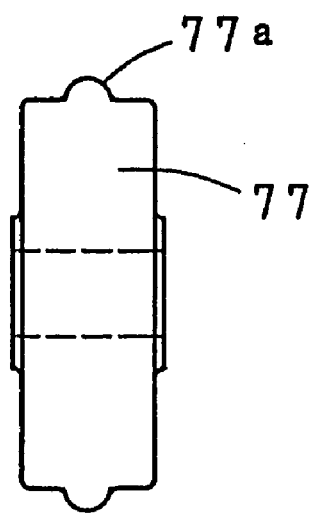
FIG. 33 is a view showing another embodiment of the division rolls of FIGS. 30–32.
Figure 34:
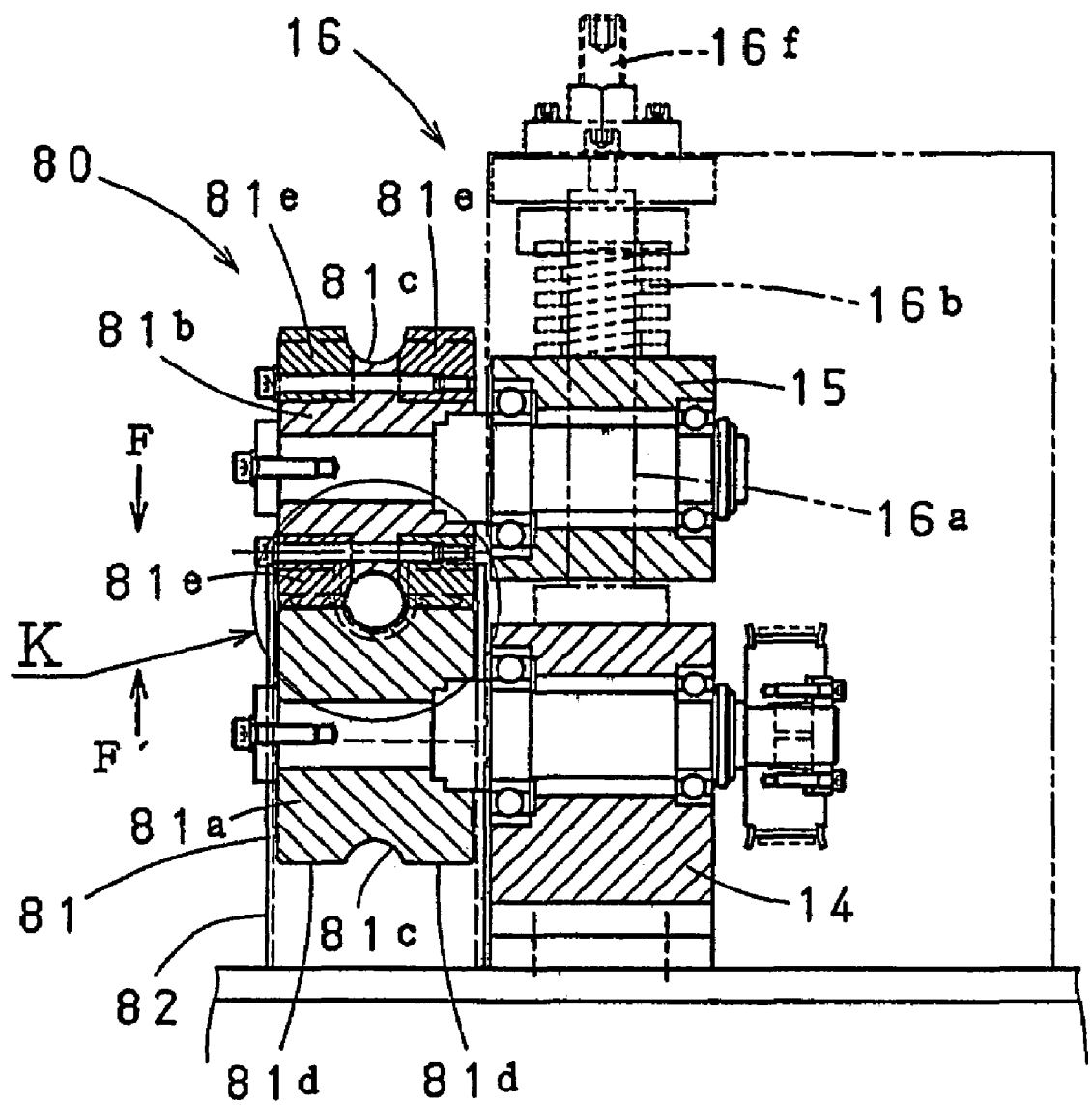
FIG. 34 is a sectional view taken at I—I line of FIG. 23.
Figure 35:
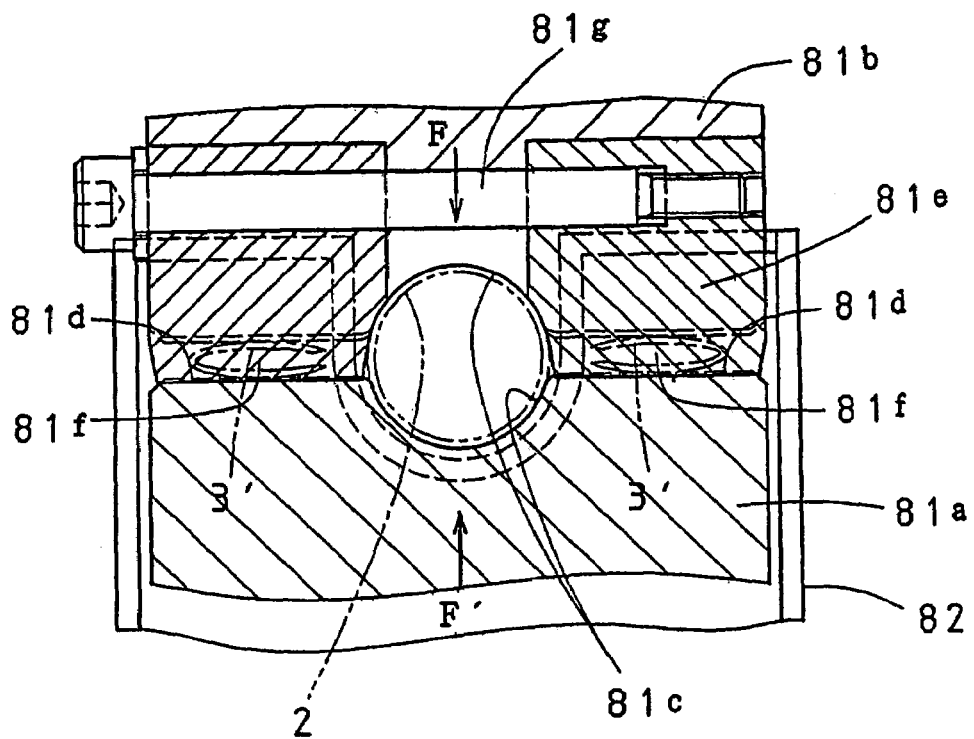
FIG. 35 is an enlarged view of K part of FIG. 34.
Figure 36:
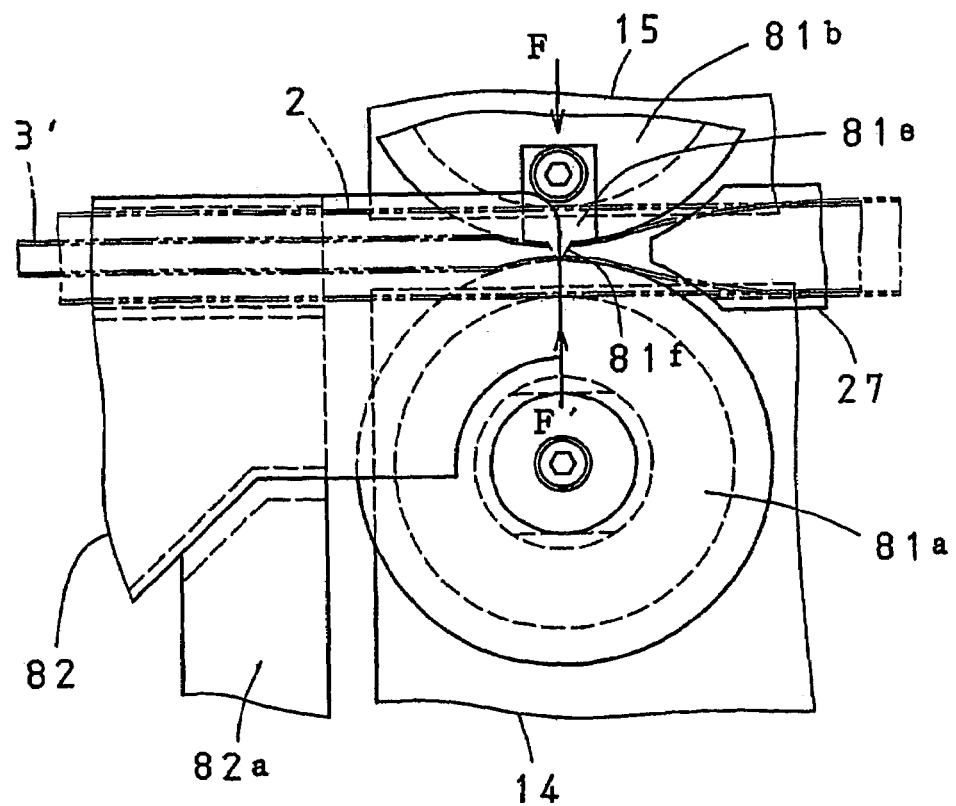
FIG. 36 is an enlarged view of M part of FIG. 23.

With reference to FIGS. 26–28, the feeding device provided first in the running course of the resin-coated steel pipe 1 on the main part support 56 is described below.

The feeding device is shown as the feeding device 60 having two sets of timing pulleys each consisting of two horizontally arranged pulleys 61,62,63 and 64, two timing belts 65 and 66 and a set of feeding rolls 13 arranged in series in the running course of the resin-coated steel pipe 1. Each of the two timing belts 65 and 66 is formed as usual on the inner side thereof with teeth, but on the outside also is formed with teeth and on the outside teeth is formed a peripheral groove 65a or 66a having the curvature congruent to the outer surface of the resin-coated steel pipe 1.

Since the feeding device 60, the fixed and movable blocks, the force adjusting mechanism, the set of feeding rolls provided on the side of the high-frequency induction coil, consisting of two division rolls located at the upper and lower positions opposing each other to clamp the resin-coated steel pipe 1 and the incision blades provided on the set of feeding rolls are of the same composition, and have the same functions and effects as the fixed and movable blocks 14,15, the force adjusting mechanism 16, the set of feeding rolls 13 and the incision blades 17 described with the first embodiment of the separating and recovering apparatus, they are given the same symbols as the devices and members having the functions, and a description is omitted.

The feeding device 60 is given force F on the division roll 13a, the timing belt 66 and the set of timing pulleys 63 and 64 incorporated in the movable block 15 by the force adjusting mechanism 16 and through engagement of the rotating peripheral grooves 65a and 66a of the timing belts 65 and 66 and the peripheral grooves 13c of the division rolls 13a and 13b with the outer surface of the resin-coated steel pipe 1, and feeds the resin-coated steel pipe 1 in the running direction thereof.

The high-frequency induction heating device 20 and the high-frequency induction coil 21 are almost the same as described in the explanation of the previous arts and the description thereof is omitted.

However, it should be noted that in the resin-coated steel pipe 1, the steel pipe 2 is heated by means of high-frequency induction heating to such a condition that when the steel pipe 2 reaches the separating mechanism 25 located at an appropriate position arrived at immediately after heating process, the boundary layer of the coating resin 3 reaches a separable condition from the steel pipe 2 while the outer layer of the coating resin 3, at least the surface layer of the outer resin thereof is kept under the softening temperature, (according to the invention of Claim 4).

The embodiment of the separating mechanism 75 is described below with reference to FIGS. 29–33.

First, the resin-coated steel pipe 1 is given the incision lines 18•18 at the upper and lower positions thereof. The separating mechanism 75 is provided independently between the high-frequency induction coil 21 and the take-up roll device 80. The separating mechanism 75 comprises a set of separating rolls 76c consisting of two division rolls 76d•76d located at the upper and lower positions opposing the incision lines 18•18 to clamp the resin-coated steel pipe 1 and the first run guide 27 provided to enclose the resin-coated steel pipe 1 at a certain distance.

The set of separating rolls 76c has a mechanism to give pressing force to at least one of the division rolls 76d•76d against the outer surface of the steel pipe 2 toward the axis thereof, and the division rolls 76d•76d rotate with the peripheral surface thereof engaging the outer surface of the resin-coated steel pipe 1. The peripheral surface of each of the two division rolls 76d•76d can be formed into any shape selected as preferable for the separating mechanism 75, for example, a gable roof shape, (symbol 76e in FIG. 32) or a shape having flat top with a small semicircle, (symbol 77a in the roll 77 shown in FIG. 33).

As the peripheral surface portions of the set of separating rolls 76c facing the high-frequency induction coil 21 come in contact with the two incision lines 18•18 in the coating resin 3 of the resin-coated steel pipe 1 moving toward the peripheral surface portions, by exerting force against the incision lines 18•18, the separating rolls 76c separate the coating resin 3, starting at the fore end thereof, from the steel pipe 2 and sever the coating resin 3 along the incision lines 18•18 and away from the steel pipe 2 into right and left pieces, which are guided by the run guide 27 in the running direction of the coating resin 3.

It should be noted that there is no necessity to limit the arrangement of the incision lines 18•18 and the division rolls 76d•76d to the upper and lower positions, (according to the invention of Claim 10).

The embodiment of the separating mechanism 75 is described below in detail with reference to FIGS. 29–33.

The separating mechanism 75 described above comprises the division rolls 76d•76d and the first run guide 27. In the event the two division rolls 76d•76d are provided, on the main body 76 fixed on the main part support 56 are mounted support frames 76a•76a and support axles 76b•76b which support the two division rolls 76d•76d located at the upper and lower positions opposing each other to clamp the resin-coated steel pipe 1 in such a manner that the support axles 76b•76b are vertically adjustable with compression coil springs 76f•76f fit thereon.

The upper and lower support frames 76a•76a and support axles 76b•76b support at the fore ends thereof the division rolls 76d•76d and the rear ends thereof protrude from the outside surface of the body 76. On the upper and lower end surfaces of the body 76 are provided stop washers 76g•76g and through the stop washers 76g•76g extend the rear parts of the support axles 76b•76b respectively. Further, nuts 76h•76h are provided on the back of the stop washers 76g•76g to clamp the stop washers 76g•76g.

In the clamped condition described above, if the compression coil springs 76f•76f press the support axles 76b•76b and the stop washers 76g•76g hit the body 76, this condition will define the forward limit position of the division rolls 76d•76d.

At the forward limit position of the division rolls 76d•76d, the positions of the central ridges of the peripheral surfaces 76e•76e having a gabled roof shape are set to protrude by a distance, 2 mm–3 mm for example (symbol d in FIGS. 31,32), toward the axis of the resin-coated steel pipe 1 from the outer surface of the steel pipe 2 of the resin-coated steel pipe 1, which moves in the running direction thereof, and thereby desired forces f•f (see FIGS. 31,32) are given against the outer surface of the passing resin-coated steel pipe 1 by the compression coil springs 76f•76f through the division rolls 76d•76d in the direction of the axis of the pipe 1.

Since the first run guide 27 is of the same composition and has the same function and effects as the first run guide 27 described in the first embodiment of the separating and recovering apparatus, the devices and members having the same functions are given the same symbols and the description thereof is omitted.

According to the composition of the separating mechanism 75 described above, since the separating mechanism 75 never touches directly the steel pipe 2 to scrape the coating resin 3 from the steel pipe 2, there is no fear of cutting off dust of the steel pipe 2 and getting it into the separated coating resin 3.

As the central ridges of the peripheral surfaces 76e•76e, which are of a gabled roof shape and face the high-frequency induction coil 21, come in contact with the incision lines 18•18 made at the upper and lower positions of the coating resin 3 of the resin-coated steel pipe 1 moving in the running direction thereof, the forces f•f are exerted against the incision lines 18•18.

Therefore, the impacts that the resin-coated steel pipe 1 receives as the forces f•f are exerted against the incision lines 18•18 of the coating resin 3, generate repulsive forces (R in FIG. 32) toward right and left acting on the fore ends of the coating resin 3 which is already cut into two, that is, right and left pieces by the incision lines 18•18 on the periphery of the resin-coated steel pipe 1 and thereby the coating resin 3 is separated from the steel pipe 2 and severed into right and left pieces along the incision lines 18•18 and away from the steel pipe 2 toward right and left, the only ways out for the respective pieces.

The severed pieces of the coating resin 3 are guided by the run guide 27 in the running direction thereof.

The separating mechanism 75 is provided between the high-frequency induction coil 21 and the take-up roll device 80 as taking up means independently and exclusively for separating operation, the performance thereof as separating means can be enhanced more.

The embodiment of the take-up device 80 as take-up means is described below with reference to FIGS. 23,24 and 34–36.

Figure 23:
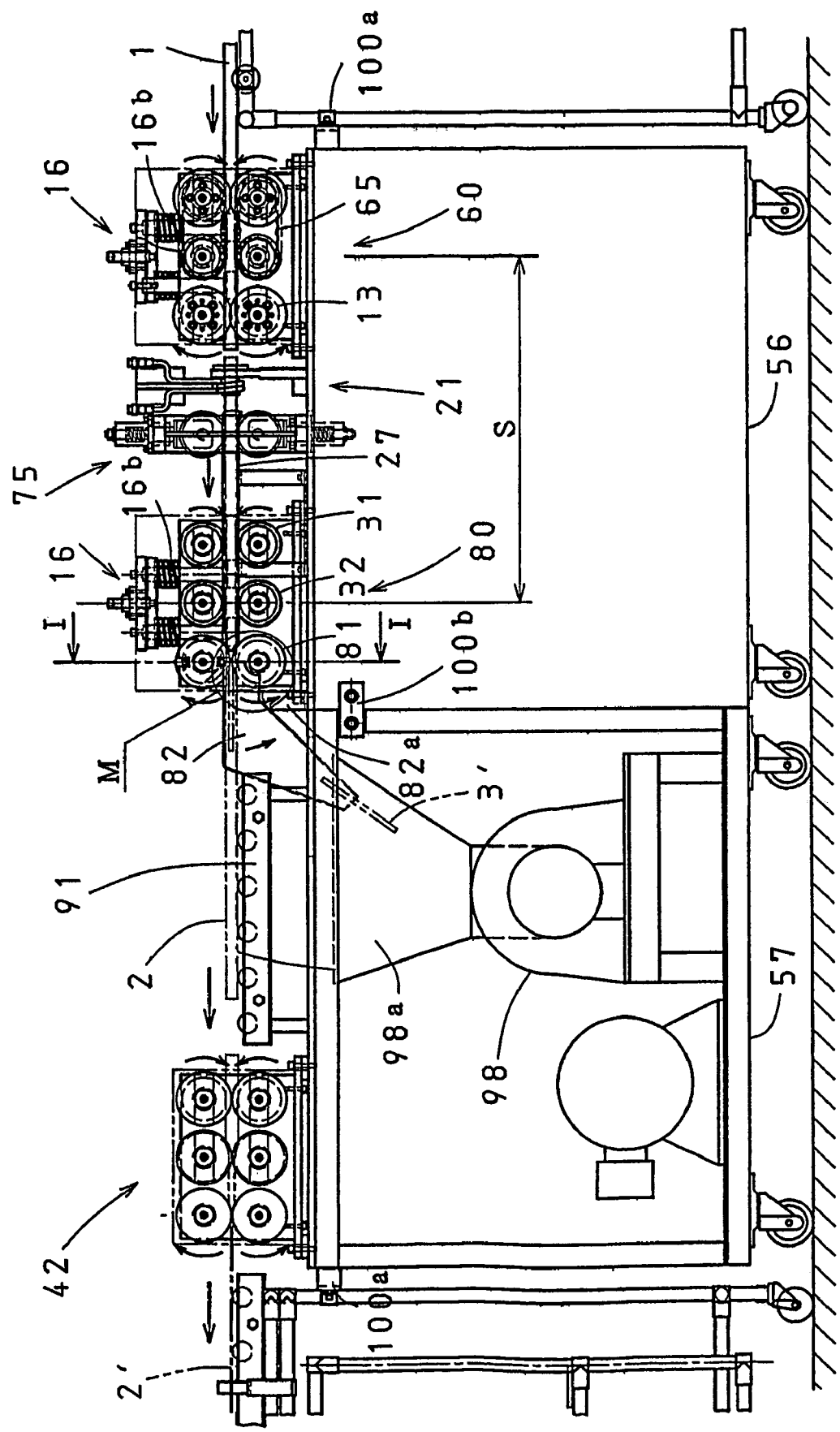
FIG. 23 is an enlarged front view of the main part and the coupling part between the main part and the steel pipe recovering part of the separating and recovering apparatus of FIG. 21.
Figure 24:
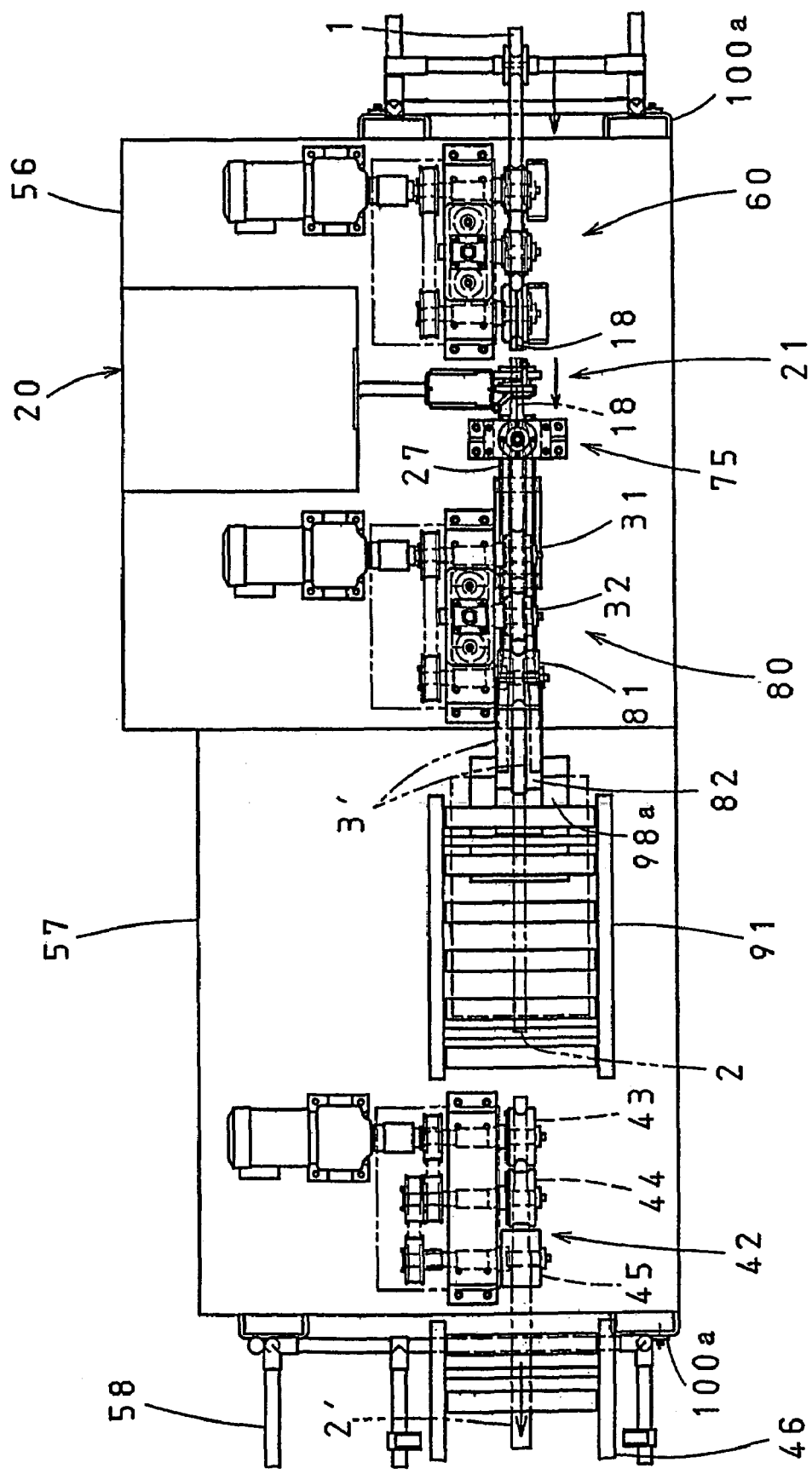
FIG. 24 is a plan view of the main part and the coupling part of FIG. 23.
Figure 25:
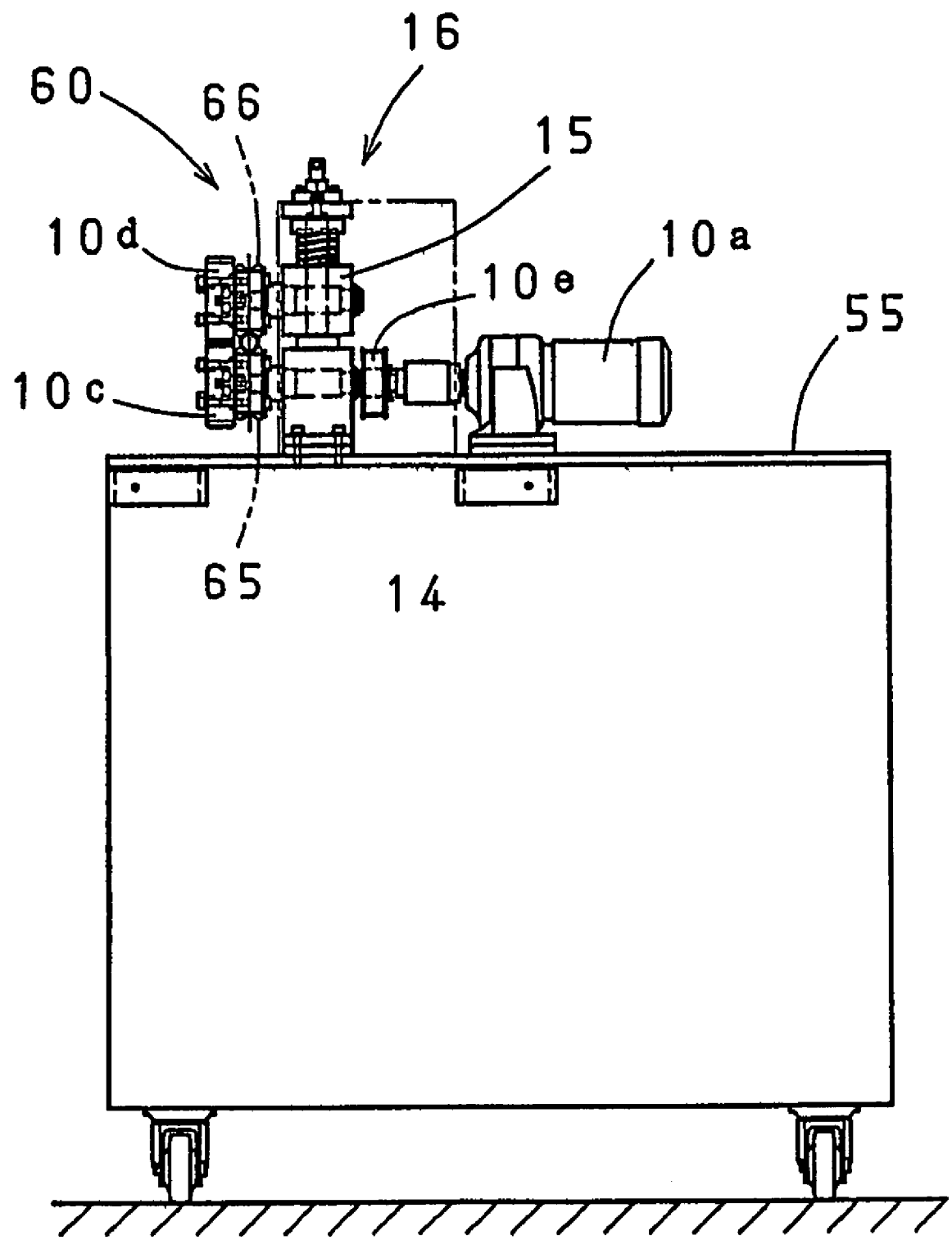
FIG. 25 is a right side view of the main part of FIG. 3.

As shown in FIGS. 23 and 24, the take-up roll device 80 comprises a fixed block, a movable block and three sets of take-up rolls, and, since the composition that each of the three sets of the take-up rolls consists of two division rolls located at the upper and lower positions opposing each other, of which the lower one is incorporated in the fixed block and the upper one is incorporated in the movable block, and that a mechanism to give pressing force is incorporated in the combination of the fixed and the movable blocks are the same as the feeding roll device 10 and the take-up device 30, having the same effects, the devices and members having the same functions are given the same symbols and the description thereof is omitted.

Of the three sets of the take-up rolls of the take-up roll device 80, the third set of the take-up rolls, that is, the two division rolls 81a•81b in the take-up rolls 81 on the side of the recovering device 90, have greater width than the rolls in the sets 31 and 32 as shown in FIG. 24, the flat portions 81d•81d of the periphery surface on the both sides of the groove 81c being accordingly wider. And, as shown in FIGS. 14 and 15, the outer diameters of the division rolls 81a•81b located at the upper and lower positions are set to have such a clearance therebetween as to be able to crush the right and left pieces of the coating resin 3•3 into inwardly folded and flat condition.

On the flat portions 81d of the upper division roll 81b, two cutting blades 81e•81e are attached at positions 180 degrees apart from each other with a connecting bolt 81g, for the purpose of not only crushing, but cutting the pieces of coating resin 3 into a determined length and thereby prevent the pieces of the coating resin 3 from being taken up by the smasher 98, while the coating resin 3 is passing in the take-up device 80 before being thrown in the smasher 98.

The second run guide 82 is provided in such a manner as to extend the length, starting in the running direction of the coating resin 3 from about the middle point of the third set of the division rolls 81a•81b, to a point ahead of the take-up roll device 80, and so as not to interfere with the take-up roll device 80 and the steel pipe 2, to confine the crushed right and left pieces 3'•3', (see FIGS. 23,24 and 35), and to be bent downward at a point before the first roller conveyer 91. By the second run guide 82, the pieces of the coating resin 3, which are severed, crushed flat and cut into a determined length, are guided to the smasher 98.

The number 82a designates the mounting base provided in the second guide 82.

Thus, the take-up roll device 80 feeds forward the steel pipe 2 by having the peripheral grooves of the division rolls take up the steel pipe 2 as the division rolls rotate. The flat portions 81d•81d of the peripheral surfaces on the both sides of the peripheral grooves 81c take up and crush the right and left coating resin pieces 3•3 moving in the running direction into a folded and flat condition, and simultaneously the cutting blades 81e•81e take up and cut the coating resin pieces 3•3 into a determined length and send the cut pieces to the second run guide 82.

The second run guide 82 guides the coating resin pieces 3'•3', crushed and cut into a determined length, to the smasher 99 described below.

According to the composition of the take-up roll device 80 described above, the take-up roll device 80 is able to crush flat the coating resin pieces 33 separated from the steel pipe 2, and cut them into pieces of a determined length.

The embodiment of the recovering device is described below with reference to FIGS. 23,24 and 37–39.

Ahead of the main part support 56 is provided the coupling part support 57 as the first support in the recovering device 90. As shown in FIGS. 23,24, on the coupling part support 57, in the running direction of the steel pipe 2, the first roller conveyer 91 is provided, which first receives the steel pipe 2 from the take-up roll device 30 and feeds forward the steel pipe 2, and, following the conveyer 91, the steel pipe crushing device 92, which crushes and feeds forward the steel pipe 2 is provided.

Since the steel pipe crushing device is of the same composition and has the same function and effects as the steel pipe crushing device 42 described in the first embodiment of the separating and recovering apparatus as shown in FIGS. 23 and 24, the devices and members having the same functions are given the same symbols and the description thereof is omitted.

Below the first roller conveyer 91 is mounted the smasher 98 having a hopper 98a provided thereon, and the smasher 98 receives from the second run guide 82, which has the end thereof extending into the hopper 98a at the rear side thereof seen in the running direction of the steel pipe 2, the right and left coating resin pieces 3'•3, which are crushed and cut into a determined length, and smashes them.

Figure 37:
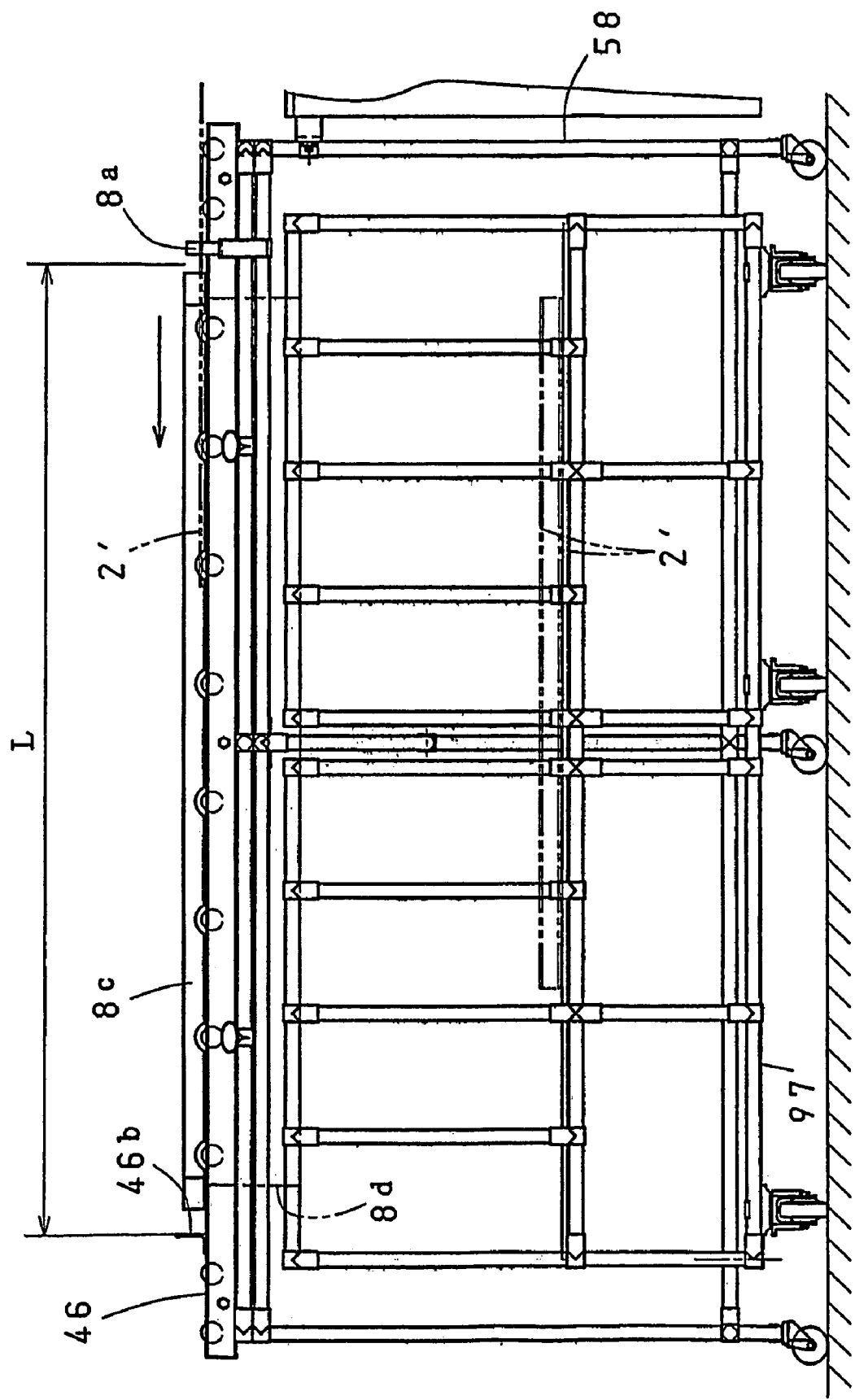
FIG. 37 is an enlarged front view of the steel pipe recovering part of the separating and recovering apparatus of FIG. 21.
Figure 38:
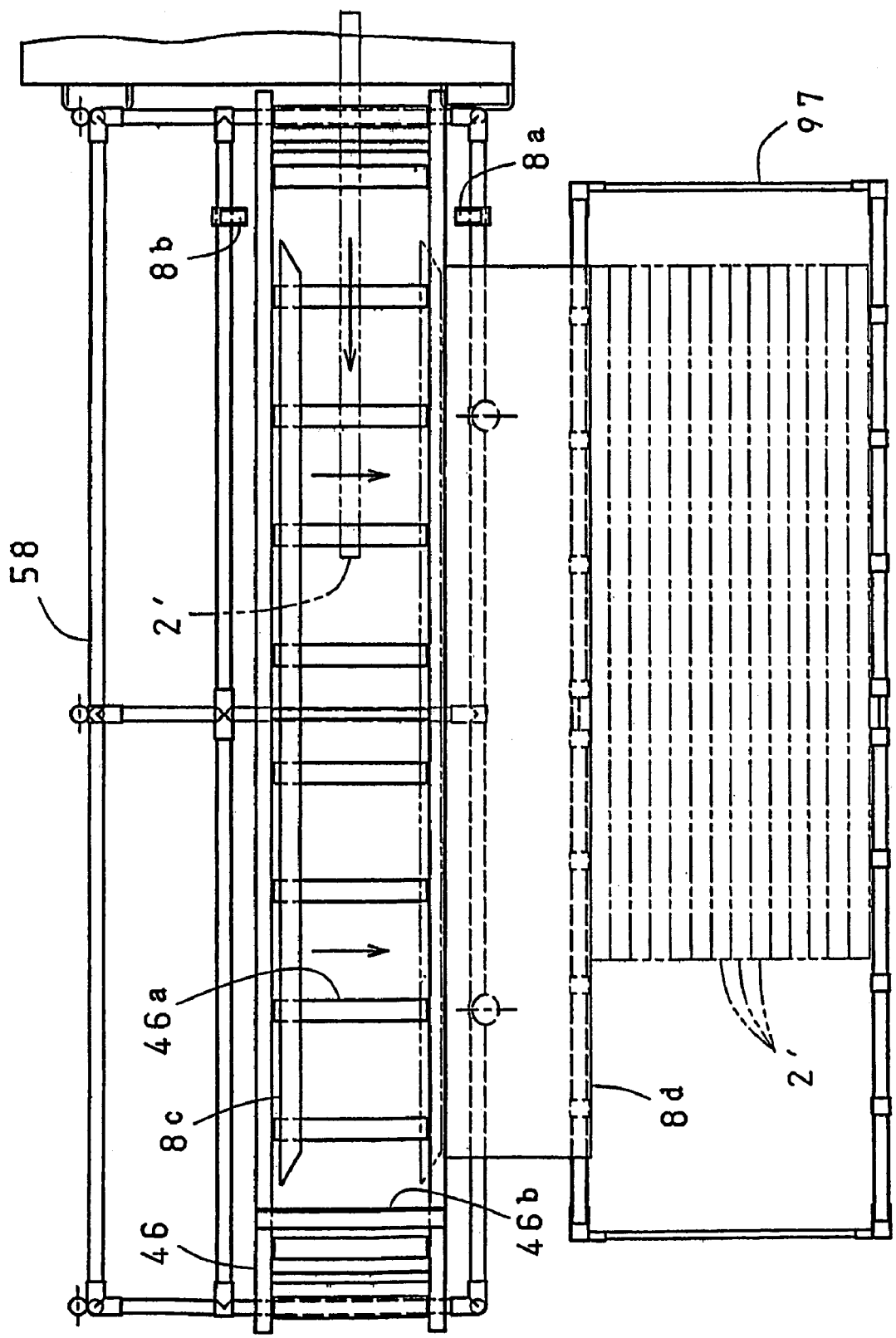
FIG. 38 is a plan view of the steel pipe recovering part of FIG. 37.
Figure 39:
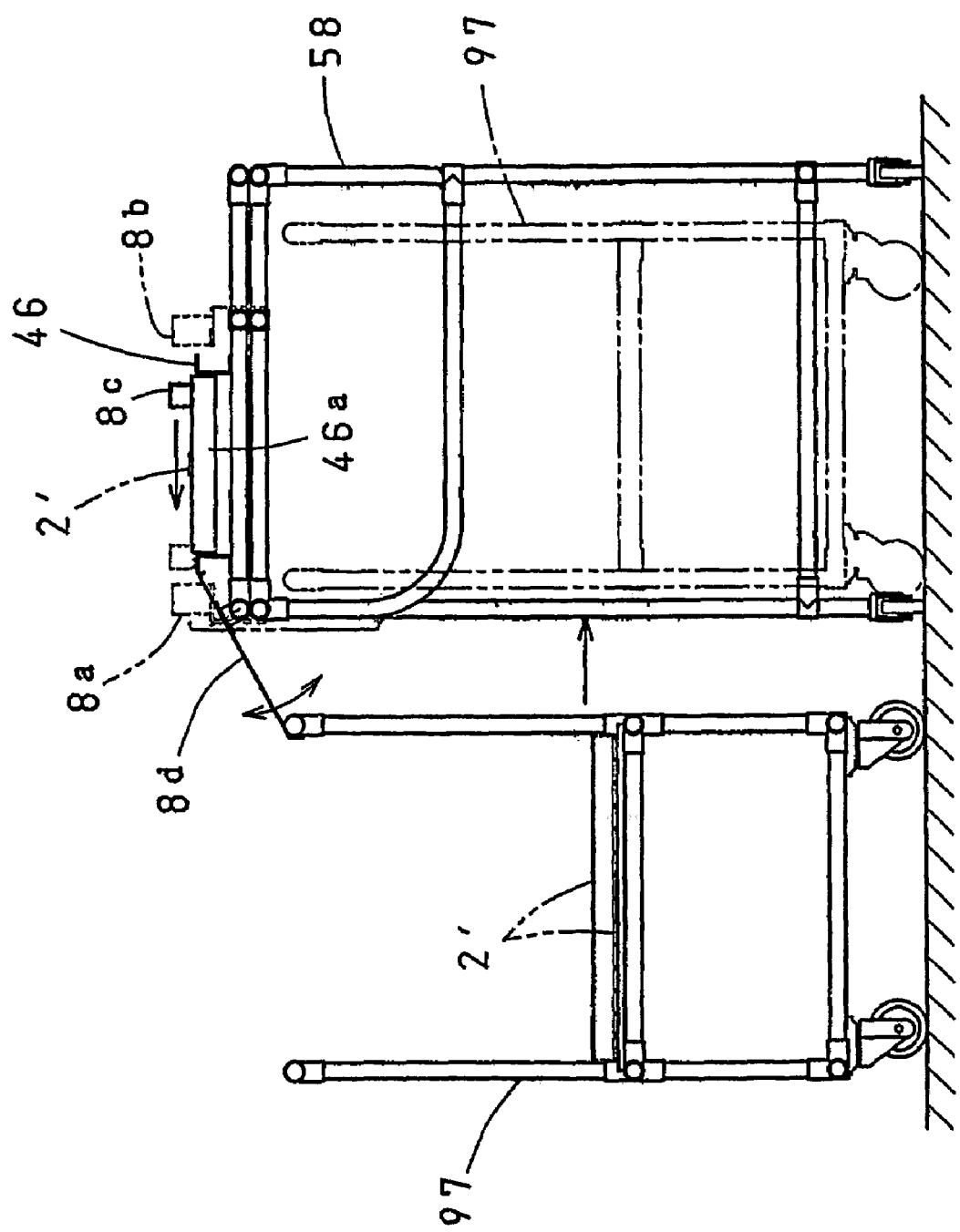
FIG. 39 is a right side view of the front central part of the steel pipe recovering part shown in FIG. 37.

Ahead of the coupling part support 57 is provided the steel pipe recovering part support 58. As shown in FIGS. 37–39, the steel pipe recovering part support 58 is provided with the second roller conveyer 46 on the upper surface thereof and the steel pipe recovering trolley 97 at the lower position. As shown in FIGS. 37–39, the second roller conveyer 46 and the devices and members to push and guide the crushed steel pipe 2' from the second roller conveyer 46 into the steel pipe recovering trolley 97, are the same as in the first embodiment of the separating and recovering apparatus, are given the same symbols to the devices and members having the same functions, and the description thereof is omitted.

According to the composition of the recovering device 90 described above, the separated steel pipe 2 and coating resin 3 can be recovered in segregated condition by smashing the pieces 3' of the coating resin 3 crushed flat and cut into a determined length, in the smasher 98 and by guiding the steel pipe 2' crushed flat but having the original length, into the steel pipe recovering trolley 97 (according to the invention stated in Claims 2 and 3).

Figure 40:
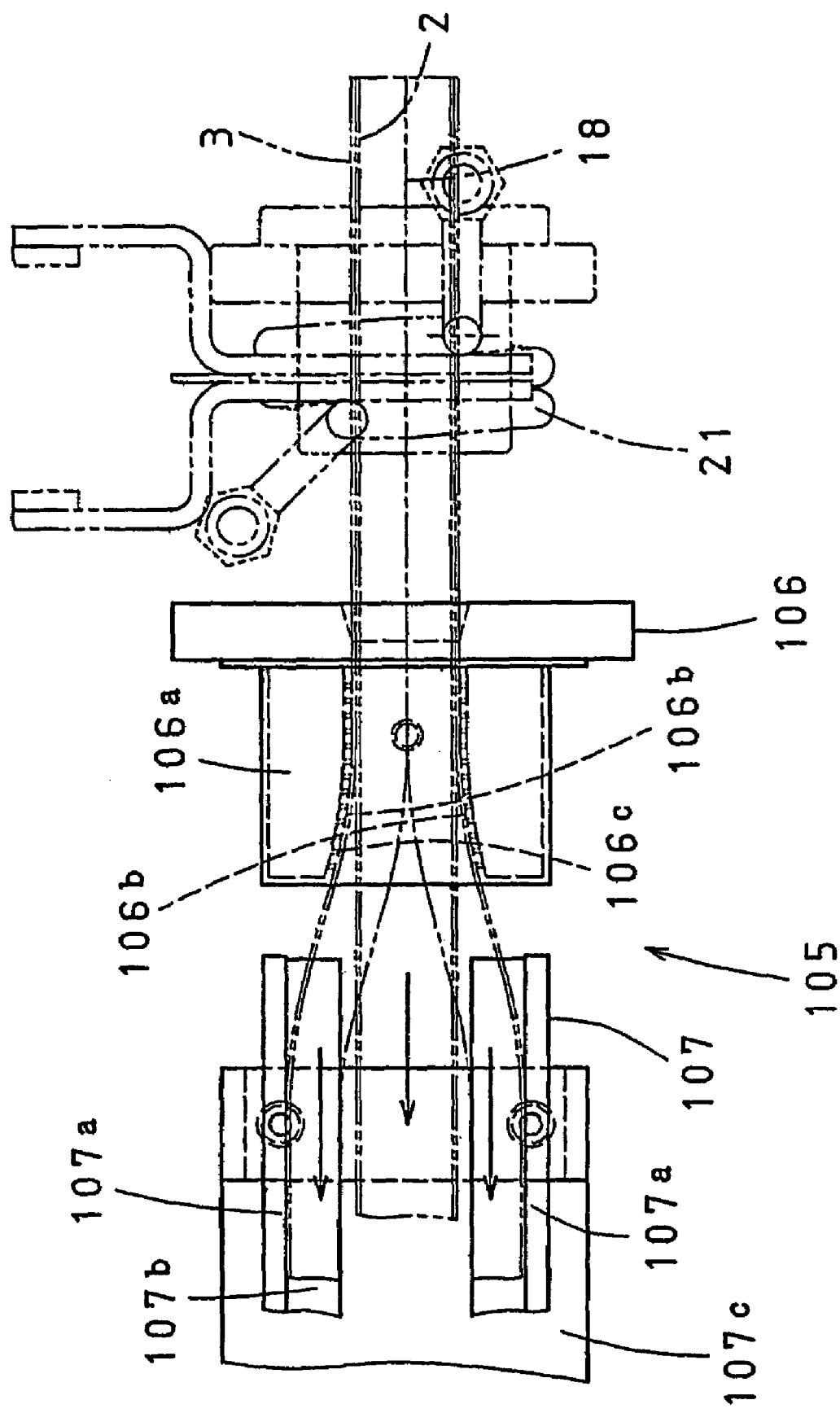
FIG. 40 is a front view of the third embodiment of the separating mechanism.
Figure 41:
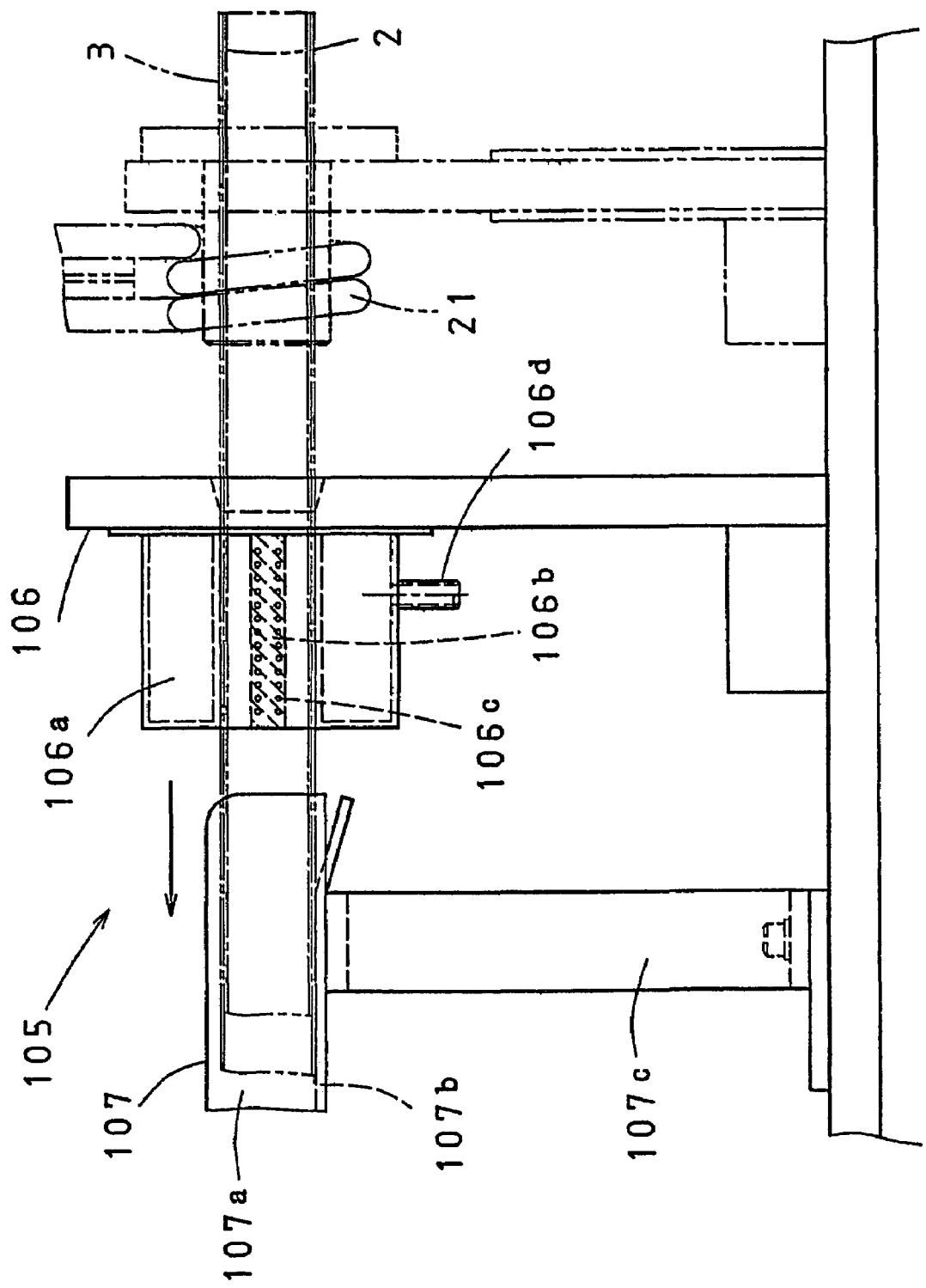
FIG. 41 is a plan view of the separating mechanism of FIG. 40.
Figure 42:
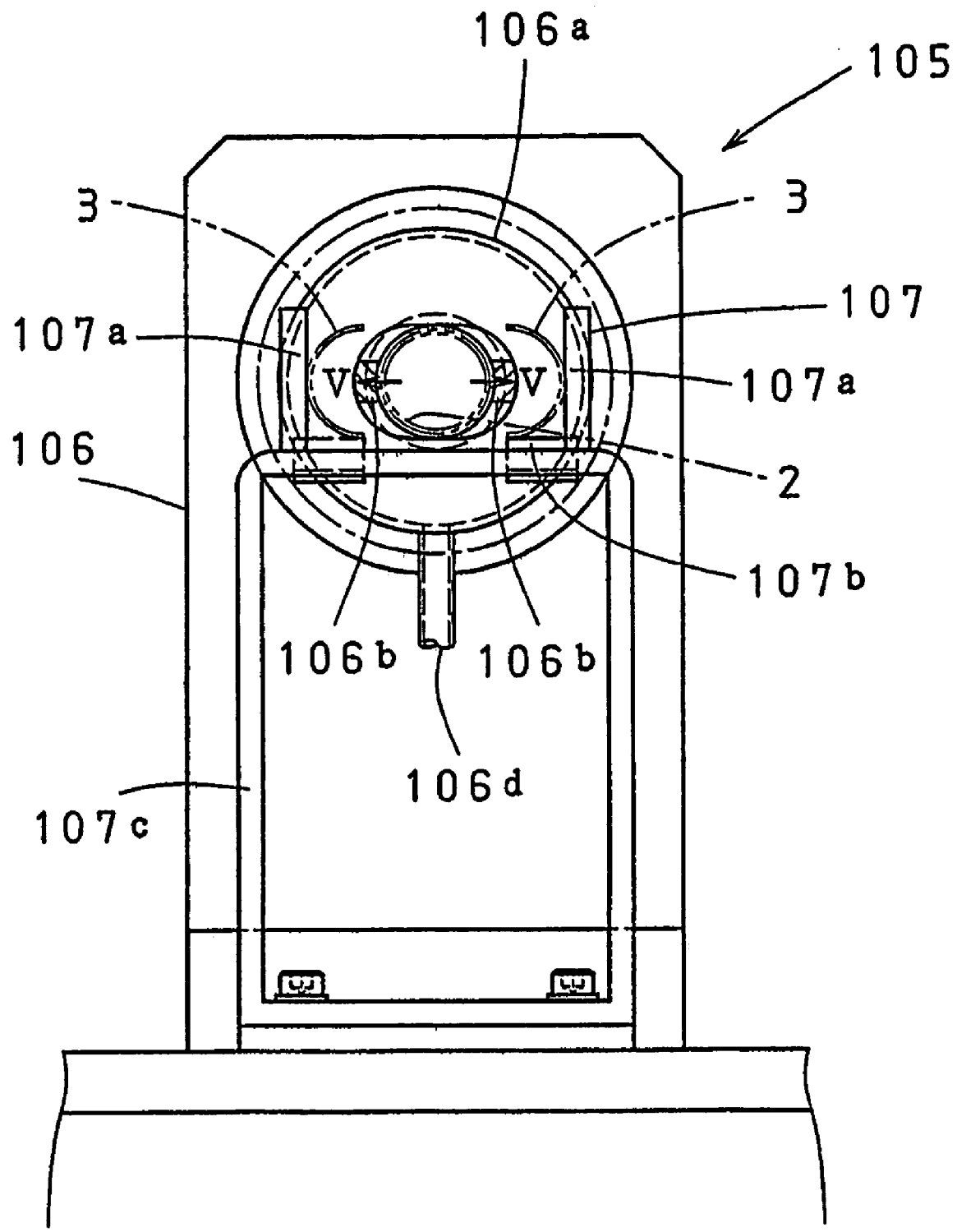
FIG. 42 is a right side view of the separating mechanism of FIG. 40.

The separating mechanism 105, which is the third embodiment as the separating means, is described below with reference to FIGS. 40–42.

The separating mechanism 105 is provided independently between the high-frequency induction coil 21 and the take-up device. The separating mechanism 105 comprises the sucking device 106 that has a plurality of sucking surfaces 106b, which surround the resin-coated steel pipe 1 and attract the outer surface of the coating resin 3, and a run guide 107 provided at a distance from the steel pipe 2 enclosing the pipe 2.

The sucking device 106 has the sucking surfaces 106b in such a manner as to diverge in distance from each other in the direction from the high-frequency induction coil 21 to the take-up device to pull away the coating resin 3 from the steel pipe 2. Passing the resin-coated steel pipe 1, which has the coating resin 3 divided into at least two parts along the sucking surfaces 106b of the sucking device 106 in action, the sucking device 106 attracts the pieces of the coating resin 3 and separates the coating resin 3, starting at the fore end thereof, from the steel pipe 2, and severs the coating resin 3 along the incision lines 18 and away from the steel pipe 2 into two pieces which are guided by the run guide 107 in the running direction thereof, (according to the invention stated in Claim 11).

In greater detail, the sucking device 106 has a pair of sucking surfaces 106b arranged inside a sucking cylinder 106a on the left and right sides to enclose the resin-coated steel pipe 1 corresponding to the upper and lower positions of the incision lines 18•18, and the two sucking surfaces 106b have numerous sucking holes 106c of a small diameter, (0.5 mm–1.0 mm, for example). The symbol 106d designates a sucking pipe.

The run guide 107, enclosing the steel pipe 2, extends the length between the position a little before the sucking pipe 106a and the position ahead of the take-up roll device 30, or 80, arranged in such a manner as not to interfere with the take-up roll device 30 or 80, and constitutes the rear part of the run guide having the right and left pieces 107a•107a and the lower piece 107 at a distance from the steel pipe 2.

According to the composition of the separating mechanism 105 described above, since the separating mechanism 105 never contacts with the steel pipe 2 to scrape the coating resin 3 from the steel pipe 2, there is no fear of cutting dust of the steel pipe 2 getting into the separated coating resin 3. By the sucking action of the sucking device 106 on the resin-coated steel pipe 1, which has the coating resin 3 divided into at least two parts and passes between the sucking surfaces 106b of the sucking device 106 in action, the pieces of the coating resin 3 are sucked to the right and left, (symbol V in FIG. 42) while running, and are thereby separated, starting at the fore end thereof, from the steel pipe 2 and severed along the incision lines 18 and away from the steel pipe 2 into two pieces. The severed pieces of the coating resin 3 are then guided by the run guide 107 in the running direction of the pipe.

The separating mechanism 105 is provided between the high-frequency induction coil 21 and the take-up roll device independently and exclusively for separating operation, which means that the performance thereof as separating means can further enhanced.

The separating mechanism 115 is described below as the fourth embodiment of the separating mechanism with reference mainly to FIGS. 43–46.

The separating mechanism 115 is different from the separating mechanism 25, the separating mechanism 75 and the separating mechanism 105, and can be, for example, incorporated in the set of the take-up rolls 31 of the take-up device 30 provided on the side of the high-frequency induction coil 21. First, the resin-coated steel pipe 1 is provided at the upper and lower positions with the incision lines 18•18. With the separating mechanism 115, the take-up device is constructed as the take-up roll device 30' consisting of at least two sets of take-up rolls of which one has two division rolls as the take-up rolls.

In the take-up roll device, the prescribed division rolls are given pressing force against the outer surface of the steel pipe 2 toward the axis thereof and take up the steel pipe 2 through rotation and engagement of the peripheral surfaces of the division rolls with the outer surface of the steel pipe 2. The separating mechanism 115 has in the take-up device 30' a set of take-up rolls 116 which are either formed or not on the periphery with a groove 116c of depth about ⅓ to ¼ of the radius of the steel pipe 2 or less and positioned on the side of the high-frequency induction coil 21, and has the run guide 117 enclosing the steel pipe 2 at a distance from it.

In the take-up roll device 30', as the peripheral portions of the grooves 116c, 116c a set of division rolls 116a•116b facing the high-frequency induction coil 21 come in contact with the two incision lines 1818 in the coating resin 3 of the resin-coated steel pipe 1 moving toward the peripheral surface portions, by exerting force against the incision lines 18•18, the division rolls 116a•116b separate the coating resin 3, starting at the fore end thereof, from the steel pipe 2 and sever the coating resin 3 along the incision lines 18•18 and away from the steel pipe 2 into right and left pieces, which are guided by the run guide 117 in the running direction of the pieces of the coating resin 3.

The arrangements of the incision lines 18•18 and the division rolls 116a•116b are not limited to the upper and lower positions, (according to the invention of Claim 8).

The embodiment of the separating mechanism 115 is described below in detail with reference to FIGS. 43–46.

The take-up device 30' consists of the three sets of take-up rolls 116,32 and 33, of which one set has as take-up rolls upper and lower division rolls. The take-up device 30', in a similar manner as the take-up device 30, by means of the force adjusting mechanism 16, gives the pressing force F to the division roll 116b incorporated in the upper movable block 15 toward the axis of the steel pipe 2. The division roll 116a incorporated in the upper movable block 14 also exerts as the reaction the force F' having the same magnitude as F against the steel pipe 2 toward the axis thereof.

The separating mechanism 115 comprises the set of take-up rolls 116 which, positioned on the side of the high-frequency induction coil 21, has the division rolls 116a•116b that are given a pressing force toward the axis of the steel pipe 2, the division rolls 116a•116b being either formed or not on the periphery with a groove 116c of depth about ⅓ to ¼ of the radius of the steel pipe 2 or less and the guide 117, which, opposing each other and enclosing the steel pipe 2, extends the length starting from a point a little before the two division rolls 116a•116b to a point ahead of the take-up roll device 30' in such a manner as not to interfere with the take-up roll device 30' and constitutes the rear part of the run guide which consists of the right and left pieces 117a•117a provided on the sides of the steel pipe 2 at a distance and the lower piece 117b.

Figure 44:
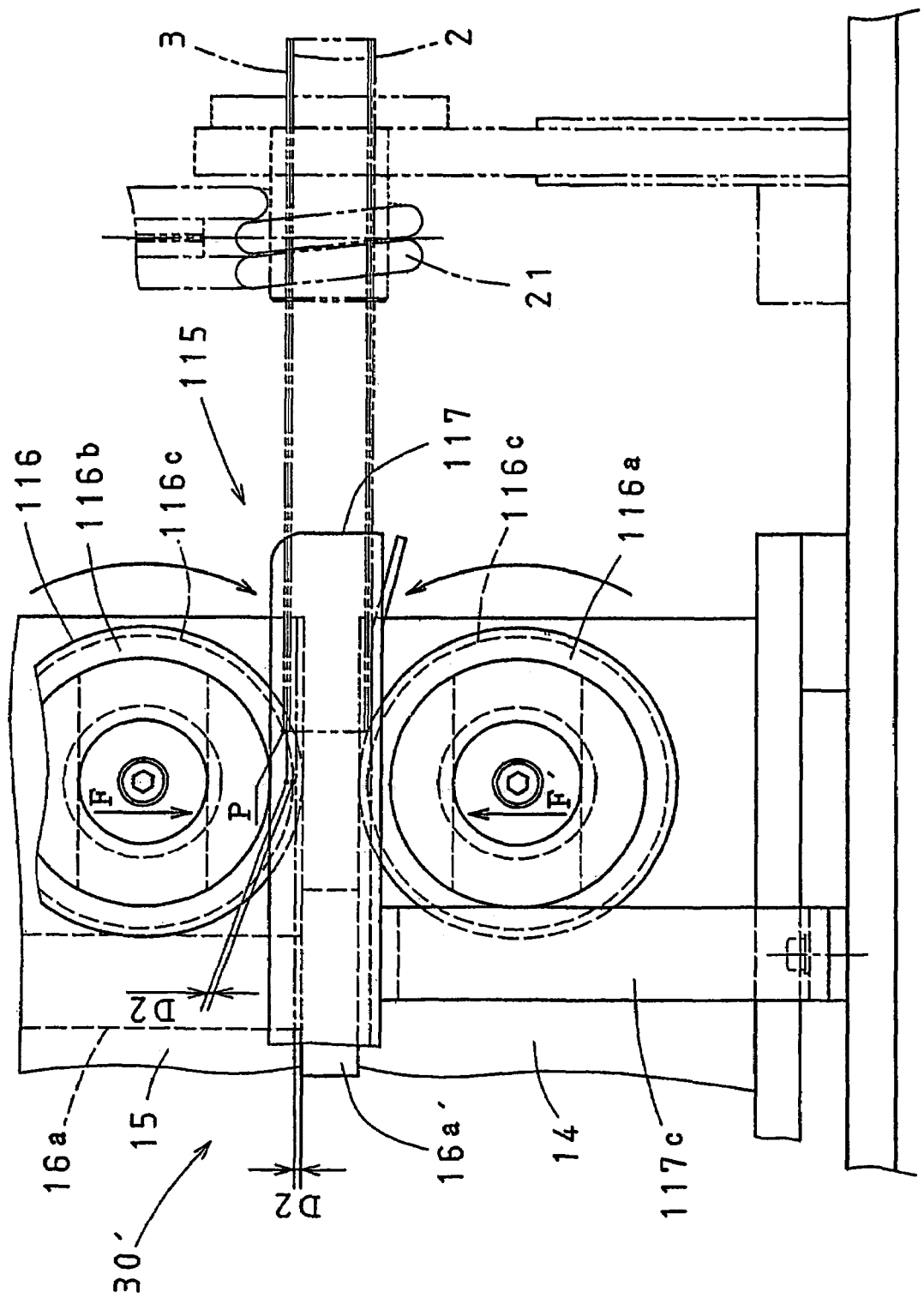
FIG. 44 is an enlarged front view of the separating mechanism of FIG. 43.
Figure 45:
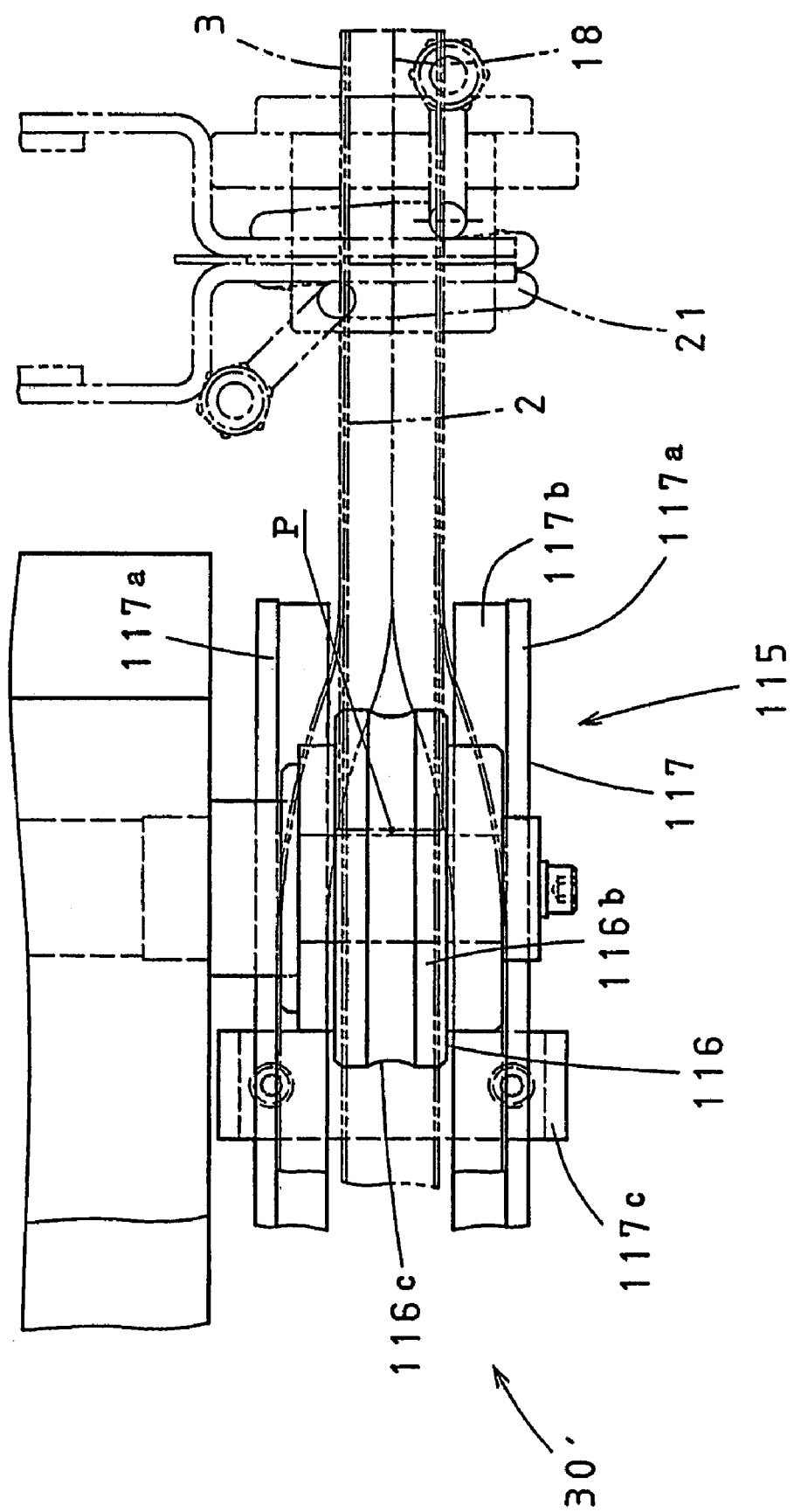
FIG. 45 is a plan view of the separating mechanism of FIG. 44.
Figure 46:
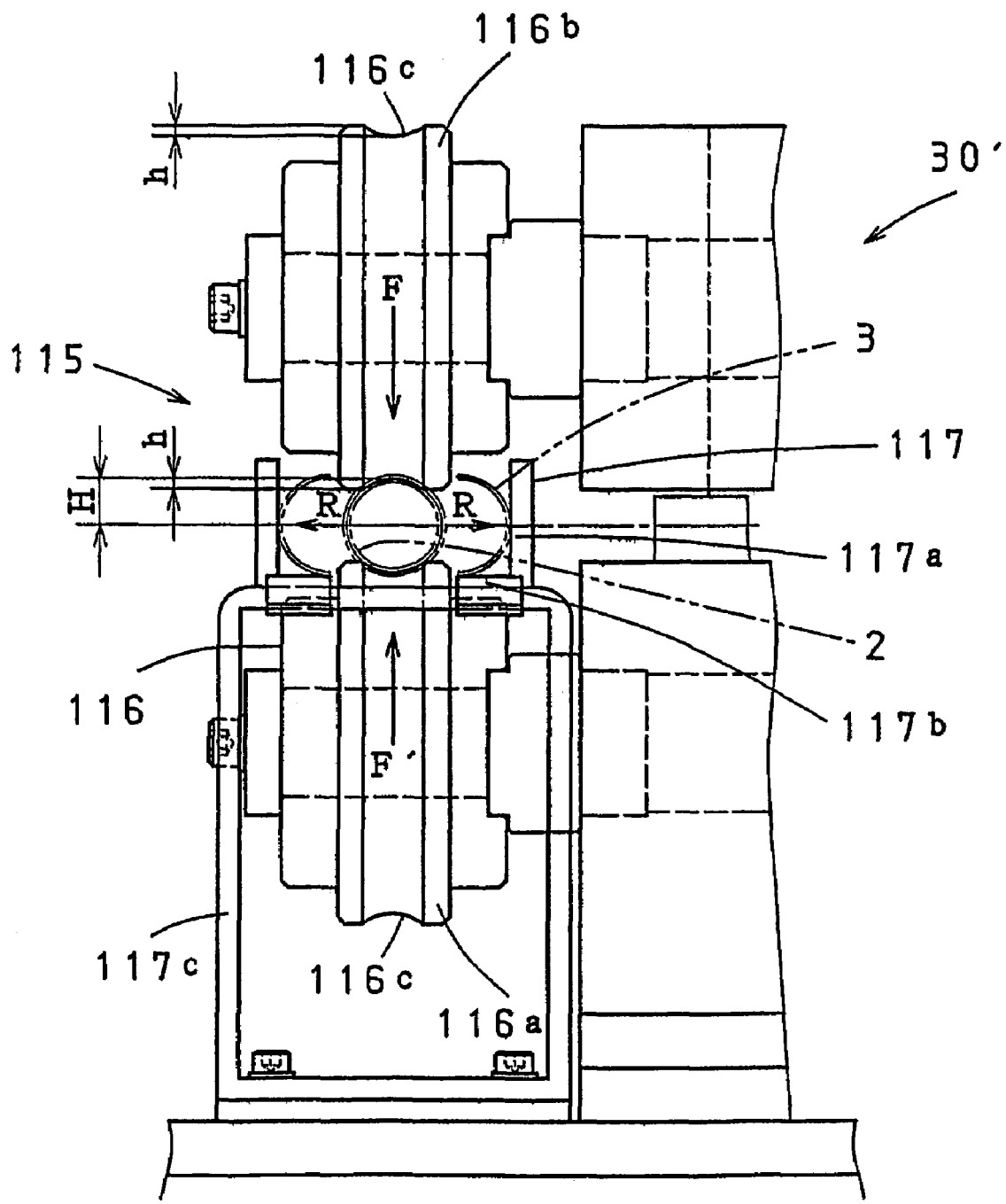
FIG. 46 is a right side view of the separating mechanism of FIG. 44.

The condition in which the lower surface of the movable block 15 contacts the upper surface of the bases 16a'•16a' of the standing axles 16a•16a defines the limit advanced position (the lowest position) of the division roll 116b incorporated in the movable block 15, (see FIG. 44).

In this limit advanced position of the division roll 116b, the position of the peripheral groove 116c or the peripheral surface of the division roll 116b in the direction toward the axis of the steel pipe 2 is set in such a manner that the peripheral groove 116c or the peripheral surface protrudes from the outer surface of the steel pipe 2, which comes forward by a quantity of 1 mm–2 mm, for example (symbol D in FIG. 44).

In this condition, when the portions of the peripheral groove 116c•116c or the peripheral surfaces facing the high-frequency induction coil 21 come in touch with the incision lines 18•18 (symbol P in FIG. 44) made at the upper and lower positions in the coating resin 3 of the resin-coated steel pipe 1 that comes toward the rolls 116a•116b, first the division roll 116b exerts force F against one of the incision line 18•18 and a little after that the division roll 116a exerts force F' against the other incision line 18.

According to the separating mechanism 115 described above, since the separating mechanism 115 never touches directly the steel pipe 2 to scrape the coating resin 3 from the steel pipe 2, there is no fear of cut off dust of the steel pipe 2 getting into the separated coating resin 3. And, when the portions of the peripheral groove 116c•116c or the peripheral surfaces facing the high-frequency induction coil 21 come in touch with the incision lines 18•18 made at the upper and lower positions in the coating resin 3 of the resin-coated steel pipe 1 that canes toward the rolls 116a•116b, forces F and F' are exerted against the incision line 18.

Therefore, the impacts that the resin-coated steel pipe 1 receives as the forces F•F' are exerted against the incision lines 18•18 of the coating resin 3, generate repulsive forces (R in FIG. 46) toward the right and left, acting on the fore ends of the coating resin 3, which is already divided into two, that is, right and left pieces by the incision lines 18•18 on the periphery of the resin-coated steel pipe 1 and as the fore ends of the coating resin 3 runs beyond the peripheral grooves 116c or the peripheral surfaces the coating resin 3 is not only separated from the steel pipe 2 but beyond the peripheral grooves 116c or the peripheral surfaces completely severed into right and left pieces along the incision lines 18•18, and away from the steel pipe 2 toward right and left, the only escape ways out for the respective pieces. The severed pieces of the coating resin 3 are guided by the run guide 117 in the running direction of the pipe.

Figure 43:
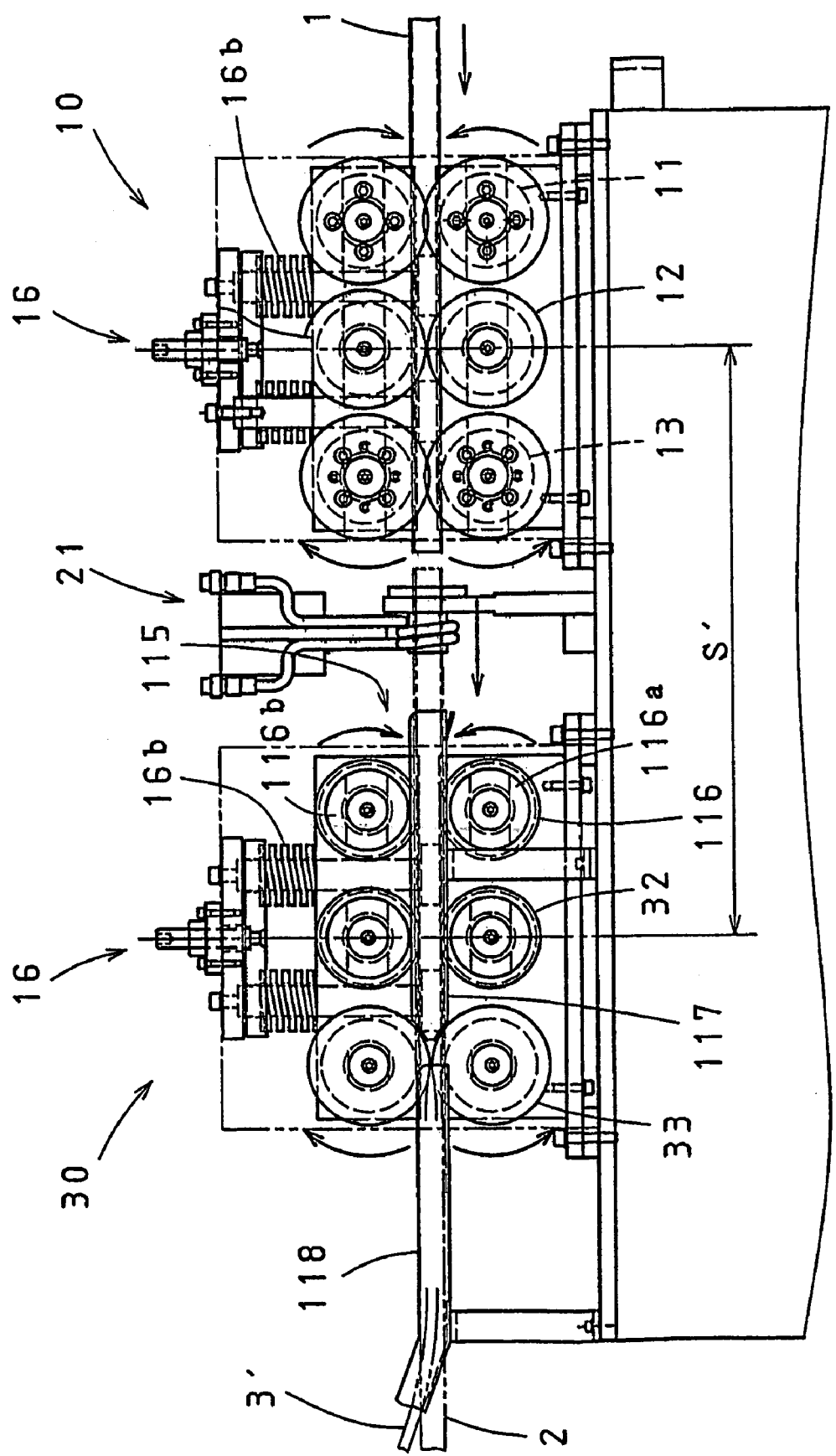
FIG. 43 is a front view of the fourth embodiment of the separating mechanism showing the device at the center and portions of the apparatus in front of and behind the device in the running direction of the steel pipe.

Further, the separating mechanism 115 has the division rolls 116a•116b that exert forces against the incision lines 18•18 at the upper and lower positions of the coating resin 3, and since the set of take-up rolls 116 is incorporated in the take-up roll device 30', the minimum suitable length of the resin-coated steel pipe 1 processed by the separating and recovering apparatus determined by the distance between the feeding device 10 and the take-up device 30' can be reduced, (see symbol S' in FIG. 43).

Figure 47:
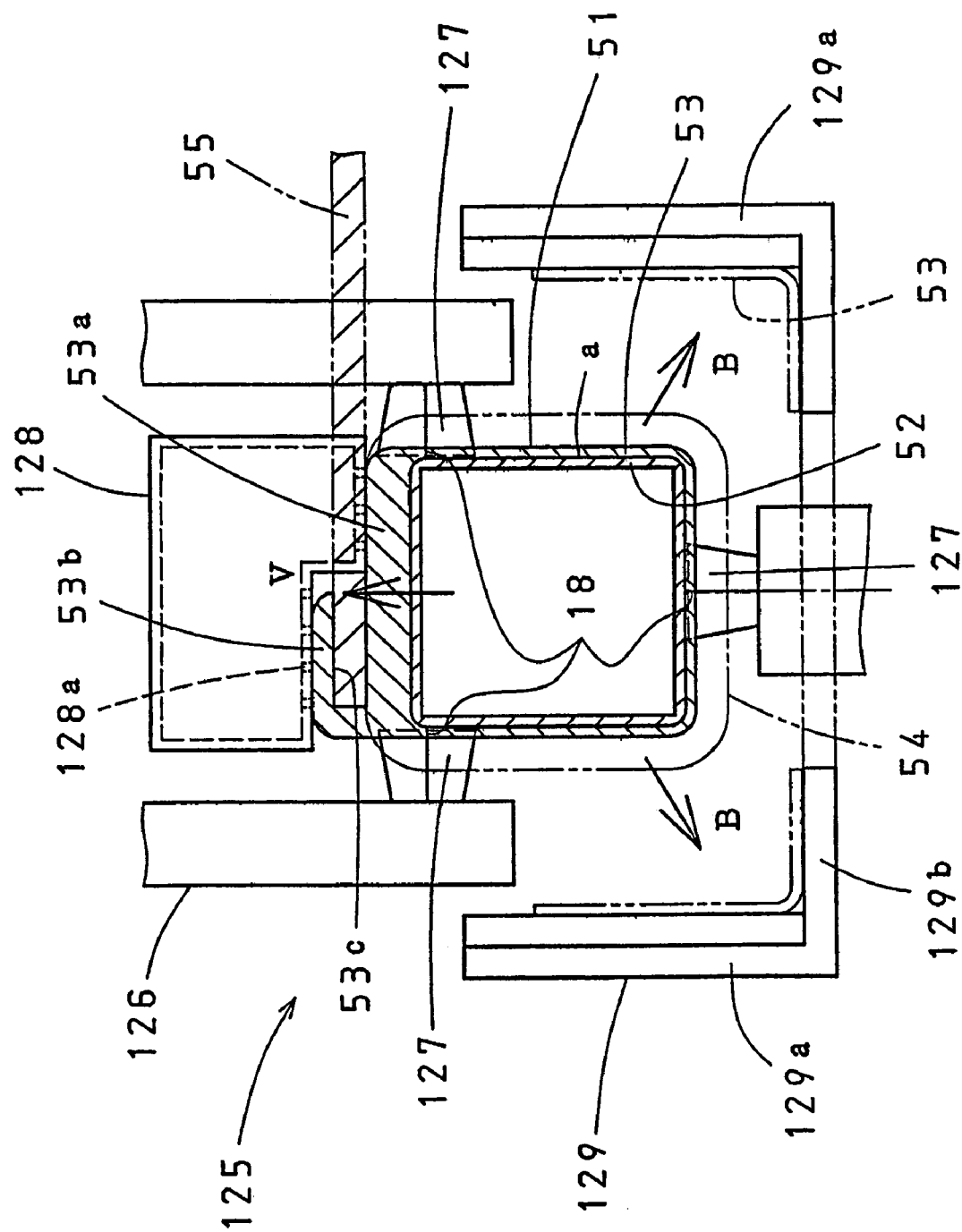
FIG. 47 is a side elevational view of the fifth embodiment of the separating mechanism.

The separating mechanism 125 is described below as the fifth embodiment of the separating mechanism based on FIG. 47.

The resin-coated steel pipe 51 has a square section and is made by adhering coating resin 53 on steel pipe 52. The coating resin 53 has a thick side 53a on which an L shaped rib 53b is provided to form a groove 53c. In the groove 53c is to be fit in a suitable panel member 55.

The dimensions of section of the resin-coated steel pipe 51 are about 27.7 mm×27.7 mm.

Symbol 54 designates a socket part of a suitable joint to connect the resin-coated steel pipe 51 and in the socket 54 the outer surface thereof is flush with the outer surface of the thick side 53a.

The incision lines 18 are provided at three positions of the coating resin 53, that is, when the section is seen with the thick side 53a as the upper side, two in the right and left sides at points near the thick side 53a and one at the center of the lower side.

The separating mechanism 125 is provided independently between the high-frequency induction coil and the take-up roll device as the separating mechanism 25, the separating mechanism 75 and the separating mechanism 105, (not shown in the drawings).

In the separating mechanism 125, three dividing blades 127,127,127 are fixed, with the same considerations as with respect to the separating mechanism 25, on the body 126 at positions corresponding to the three incision lines 18•18•18 in such a manner that the pointed ends thereof respectively oppose the incision lines in the coating resin 53 of the resin-coated steel pipe 51 moving in the running direction. Adjacent to the thick side 53a is provided a sucking cylinder 128.

A run guide 129 having right and left pieces 129a and 129b and a lower piece 129c is provided at a distance from the resin-coated steel pipe 51 and at a little lowered position in such a manner so as not to interfere with the resin-coated steel pipe 51 and the separating mechanism 125.

By the splitting and spreading action of the three dividing blades 127,127,127 (symbol B in FIG. 47) and by the sucking action of the sucking cylinder 128 (symbol V in FIG. 47), the coating resin 53 is, starting at the fore end thereof, separated from the steel pipe 52 and severed along the incision lines and away from the steel pipe 52 into two pieces which are guided by the run guide 129 in the running direction of the pipe.

According to the composition of the method and the apparatus to separate and recover steel pipe and coating resin from resin-coated steel pipe described above, the resin-coated steel pipe 1,51 made by adhering thermoplastic resin 3,53 on steel pipe 2,52 is, at the position a little before passing the high-frequency induction coil 21, already given the incision lines 18, which reach in depth from the surface of the coating resin 3,53 to the surface of the steel pipe 2,52, by an incision means throughout the length of the resin-coated steel pipe 1,51 and has the coating resin 3,53 circumferentially divided precisely into at least two parts.

By high-frequency induction heating, the steel pipe 2,52 is heated, by the time it reaches the separating mechanism 25,75,105,115,125 located at an appropriate position arrived at immediately after heating process, to a temperature at which the bottom layer of the coating resin 3,53 adjacent to the boundary of the steel pipe 2,52 reaches a condition separable from the steel pipe 2,52, while the outer layer of the coating resin 3,53, at least the outer half thereof is kept under the softening temperature.

The separating mechanism 25,75,105,115 or 125 separates the coating resin 3,53 from the steel pipe 2,52 through separation and does not scrape off the coating resin 3,53 from the steel pipe 2,52 by the incision blades or other tools that are tightly fit to the section contour of the moving steel pipe 2,52, thereby generating friction.

Further, by the separating mechanism 25,75,105,115 or 125, the coating resin 3,53 is separated from the steel pipe 2,52 and severed along the incision lines 18 and away from the steel pipe 2,52 into at least two pieces, which are guided by the run guide in the running direction thereof.

After that, the steel pipe 2' and the coating resin 3', separated and crushed flat, are recovered by the recovering device 40,90 in segregated condition.

This invention is not construed as limited to the particular forms disclosed herein.

As a means to make incision lines, for example, in addition to incision blades, laser beam, supersonic waves, etc., can be utilized. Or the means to make incision lines may be installed separately from the feeding device.

INDUSTRIAL UTILIZATION

According to the method and apparatus to separate steel pipe and coating resin from resin-coated steel pipe stated in Claim 1 and 13, the following effects can be expected:

1) At the position before passing the high-frequency induction coil, the incising means are capable of making the incision lines that reach in depth from the surface of the coating resin to the surface of the steel pipe, and can thereby divide the steel pipe 2,52 circumferentially precisely into at least two parts.

Thus, since the coating resin will certainly maintain this divided condition after passing the high-frequency induction coil, in the process executed by the separating mechanism provided at a position arrived at immediately after passing the high-frequency induction coil, the coating resin will certainly be, starting at the fore end thereof, separated from the steel pipe and severed along the incision lines and away from the steel pipe into at least two pieces, which pieces are guided by the run guide in the running direction of the pipe, and the severing and guiding process being continued, the coating resin is severed throughout the length of the pipe along the incision lines into at least two pieces.

2) Since the steel pipe is heated by the high-frequency induction heating to a condition such that the layer of the coating resin adjacent to the boundary of the steel pipe is separable at the separating mechanism, the separating mechanism is able to separate the coating resin which is circumferentially divided into two parts from the steel pipe, by peeling, without scraping the coating resin off the steel pipe which produces pieces or dust of the steel pipe, eliminating the fear that the cut off pieces or dust of the steel pipe will get into the recovered coating resin.

The recovered coating resin can, therefore, be easily recycled for use.

3) The separating mechanism does not scrape the coating resin from the steel pipe by blades or other tools that are tightly fit to the section contour of the moving steel pipe, thereby also generating friction, and there is no fear that the separated coating resin will stick or accumulate.

Therefore, the apparatus can be operated continuously.

According to the method and apparatus to separate steel pipe and coating resin from resin-coated steel pipe stated in Claims 2–12, in addition to the effects of Claims 1 and 13, the following effects can be expected:

According to the invention stated in Claim 2, the coating resin severed along the incision lines and away from the steel pipe into at least two pieces is recovered by the recovering device in flat-crushed and appropriately smashed condition. Each piece of severed coating resin which is crushed into flat condition before smashing process turns more easily to the crushed side, which means that the part of the apparatus from the take-up device to the recovering device can be selectively designed and practiced preferably to locate the smasher, etc., at suitable positions to utilize the fact that the crushed resin pieces can be made to change direction more easily to the crushed side.

Therefore, in one apparatus for separating and recovering, the whole operation, from supplying resin-coated steel pipes to recovering separated coating resin, can be executed in a consistent preferred manner.

According to the invention stated in Claim 3, the steel pipe is recovered after being crushed into flat and reduced in volume, with the length remaining the same.

Therefore, in one apparatus for separating and recovering, the whole operation, from supplying resin-coated steel pipes to recovering separated coating resin, can be executed in a consistent preferred manner.

According to the invention stated in Claim 4, since the separating mechanism separates the coating resin circumferentially cut into two parts from the steel pipe when the steel pipe is heated by means of high-frequency induction heating to a temperature at which the layer of the coating resin adjacent to the boundary of the steel pipe reaches a condition separable from the steel pipe, while at least the exterior side of the outer layer of the coating resin is kept under the temperature at which softening occurs, the pieces of the separated coating resin maintain adequate rigidity.

The pieces of the separated coating resin are, therefore, easily guided in a determined course by the run guide and can easily be recovered.

According to the stated in Claim 5, the feeding roll device consists of two or two or more sets of feeding rolls and the incision blades as means to make incision lines are provided in one set of feeding rolls.

Therefore, to provide the means to make incision blades does not result in an increase in size of the apparatus, which means that savings on the manufacturing cost of the apparatus are possible.

According to the invention stated in Claim 6, in addition to the effects of Claim 5, the following effects can be expected:

In the feeding roll device, the incision blades are provided in the set of feeding rolls, which, located on the side of the high-frequency induction coil, consists of rolls given pressing force toward the axis of the resin-coated steel pipe.

Therefore, the resin-coated steel pipe is stably supported at the portion behind the set of the feeding rolls on the side of the high-frequency induction coil by the remaining sets of the feeding rolls, which enables the stable making of incision lines throughout the length of the resin-coated steel pipe.

According to the invention stated in Claim 7, in addition to the effects of Claim 5 and 6, the following effects can be expected:

The incision blades have the edge angle not greater than about 30 degrees and can cut the coating resin neatly without squashing the resin.

Therefore, the cut condition of the coating resin is maintained naturally not only before but also after the coating resin passes the high-frequency induction coil.

According to the invention stated in Claim 8, the separating mechanism has the take-up roll device consisting of two or more sets of take-up rolls, each having two division rolls, one set of take-up rolls which, located on the side of the high-frequency induction coil, includes the roll given pressing force toward the axis of the rein-coated steel pipe and have the peripheral surfaces either formed with peripheral grooves or not, and the run guide provided at a distance from the steel pipe to enclose it, and the portions of the peripheral grooves or surfaces of the set of take-up rolls facing the high-frequency induction coil exert force against the two incision lines in the coating resin of the resin-coated steel pipe, which runs toward the grooves or surfaces.

Therefore, the impact that the resin-coated steel pipe receives as forces are exerted against the incision lines of the coating resin, generate repulsive forces toward the right and left acting on the fore ends of the coating resin which is already divided into two, that is, right and left pieces by the incision lines on the periphery of the resin-coated steel pipe, and thus, the coating resin is separated and peeled from the steel pipe and run beyond the grooves or the surfaces, severed into right and left pieces along the incision lines, and away from the steel pipe toward right and left, the only ways out for the respective pieces. As the severing and guiding process is continued, the coating resin is severed throughout the length of the pipe along the incision lines into two right and left pieces.

Further, the separating mechanism has in the take-up roll device one set of take-up rolls incorporated therein which, located on the side of the high-frequency induction coil, exert force against the two incision lines in the coating resin. This means the minimum suitable length of the resin-coated steel pipe determined by the distance between the feeding device and the take-up device can be reduced, making it possible to process shorter resin-coated steel pipes for separating and recovering steel pipe and the coating resin.

Furthermore, the separating mechanism, if provided, can be incorporated in the take-up roll device, without an increase in size of the apparatus, which means that savings on the manufacturing cost of the apparatus are possible.

According to the invention stated in Claim 9, the separating mechanism is provided independently between the high-frequency induction coil and the take-up device and comprises the dividing blades constructed in the prescribed manner and the run guide arranged at a distance to enclose the steel pipe, the pointed tips of the blades being made to hit the incision lines in the coating resin of the resin-coated steel pipe.

Therefore, by the dividing and spreading action of the pointed tips of the dividing blades against the coating resin, divided into parts by the incision lines provided therein, the coating resin is, starting at the fore end thereof, as the parts run in diverging directions, separated from the steel pipe and severed along the incision lines and away from the steel pipe into at least two pieces. The severed pieces of the coating resin are then guided in the running directions of the pipe by the run guide. As the severing and guiding process is continued, the coating resin is severed throughout the length of the pipe along the incision lines into at least two pieces. Thus, the operations described above are executed more securely.

According to the invention stated in Claim 10, the separating mechanism is provided independently between the high-frequency induction coil and the take-up device and comprises the set of division rolls consisting of two rolls of which one roll is given force against the surface of the steel pipe toward the axis thereof and the run guide provided at a distance from the steel pipe to enclose it, the two division rolls being of such construction that the portions of the surfaces of the two division rolls facing the high-frequency induction coil exert force against the two incision lines in the coating resin of the resin-coated steel pipe which comes running toward the surfaces and the two division rolls have the peripheral surfaces formed with the selected prescribed shape.

Therefore, the impact that the resin-coated steel pipe receives as forces is exerted against the incision lines of the coating resin, generate repulsive forces toward right and left acting on the fore ends of the coating resin, which is already cut into two, that is, right and left pieces by the incision lines on the periphery of the resin-coated steel pipe, and thus the coating resin is separated and peeled from the steel pipe and severed into right and left pieces along the incision lines and away from the steel pipe toward right and left, the only ways out for the respective pieces. The severed pieces are then guided in the running direction of the pipe by the run guide. As the severing and guiding process is continued, the coating resin is severed throughout the length of the pipe along the incision lines into two right and left pieces. The operations described above are executed more securely.

According to the invention stated in Claim 11, the separating mechanism is provided independently between the high-frequency induction coil and the take-up device and comprises a sucking device having sucking surfaces of prescribed construction and the run guide provided at a distance from the steel pipe to enclose it, and the resin-coated steel pipe having the coating resin divided into at least two parts and moving in the running direction of the pipe passes through the sucking device in sucking action.

Therefore, by the sucking action of the sucking device on the coating resin of the passing resin-coated steel pipe, the parts of the coating resin are sucked to individual directions while running and the coating resin is, starting at the fore end thereof, thereby separated and peeled from the steel pipe and severed along the incision lines and away from the steel pipe into at least two pieces. The severed pieces are then guided in the running direction thereof by the run guide. As the dividing and guiding process is continued, the coating resin is severed throughout the length thereof along the incision lines into two right and left pieces. The operations described above are executed more securely.

According to the invention stated in Claim 12, the incision lines are made at the upper and lower positions and the separating mechanism has the run guide constituting of the right and left pieces and the lower piece located at a distance from the steel pipe to enclose it.

Therefore, the means to make incision lines and the separating mechanism can be both constructed simply by giving them a consistent, mutual relation.

Further, the whole construction from the means to make incision lines and to the take-up device can also be made rational and simple.

What is claimed is:

1. A method to separate and recover steel pipe and coating resin from resin-coated steel pipe, intended to process a resin-coated steel pipe which consists of steel pipe and coating resin adhered to an outer surface of said pipe, employing a separating and recovering apparatus having a feeding device, a high-frequency induction heating device, a separating mechanism, a take-up device and a recovering device, said feeding device feeding said resin-coated steel pipe of certain length in a running direction thereof thereby passing and heating said resin-coated steel pipe inside or near a high-frequency induction coil of said high-frequency induction heating device, said separating mechanism, which is located at a certain position reached immediately after a heating process separating said coating resin from said steel pipe, said take-up device taking up said steel pipe in said running direction thereof and said recovering device recovering said separated steel pipe and coating resin, characterized in that a cutting means located at a position before said high-frequency induction coil makes incision lines in said coating resin that reach in depth from a surface of said coating resin to said surface of said steel pipe and extend throughout a length of said resin-coated pipe at positions that divide a periphery of said coating resin into at least two parts, that by means of high-frequency induction heating, said steel pipe is heated in such a manner that, when it reaches said separating mechanism located at an appropriate position arrived at immediately after a heating process, a bottom layer of said coating resin adjacent to a boundary of said steel pipe reaches a condition separable from said steel pipe, that said separating mechanism separates said coating resin from said steel pipe and severs said coating resin along said incision lines and away from said steel pipe into at least two pieces and then guides severed pieces of said coating resin in said running direction thereof, and that said recovering device recovers said resin pieces by smashing said resin pieces that are crushed flat in prescribed processes, including a taking-up process by said take-up device.

2. A method to separate and recover steel pipe and coating resin from resin-coated steel pipe, intended to process a resin-coated steel pipe which consists of steel pipe and coating resin adhered to an outer surface of said pipe, employing a separating and recovering apparatus having a feeding device, a high-frequency induction heating device, a separating mechanism, a take-up device and a recovering device, said feeding device feeding said resin-coated steel pipe of certain length in a running direction thereof thereby passing and heating said resin-coated steel pipe inside or near a high-frequency induction coil of said high-frequency induction heating device, said separating mechanism, which is located at a certain position reached immediately after a heating process, separating said coating resin from said steel pipe, said take-up device taking up said steel pipe in said running direction thereof and said recovering device recovering separated steel pipe and coating resin, characterized in that a cutting means located at a position before said high-frequency induction coil makes incision lines in said coating resin that reach in depth from a surface of said coating resin to said surface of said steel pipe and extend throughout a length of said resin-coated pipe at positions that divide a periphery of said coating resin into at least two parts, that by means of high-frequency induction heating, said steel pipe is heated in such a manner that, when it reaches said separating mechanism located at an appropriate position arrived at immediately after a heating process, a bottom layer of said coating resin adjacent to a boundary of said steel pipe reaches a condition separable from said steel pipe, that said separating mechanism separates said coating resin from said steel pipe and severs said coating resin along said incision lines and away from said steel pipe into at least two pieces and then guides severed pieces of said coating resin in said running direction thereof, and that said recovering device recovers said steel pipe after crushing it into a flat condition but maintaining an original length thereof.

3. A method to separate and recover steel pipe and coating resin from resin-coated steel pipe according to claim 2 or characterized in that by means of high-frequency induction heating, said steel pipe is heated in such a manner that, when it reaches said separating mechanism located at an appropriate position arrived at immediately after a heating process, said layer of said coating resin adjacent to said boundary of said steel pipe reaches a condition separable from said steel pipe, but at least said exterior side of said outer layer of said coating resin is kept under a temperature at which softening occurs.

4. A method to separate and recover steel pipe and coating resin from resin-coated steel pipe according to any of claim 1–3 characterized in that said feeding device is constructed as a feeding roll device consisting of two or more sets of feeding rolls, each of said sets of feeding rolls having a plurality of division rolls, that said feeding roll device has a construction such that a prescribed division roll is given pressing force against said outer periphery of said resin-coated steel pipe toward an axis of said resin-coated steel pipe, and a groove formed on a periphery of each of said division rolls engages with said outer periphery of said resin-coated steel pipe and rotates to thereby feed said resin-coated steel pipe in said running direction thereof, that in said set of feeding rolls of said feeding device, which have said division roll that is given pressing force against said outer periphery of said resin-coated steel pipe toward said axis thereof and which are arranged to clamp said resin-coated steel pipe, at a bottom of grooves of at least two of said division rolls, are provided throughout periphery incision blades of which tips are protruding, that said tip of said incision blade protrudes from said bottom of said groove by a height no less than a thickness of said coating resin, and that as said feeding device feeds said resin-coated steel pipe in said running direction thereof, said incision blades that are forced against said resin-coated steel pipe make incision lines.

5. A method to separate and recover steel pipe and coating resin from resin-coated steel pipe according to any of claim 4 characterized in that said incision blades are provided in said set of feeding rolls, which includes said division roll that is given a force toward said axis of said resin-coated steel pipe and is located on a side of said high-frequency induction coil.

6. A method to separate and recover steel pipe and coating resin from resin-coated steel pipe according to claim 4 or characterized in that an edge angle of said incision blades is about 30 degrees or less.

7. A method to separate and recover steel pipe and coating resin from resin-coated steel pipe according to any of claim 1–3 characterized in that said resin-coated steel pipe is given two incision lines, that said take-up device is constructed as a take-up roll device that consists of two or more sets of take-up rolls of which one has as take-up rolls two division rolls which are arranged opposing each other precisely on said incision lines to clamp said steel pipe, that said take-up roll device has a construction such that said prescribed division roll is given pressing force against said outer periphery of said steel pipe toward said axis of said resin-coated steel pipe, and said periphery of each of said division rolls thereby engages with said outer periphery of said steel pipe and rotates to take up said steel pipe in said running direction thereof, that a separating mechanism comprises, in said take-up roll device, a set of take-up rolls which, including a division roll given pressing force toward said axis of said steel pipe, are positioned on a side of said high-frequency induction coil and which are either formed or not on a periphery with grooves of depth about $\frac{1}{3}$ to $\frac{1}{4}$ of a radius of said steel pipe or less, and a run guide provided at a distance from said steel pipe to enclose said steel pipe and that in said take-up roll device, when, on two division rolls in said set of take-up rolls that is positioned on said side of said high-frequency induction coil, portions of said periphery grooves or said periphery surfaces facing said high-frequency induction coil come in touch with said incision lines in said coating resin of said moving resin-coated steel pipe, through forces given to said two incision lines, said coating resin is, starting at a fore end thereof, separated from said steel pipe and severed along said incision lines and away from said steel pipe into two pieces and then guided by said run guide in said running direction thereof.

8. A method to separate and recover steel pipe and coating resin from resin-coated steel pipe according to any of claim 1–3 characterized in that said separating mechanism is provided between said high-frequency induction coil and said take-up device, that said separating mechanism comprises said dividing blades fixed at positions corresponding to said incision lines which divide said coating resin circumferentially into at least two parts in such a manner that pointed tips of said dividing blades oppose said incision lines in said coating resin of said resin-coated steel pipe, which comes moving in a running direction thereof and said run guide located at a distance from said steel pipe to enclose said steel pipe, that as said pointed ends of said dividing blades strike against said incision lines made in said coating resin of said resin-coated steel pipe moving in said running direction, said coating resin is, from said fore end thereof, separated from said steel pipe along said incision lines and away from said steel pipe, and severed into at least two pieces which are guided by said run guide in said running direction thereof.

9. A method to separate and recover steel pipe and coating resin from resin-coated steel pipe according to any of claim 1–3 characterized in that said separating mechanism is provided between said high-frequency induction coil and said take-up device, that said separating mechanism comprises a set of severing rolls consisting of two division rolls that are arranged to oppose each other at positions corresponding to said incision lines to clamp said resin-coated steel pipe and a run guide that is provided at a distance from said steel pipe to enclose said steel pipe, and that in said set of severing rolls, at least one division roll is given a force against said outer surface of said steel pipe toward said axis thereof and said two division rolls rotate with a periphery thereof engaging with said outer surface of said steel pipe, that said periphery of each of said two division rolls is formed into a shape selected as a preferred one for said separating mechanism, and that in said set of severing rolls, when portions of said periphery surfaces facing said high-frequency induction coil come in touch with said incision lines in said coating resin of said moving resin-coated steel pipe, through force given to said two incision lines, said coating resin is, starting at said fore end thereof, separated from said steel pipe and severed along said incision lines and away from said steel pipe into two pieces, which are then guided by said run guide in said running direction thereof.

10. A method to separate and recover steel pipe and coating resin from resin-coated steel pipe according to any of claim 1–3 characterized in that said separating mechanism is provided between said high-frequency induction coil and said take-up device, that said separating mechanism comprises a sucking device that has a plurality of sucking surfaces which, surrounding said resin-coated steel pipe, attract an outer surface of said coating resin and a run guide provided at a distance from said steel pipe enclosing said pipe, that said plurality of sucking surfaces diverge in distance therebetween in a direction from said high-frequency induction coil to said take-up device to pull away said coating resin from said steel pipe, that as said resin-coated steel pipe which has said coating resin divided into at least two parts moves through said plurality of sucking surfaces of said sucking device, said sucking device attracts each piece of said coating resin and, thereby separating said coating resin, starting at said fore end thereof, from said steel pipe, sever said coating resin along said incision lines and away from said steel pipe into at least two pieces, which are guided in said running direction thereof by said run guide.

11. A method to separate and recover steel pipe and coating resin from resin-coated steel pipe according to any of claim 1–3 characterized in that said resin-coated steel pipe is given two incision lines at an upper and lower positions, that said separating mechanism is provided with a run guide consisting of right and left guide pieces located on either side of said steel pipe and a lower piece located below said pipe at a distance from said pipe to avoid interference with said separating mechanism, and that said separating mechanism separates said coating resin, starting at said fore end thereof, from said steel pipe and sever said coating resin along said incision lines and away from said pipe into left and right pieces which are guided by said run guide in said running direction thereof.

12. An apparatus to separate and recover steel pipe and coating resin from resin-coated steel pipe, intended to process a resin-coated steel pipe which consists of steel pipe and coating resin adhered to an outer surface of said pipe, comprising a feeding device which feeds said resin-coated steel pipe of any length in a running direction thereof, a high-frequency induction heating device which heats said resin-coated steel pipe passing inside or near a high-frequency induction coil, a separating mechanism which, provided at an appropriate position reached by said moving resin-coated steel pipe immediately after passing an induction coil, separates said coating resin from said steel pipe, a take-up device and a recovering device which recovers steel pipe and coating resin in segregated condition, characterized in that a means is provided at a position before said high-frequency induction coil to make incision lines in a surface of said resin-coated steel pipe at locations for division into at least two pieces in such a manner that said incision lines reach in depth from said surface of said coating resin to said surface of said steel pipe, that said high-frequency induction heating device is capable of heating said steel pipe by means of high-frequency induction into a condition such that, at a position of said separating mechanism, a bottom layer of said coating resin adjacent to a boundary of said steel pipe is separable from said steel pipe, and that said separating mechanism is constructed in such a manner as to be able to separate said coating resin, starting at a fore end thereof, from said steel pipe and sever said coating resin along said incision lines and away from said steel pipe into at least two pieces.

13. A method to separate and recover steel pipe and coating resin from resin-coated steel pipe according to claim 2 characterized in that by means of high-frequency induction heating, said steel pipe is heated in such a manner that, when it reaches said separating mechanism located at an appropriate position arrived at immediately after a heating process, said layer of said coating resin adjacent to said boundary of said steel pipe reaches a condition separable from said steel pipe, but at least said exterior side of said outer layer of said coating resin is kept under a temperature at which softening occurs.

14. A method to separate and recover steel pipe and coating resin from resin-coated steel pipe according to claim 5 characterized in that an edge angle of said incision blades is about 30 degrees or less.

* * * * *